(12) United States Patent
Viente et al.

(10) Patent No.: US 11,205,012 B2
(45) Date of Patent: Dec. 21, 2021

(54) SYSTEMS AND METHODS FOR ANONYMIZING NAVIGATION INFORMATION

(71) Applicant: Mobileye Vision Technologies Ltd., Jerusalem (IL)

(72) Inventors: Kfir Viente, Ramat Gan (IL); Eli Harel, Meitar (IL); Achiya Tal Tamir, Mazkeret Batya (IL); Maxim Schwartz, Mevaseret Zion (IL); Dori Shapira, Galon (IL); Nimrod Nehushtan, Tel Aviv (IL); Yoram Gdalyahu, Jerusalem (IL); Daniel Braunstein, Tzur Hadassah (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 156 days.

(21) Appl. No.: 16/292,757

(22) Filed: Mar. 5, 2019

(65) Prior Publication Data
US 2019/0272389 A1 Sep. 5, 2019

Related U.S. Application Data

(60) Provisional application No. 62/638,713, filed on Mar. 5, 2018, provisional application No. 62/642,823, filed
(Continued)

(51) Int. Cl.
*G06F 21/62* (2013.01)
*G05D 1/02* (2020.01)
(Continued)

(52) U.S. Cl.
CPC ..... *G06F 21/6254* (2013.01); *G01C 21/3602* (2013.01); *G05D 1/0088* (2013.01);
(Continued)

(58) Field of Classification Search
CPC ............ G06F 21/6254; G06K 9/00818; G06K 9/00798; G01C 21/3602; G05D 1/0253;
(Continued)

(56) References Cited

U.S. PATENT DOCUMENTS

2013/0261954 A1* 10/2013 Boschker ............... G01C 21/00 701/410
2017/0358204 A1* 12/2017 Modica ................ G07C 5/0841

OTHER PUBLICATIONS

Written Opinion and International Search Report in PCT/US2019/020718, dated Jun. 3, 2019 (13 pages).

* cited by examiner

*Primary Examiner* — Brian P Sweeney
(74) *Attorney, Agent, or Firm* — Finnegan, Henderson, Farabow, Garrett & Dunner, LLP

(57) ABSTRACT

Systems and methods are provided for anonymizing navigation data and generating an autonomous vehicle road navigation model with the anonymized data. A navigation system may receive data relating to a road section from a vehicle. The system may determine one or more motion representations associated with the vehicle and one or more road characteristics associated with the road section. The system may assemble navigation information relative to a first portion and relative to a second portion of the road section. The first and second portions may be spatially separated by a third portion. The system may transmit the navigation information relating to the first and second portions and forego transmitting information relating to the third portion. A server may receive the transmitted navigation information and assemble an autonomous vehicle road navigation model. The server may transmit the navigation model to one or more vehicles for use in autonomous navigation.

23 Claims, 48 Drawing Sheets

Related U.S. Application Data on Mar. 14, 2018, provisional application No. 62/671,779, filed on May 15, 2018, provisional application No. 62/771,335, filed on Nov. 26, 2018, provisional application No. 62/805,632, filed on Feb. 14, 2019, provisional application No. 62/805,646, filed on Feb. 14, 2019, provisional application No. 62/813,403, filed on Mar. 4, 2019.

(51) Int. Cl.
  *G05D 1/00* (2006.01)
  *G06K 9/00* (2006.01)
  *H04W 4/02* (2018.01)
  *H04W 4/44* (2018.01)
  *G01C 21/36* (2006.01)

(52) U.S. Cl.
  CPC ......... *G05D 1/0212* (2013.01); *G05D 1/0253* (2013.01); *G06K 9/00798* (2013.01); *G06K 9/00818* (2013.01); *H04W 4/027* (2013.01); *H04W 4/44* (2018.02)

(58) Field of Classification Search
  CPC ..... G05D 1/0088; G05D 1/0212; H04W 4/44; H04W 4/027; G01S 19/13; G01P 15/00; G01P 11/00; G01W 1/02
  See application file for complete search history.

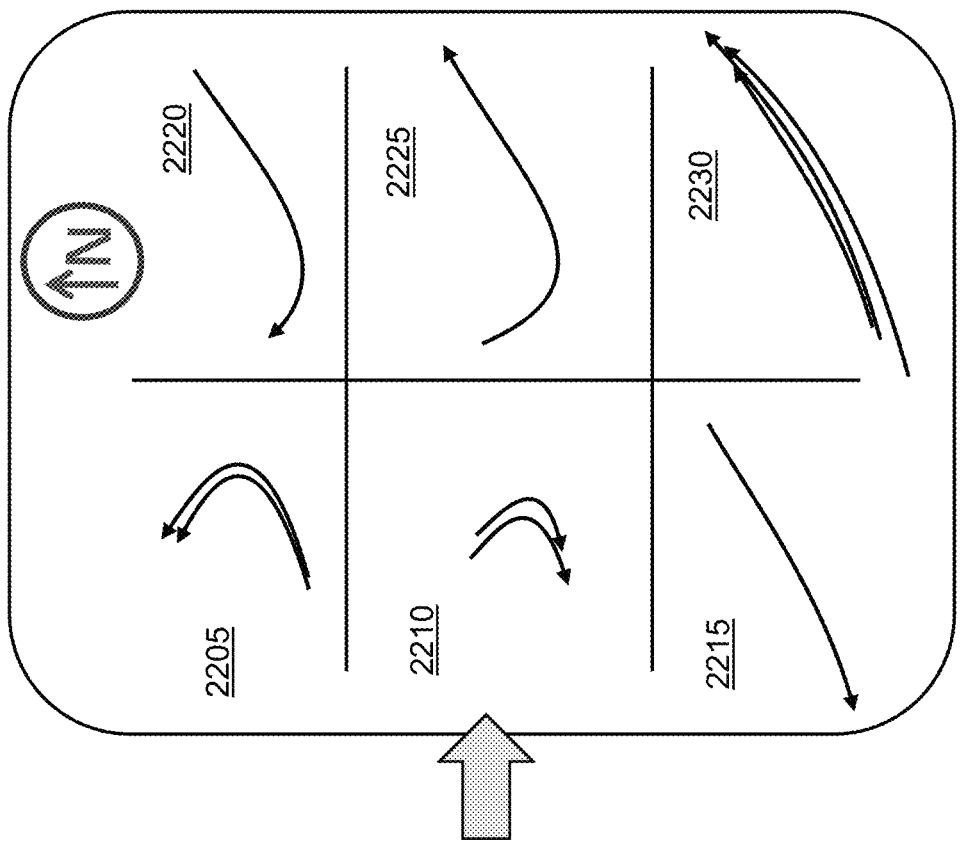
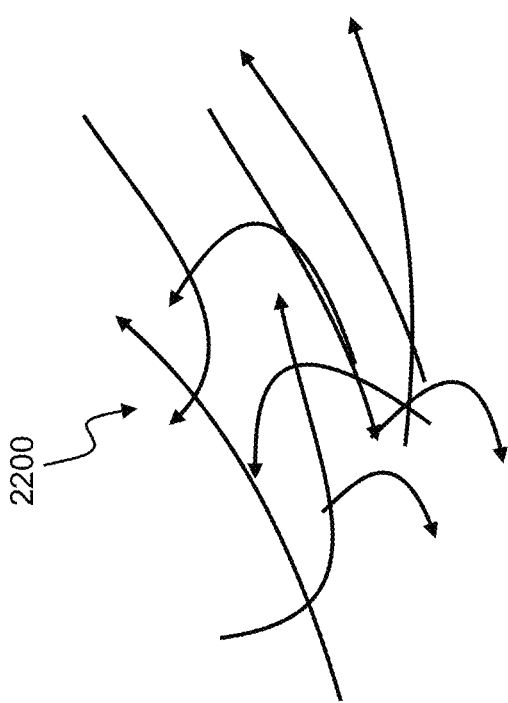
FIG. 22

SYSTEMS AND METHODS FOR ANONYMIZING NAVIGATION INFORMATION

CROSS REFERENCES TO RELATED APPLICATIONS

This application claims the benefit of priority of U.S. Provisional Patent Application No. 62/638,713, filed Mar. 5, 2018; U.S. Provisional Patent Application No. 62/642,823, filed Mar. 14, 2018; U.S. Provisional Patent Application No. 62/671,779, filed May 15, 2018; United States Provisional Patent Application No. 62/771,335, filed Nov. 26, 2018; U.S. Provisional Patent Application No. 62/805,632, filed. Feb. 14, 2019; U.S. Provisional Patent Application No. 62/805,646, filed Feb. 14, 2019; and U.S. Provisional Patent Application No. 62/813,403, filed Mar. 4, 2019. All of the foregoing applications are incorporated herein by reference in their entirety.

BACKGROUND

Technical Field

The present disclosure relates generally to autonomous vehicle navigation.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera) and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, and travel from one road to another road at appropriate intersections or interchanges. Harnessing and interpreting vast volumes of information collected by an autonomous vehicle as the vehicle travels to its destination poses a multitude of design challenges. The sheer quantity of data (e.g., captured image data, map data, GPS data, sensor data, etc.) that an autonomous vehicle may need to analyze, access, and/or store poses challenges that can in fact limit or even adversely affect autonomous navigation. Furthermore, if an autonomous vehicle relies on traditional mapping technology to navigate, the sheer volume of data needed to store and update the map poses daunting challenges.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras.

In some embodiments, the systems and methods may include a navigation system for collecting anonymized derive information relative to a road section traversed by a host vehicle. The navigation system may include at least one processor. The at least one processor may be programmed to perform one or more functions, processes, or methods consistent with this disclosure. The processor may be programmed to received outputs indicative of motion of the host vehicle. The outputs may be received form one or more sensors associated with the host vehicle. The processor may be programmed to determine at least one motion representation for the host vehicle based, at least in part, on the outputs from the one or more sensors. The processor may be programmed to receive at least one image representative of an environment of the host vehicle. The at least one image may be received from a camera and may include a representation of the environment along the road section. The processor may be programmed to analyze the at least one image to determine at least one road characteristic associated with the road section. The processor may be programmed to assemble first road segment information relative to a first portion of the road. The first road segment information may include the determined at least one motion representation for the host vehicle and may include the determined at least one road characteristic relative to the first portion of the road section. The processor may be programmed to assemble second road segment information relative to a second portion of the road section. The second road segment information may be assembled insubstantially the same manner as the first road segment information. The second road segment information may include the determined at least one motion representation for the host vehicle and the determined at least one road characteristic relative to the second portion of the road section. The second portion of the road section may be different from the first portion of the road section and may be spatially separated from the first portion of the road section by a third portion of the road section. The processor may be programmed to cause transmission of the first road segment information and the second road segment information to a server located relative to the host vehicle for assembly of an autonomous vehicle road navigation model. The processor may be programmed to forgo transmission to the server of assembled road segment information relating to the third portion of the road section.

In some embodiments, the systems and methods may include a server-based system for processing vehicle navigation information for use in autonomous vehicle navigation. The server-based system may include at least one processor. The at least one processor may be programmed to perform one or more functions, processes, or methods consistent with this disclosure. The processor may be programmed to receive navigation information from a plurality of vehicles. The navigation information from the plurality of vehicles may be associated with a common road section. The navigation information from each of the plurality of vehicles may include road segment information relative to a first portion of the common road section and road segment information relative to a second portion of the common road section. The first road segment information may include a determined at least one motion representation for the host vehicle and a determined at least one road characteristic relative to the first portion of the common road section. The second road segment information may include a determined at least one motion representation for the host vehicle and a determined at least one road characteristic relative to the second portion of the common road section. The second portion of the road section may be different from the first portion of the road section and may be spatially separated from the first portion of the road section. The processor may be programmed to store the navigation information associated with the common road section. The processor may be programmed to generate at least a portion of an autonomous vehicle road navigation model for the common road section based on the navigation information received from the plurality of vehicles. The processor may be programmed to distribute the autonomous vehicle road navigation model to one or more autonomous vehicles for use in autonomously navigating the one or more autonomous vehicles along the common road section.

Consistent with other disclosed embodiments, non-transitory computer-readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of disclosure, illustrate various disclosed embodiments. In the drawings:

FIG. 22 illustrates a process of clustering vehicle trajectories associated with vehicles, consistent with the disclosed embodiments.

DETAILED DESCRIPTION

Figure 1:
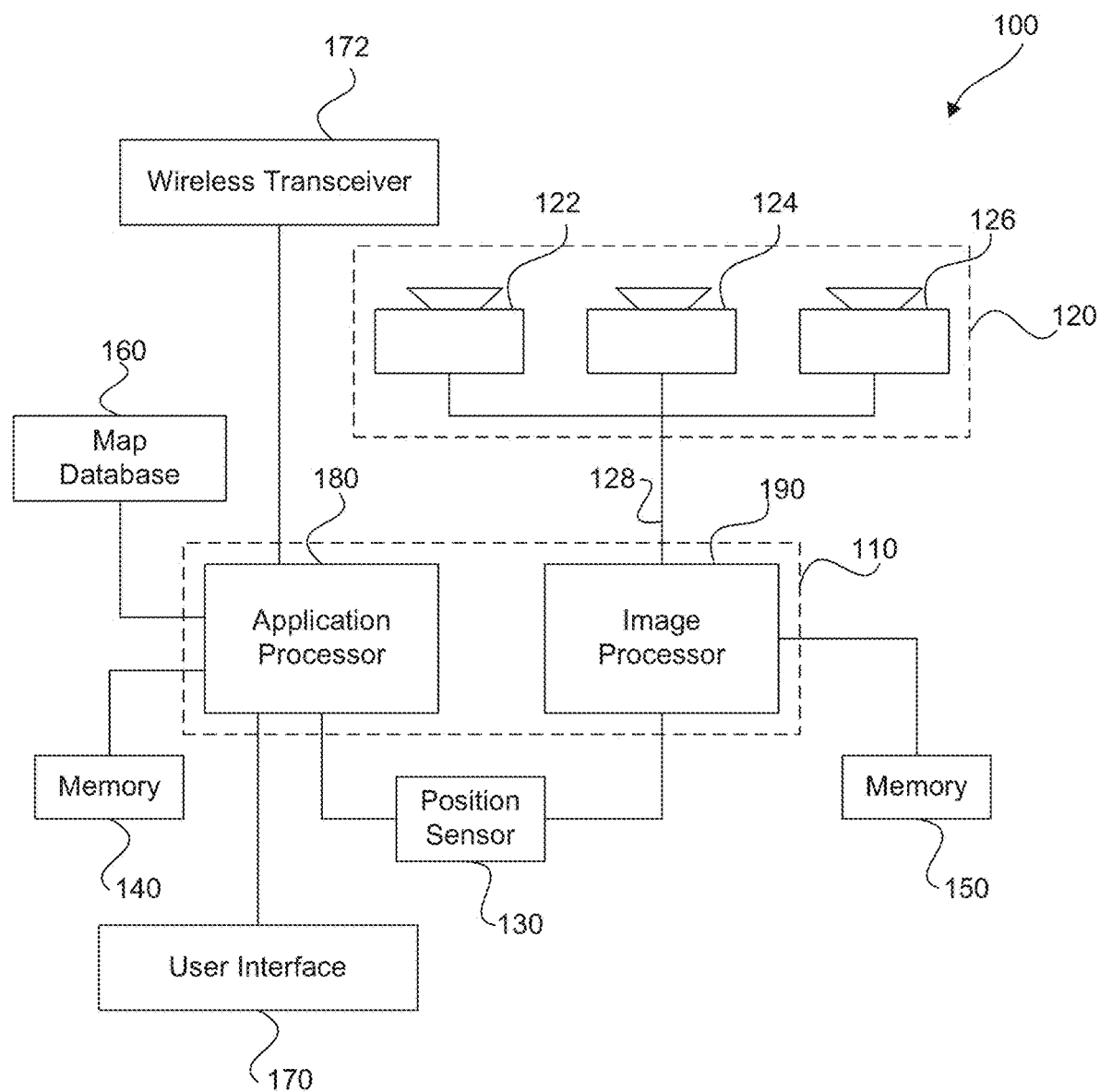
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration of the vehicle. To be autonomous, a vehicle need not be fully automatic (e.g., fully operation without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

As human drivers typically rely on visual cues and observations to control a vehicle, transportation infrastructures are built accordingly, with lane markings, traffic signs, and traffic lights are all designed to provide visual information to drivers. In view of these design characteristics of transportation infrastructures, an autonomous vehicle may include a camera and a processing unit that analyzes visual information captured from the environment of the vehicle. The visual information may include, for example, components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while the vehicle is traveling, and the vehicle (as well as other vehicles) may use the information to localize itself on the model.

In some embodiments in this disclosure, an autonomous vehicle may use information obtained while navigating (e.g., from a camera, GPS device, an accelerometer, a speed sensor, a suspension sensor, etc.). In other embodiments, an autonomous vehicle may use information obtained from past navigations by the vehicle (or by other vehicles) while navigating. In yet other embodiments, an autonomous vehicle may use a combination of information obtained while navigating and information obtained from past navigations. The following sections provide an overview of a system consistent with the disclosed embodiments, followed by an overview of a forward-facing imaging system and methods consistent with the system. The sections that follow disclose systems and methods for constructing, using, and updating a sparse map for autonomous vehicle navigation.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras), such as image capture device 122, image capture device 124, and image capture device 126. System 100 may also include a data interface 128 communicatively connecting processing device 110 to image acquisition device 120. For example, data interface 128 may include any wired and/or wireless link or links for transmitting image data acquired by image accusation device 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of processing devices. For example, either or both of applications processor 180 and image processor 190 may include a microprocessor, preprocessors (such as an image preprocessor), a graphics processing unit (GPU), a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), a graphics processing unit (GPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The GPU may also comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory (RAM), read only memory (ROM), flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a tachometer, a speedometer) for measuring a speed of vehicle 200 and/or an accelerometer (either single axis or multiaxis) for measuring acceleration of vehicle 200.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Systems and methods of generating such a map are discussed below with references to FIGS. 8-19.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

Figure 2A:
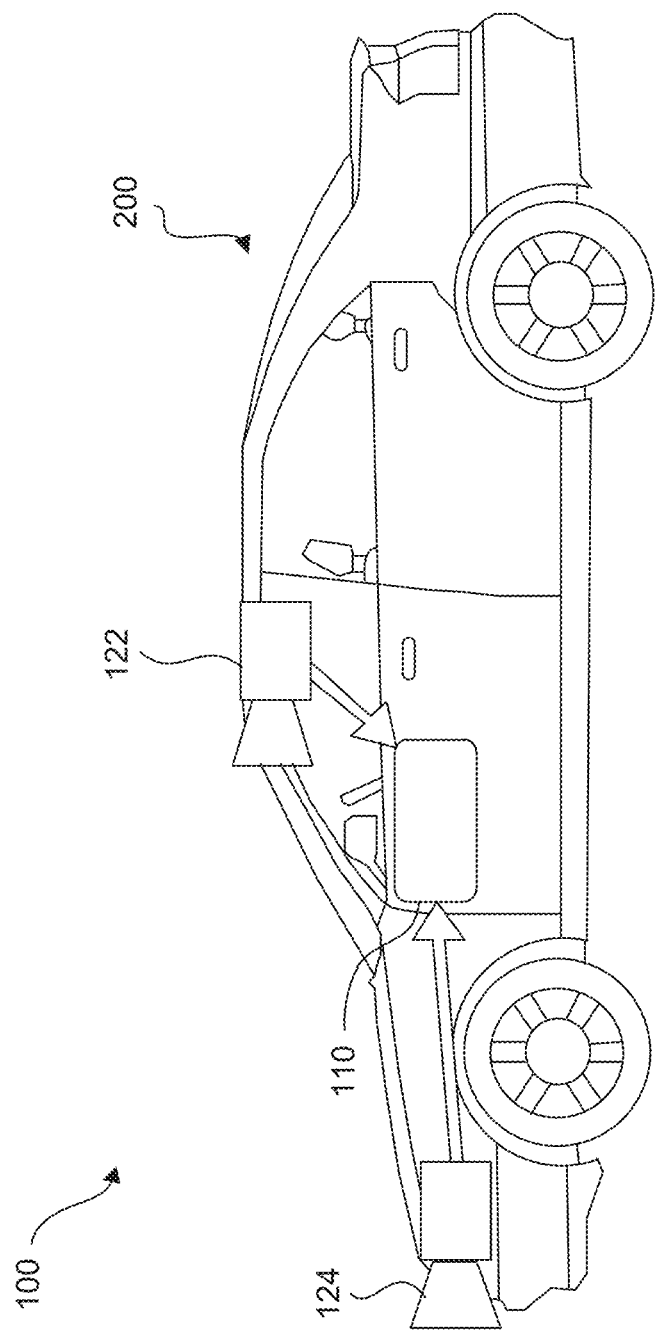
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GI'S receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from by system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead of transmit data, such as captured images and/or limited location information related to a route.

Other privacy levels are contemplated. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
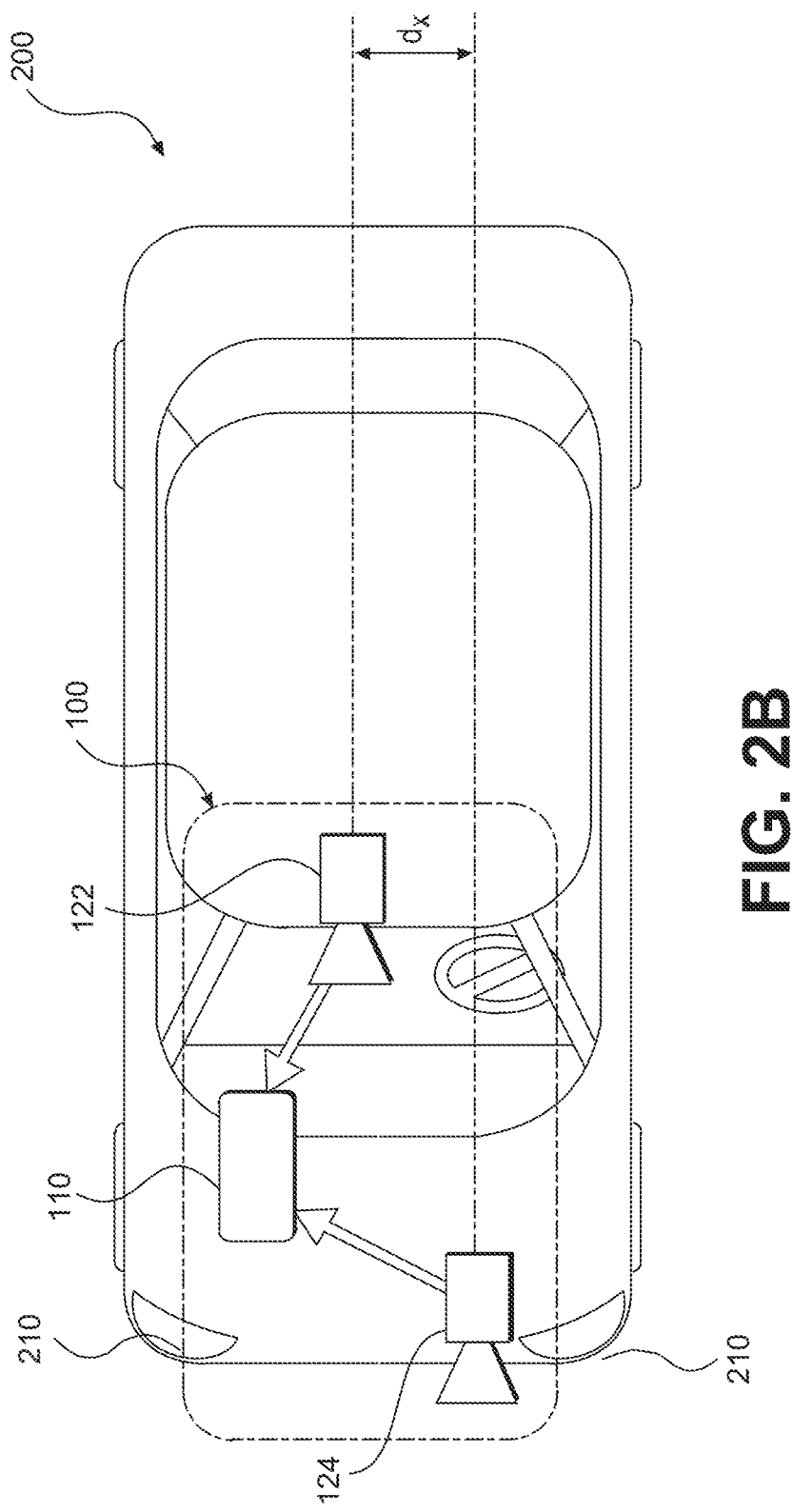
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
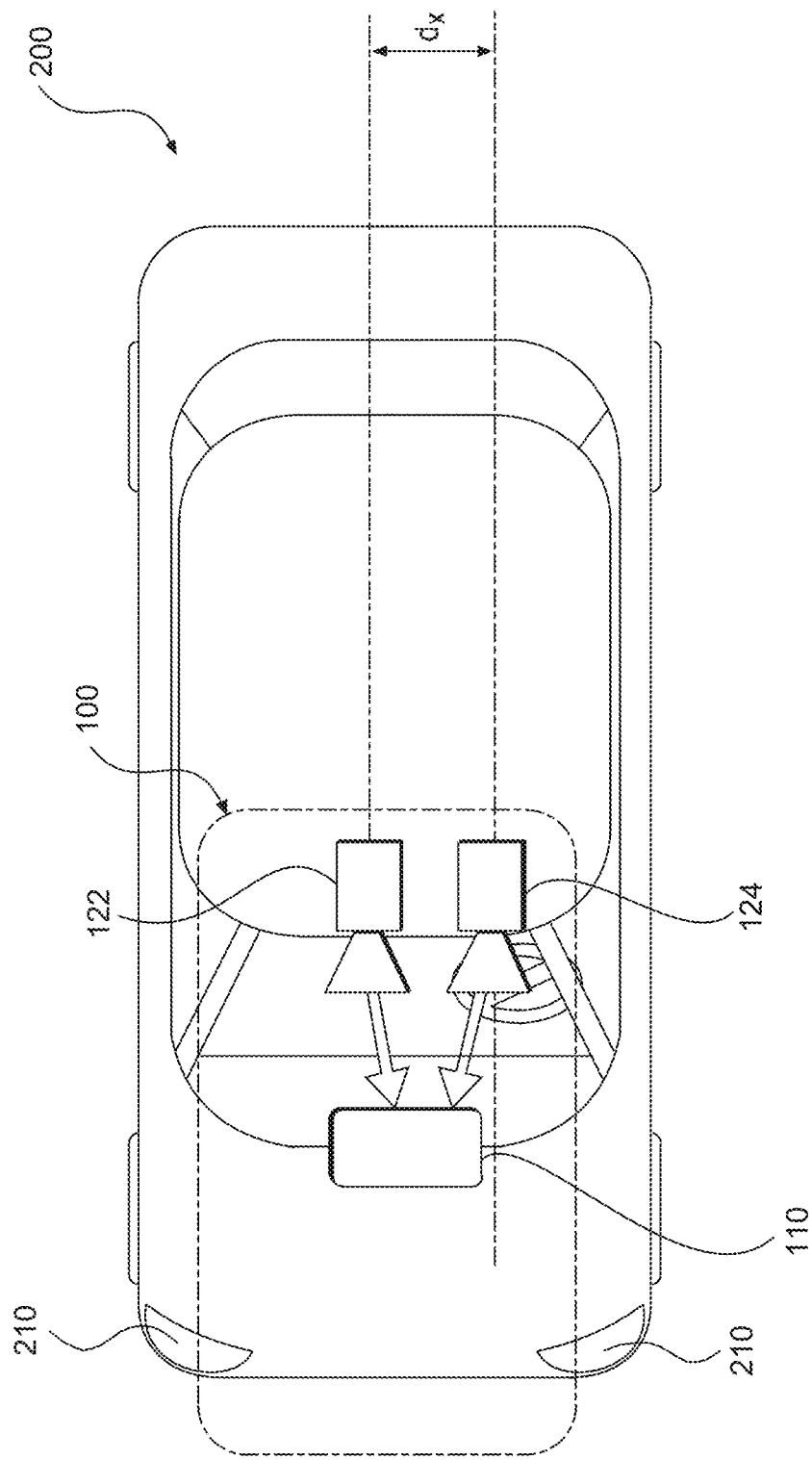
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
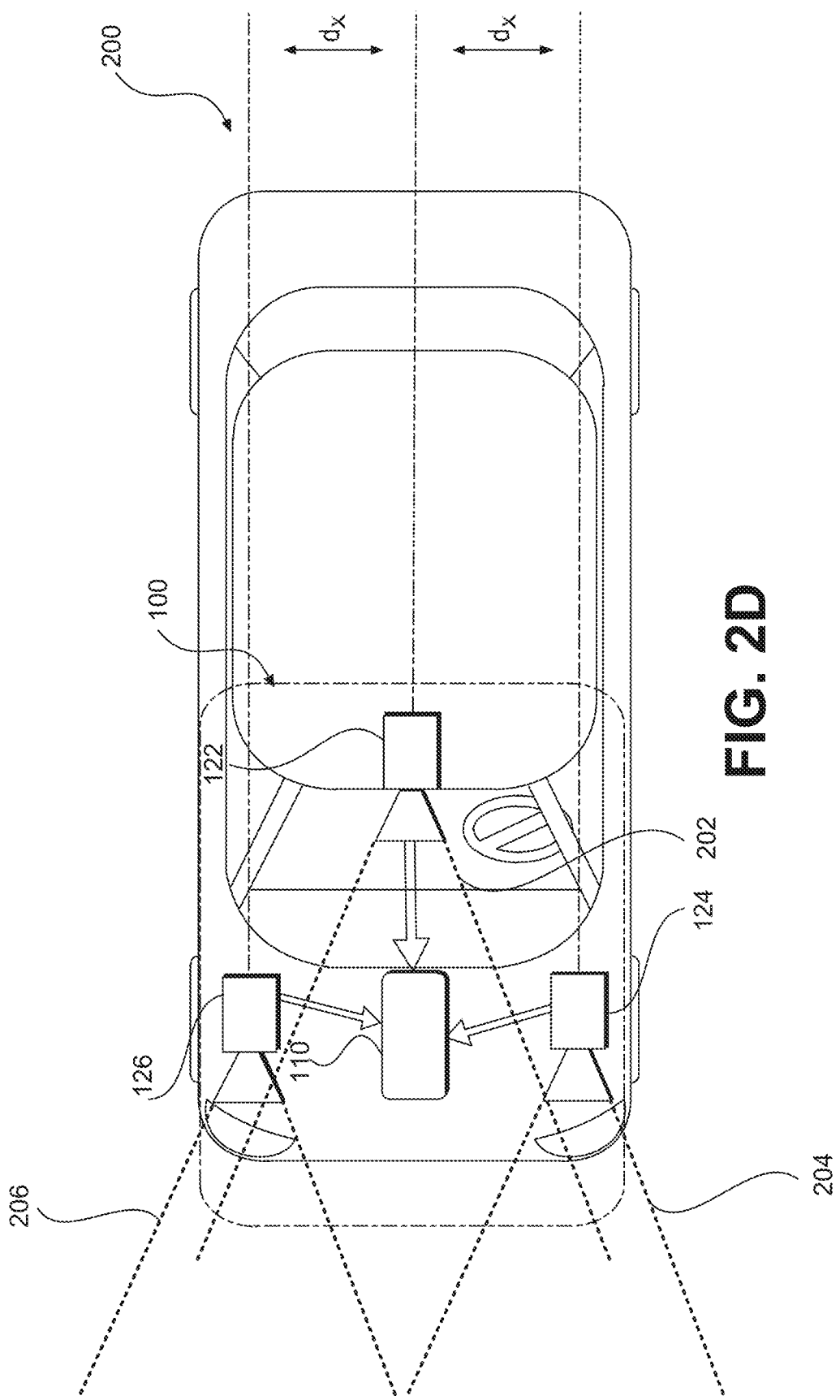
FIG. 2D is a diagrammatic top view representation of yet another embodiment of a vehicle including a system consistent with the disclosed embodiments.
Figure 2E:
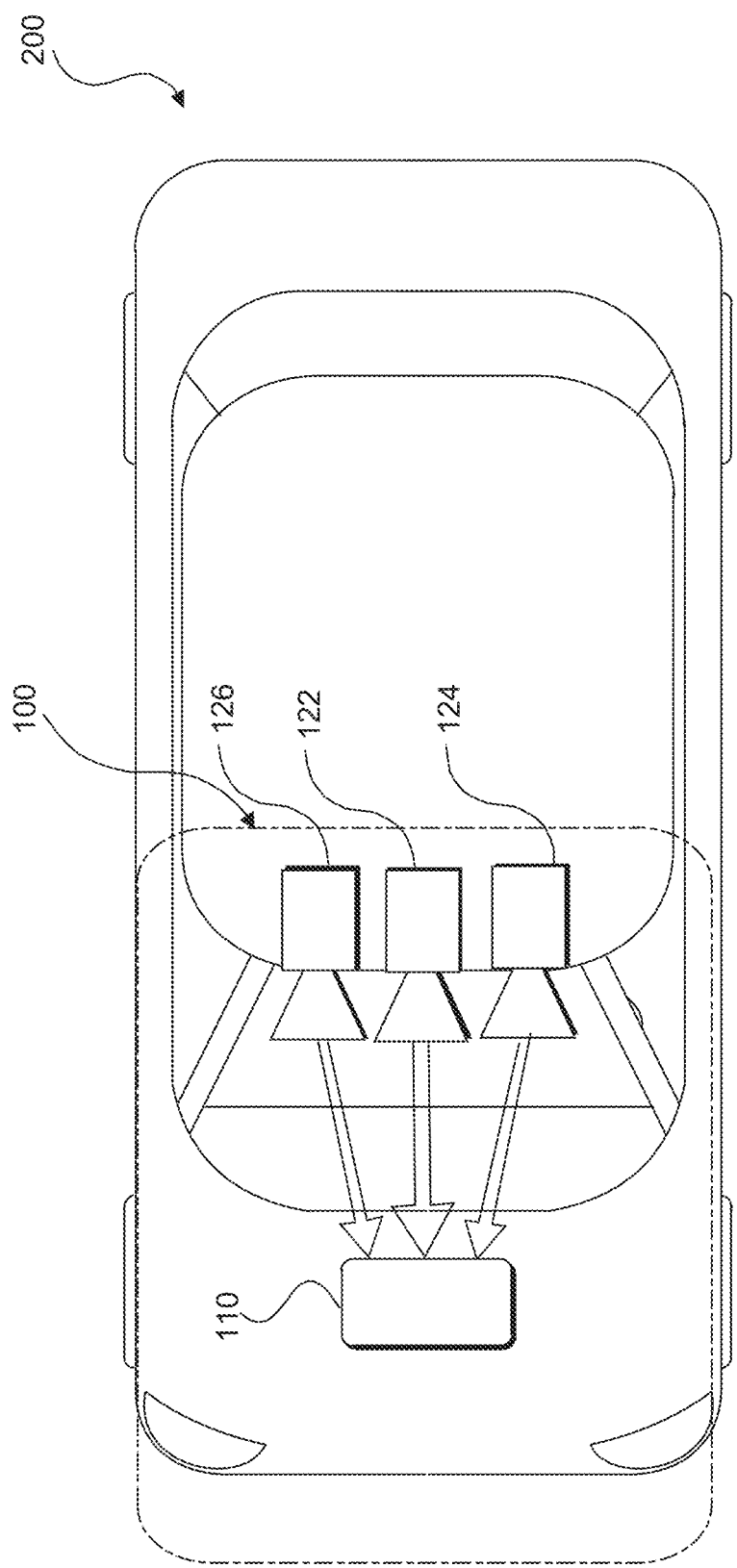
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with the vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126)

disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOVs (such as FOVs 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with the vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor associated with image capture devices 124 and 126. In some embodiments, the image sensor(s) associated with image capture device 122 and/or image capture devices 124 and 126 may have a resolution of 640×480, 1024×768, 1280× 960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 in) while the other image capture devices (e.g., image capture devices 124 and 126) can acquire images of more distant objects (e.g., greater than 20 m, 50 in, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOV image capture devices 124 and/or 126 may be located in a lower half of the field of view of the wider FOV device 122.

Figure 2F:
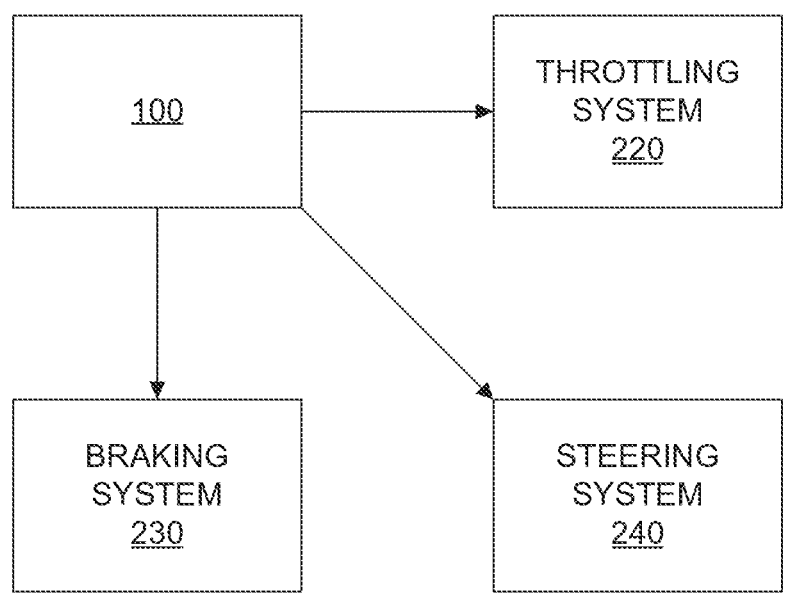
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
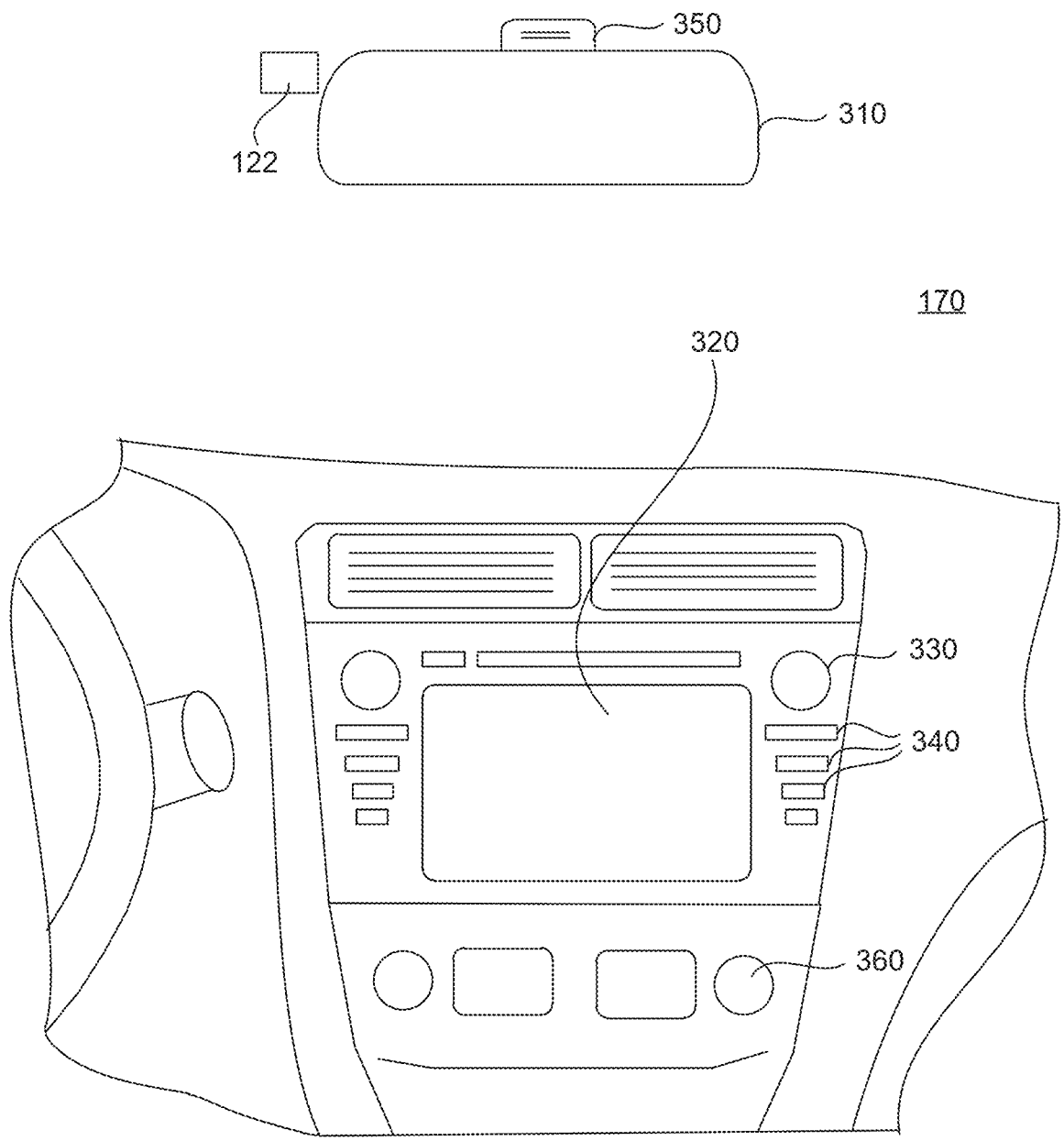
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
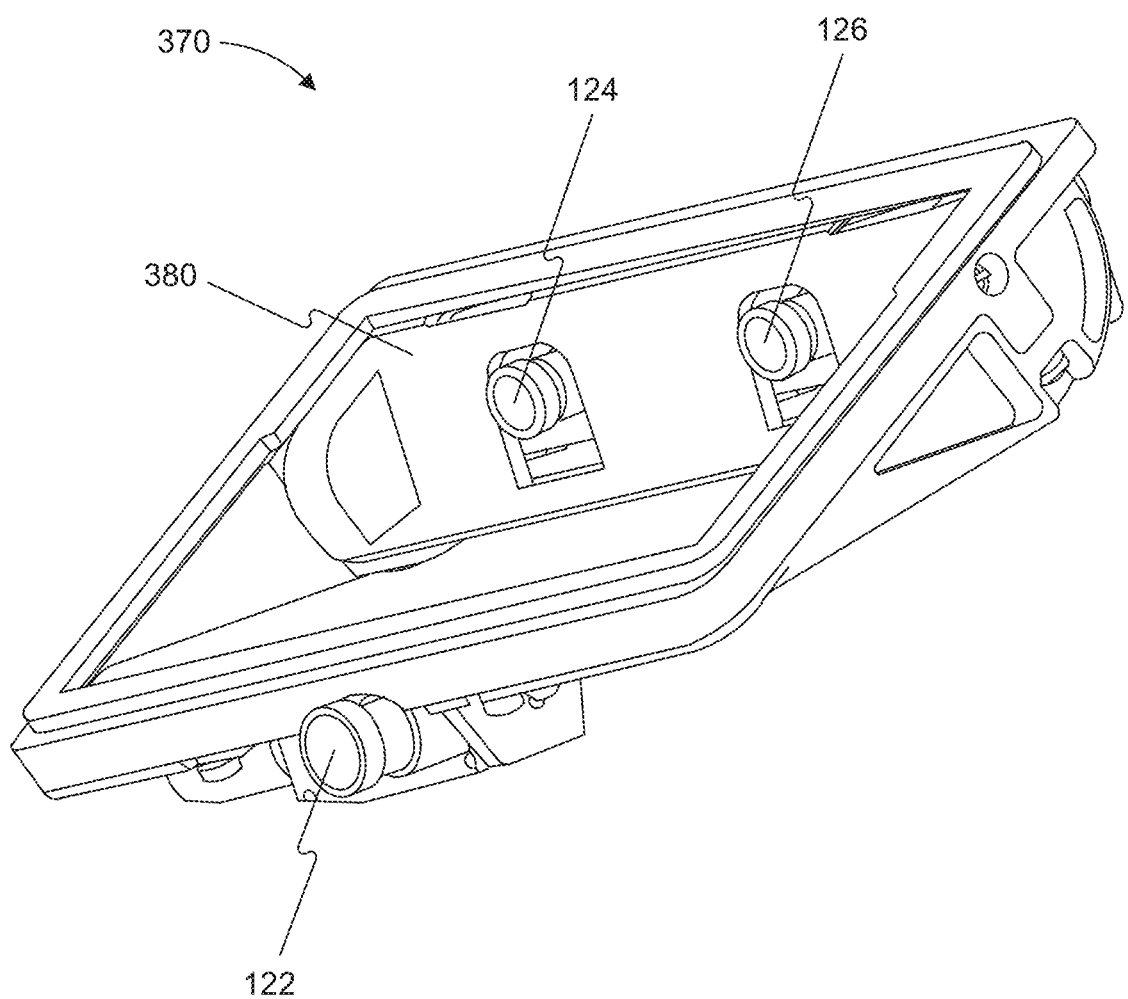
FIG. 3B is an illustration of an example of a camera mount that is configured to be positioned behind a rearview mirror and against a vehicle windshield consistent with the disclosed embodiments.
Figure 3C:
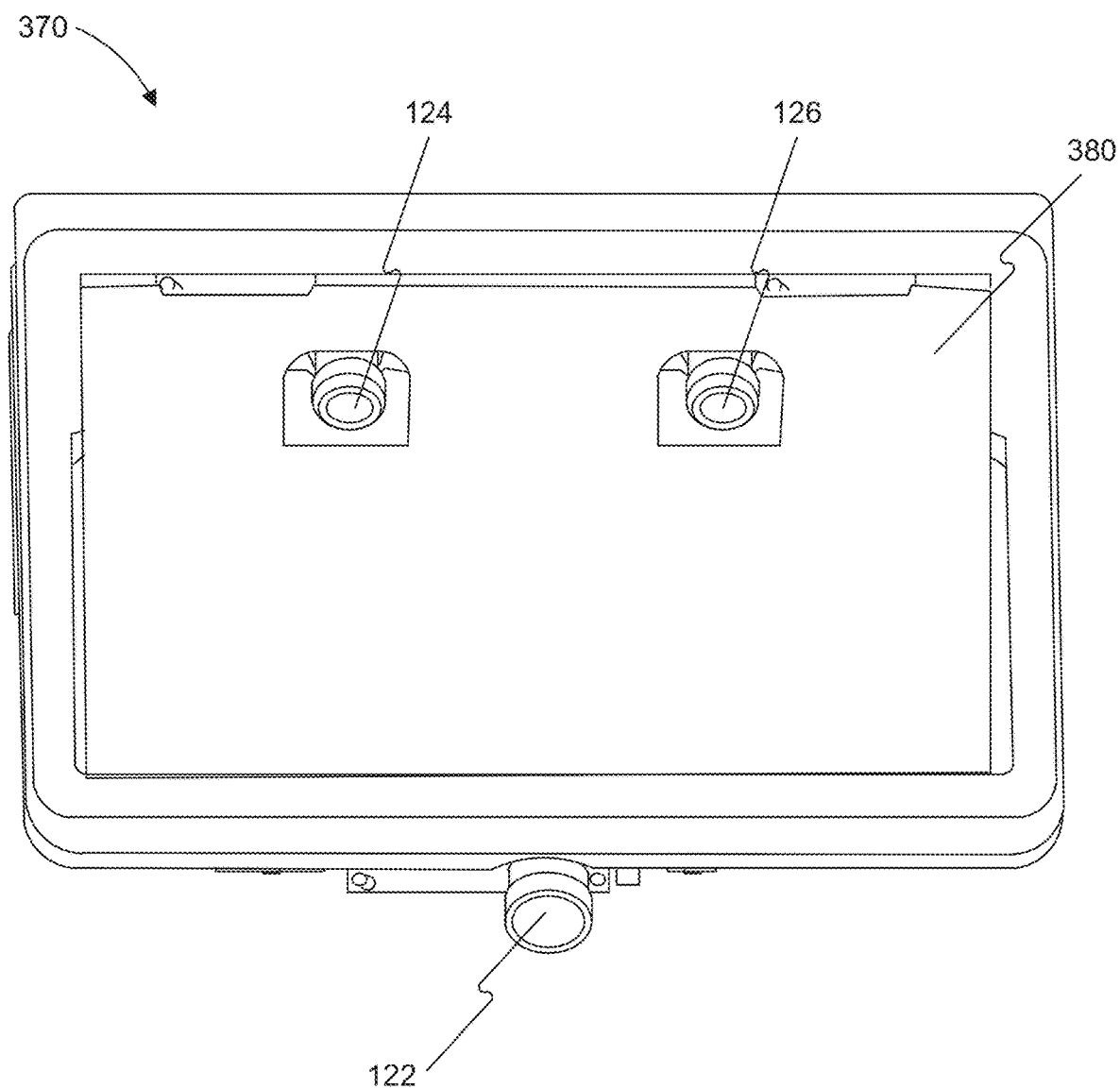
FIG. 3C is an illustration of the camera mount shown in FIG. 3B from a different perspective consistent with the disclosed embodiments.
Figure 3D:
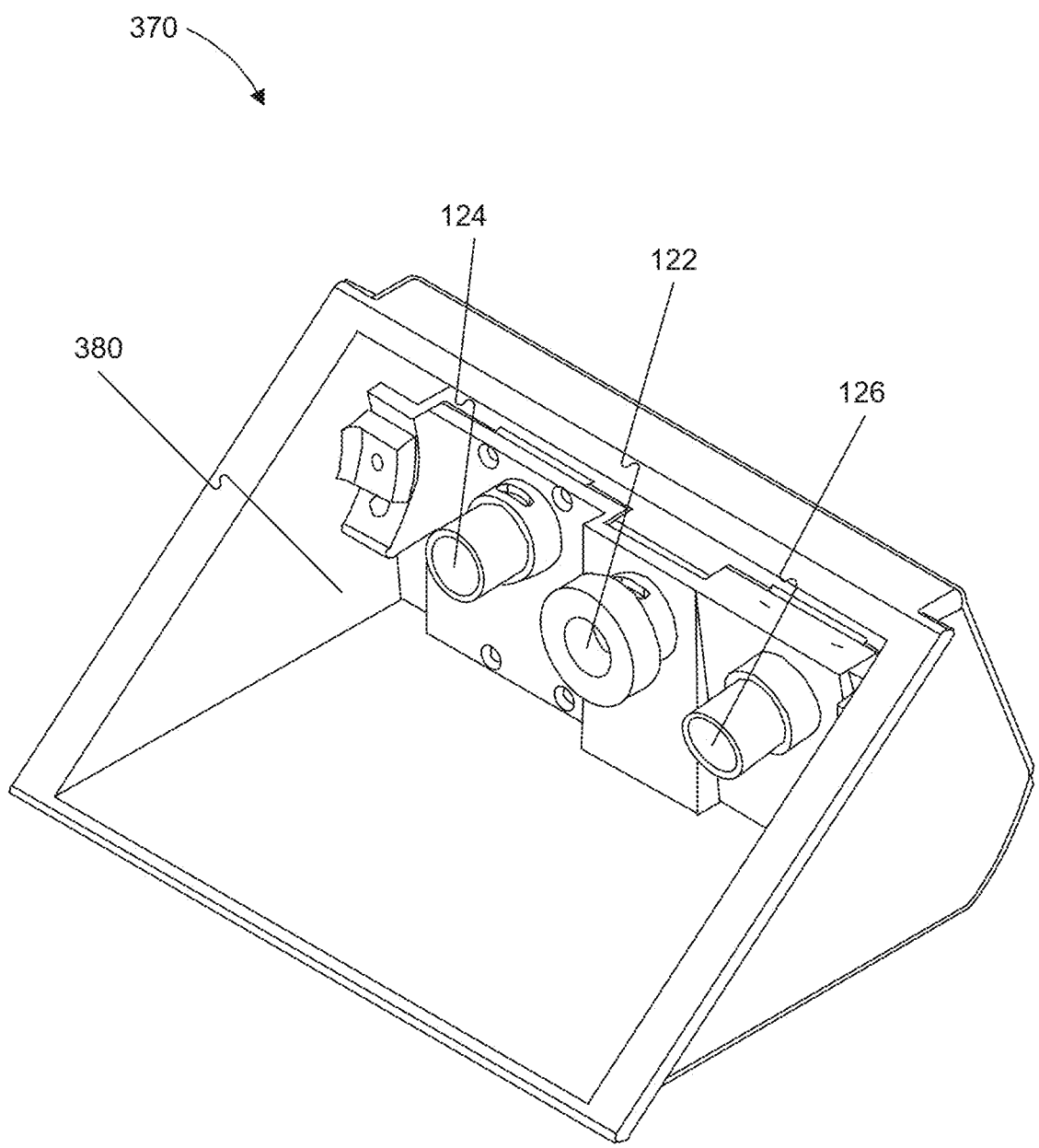
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that the shield aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122, 124, and 126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122, 124, and 126 may be positioned behind rearview mirror 310 and positioned substantially side-by-side (e.g., 6 cm apart). Further, in some embodiments, as discussed above, one or more of image capture devices 122, 124, and 126 may be mounted behind glare shield 380 that is flush with the windshield of vehicle 200. Such shielding may act to minimize the impact of any reflections from inside the car on image capture devices 122, 124, and 126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122, 124, and 126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
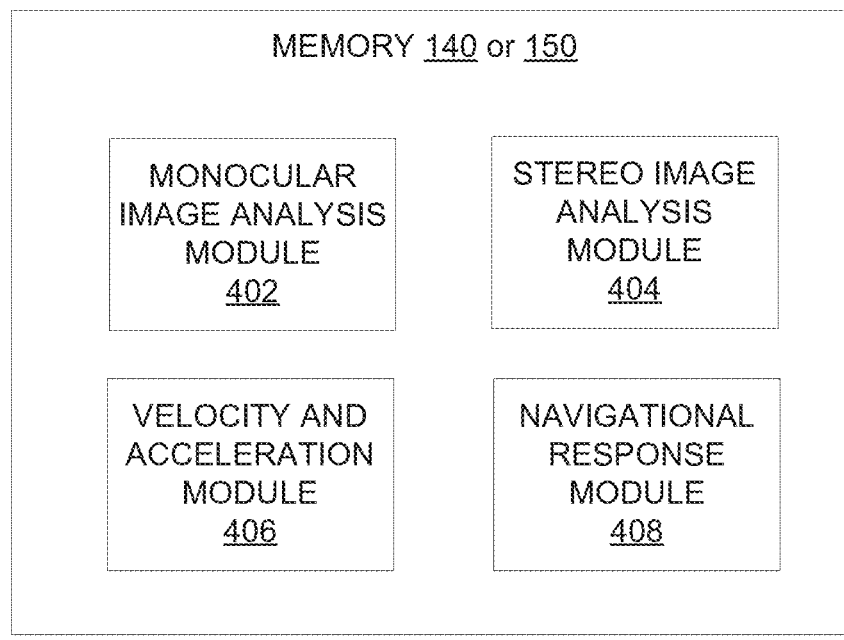
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, application processor 180 and/or image processor 190 may execute the instructions stored in any of modules 402, 404, 406, and 408 included in memory 140. One of skill in the art will understand that references in the following discussions to processing unit 110 may refer to application processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system, such as a system that may be configured to use computer vision algorithms to detect and/or label objects in an environment from which sensory information was captured and processed. In one embodiment, stereo image analysis module 404 and/or other image processing modules may be configured to use a combination of a trained and untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
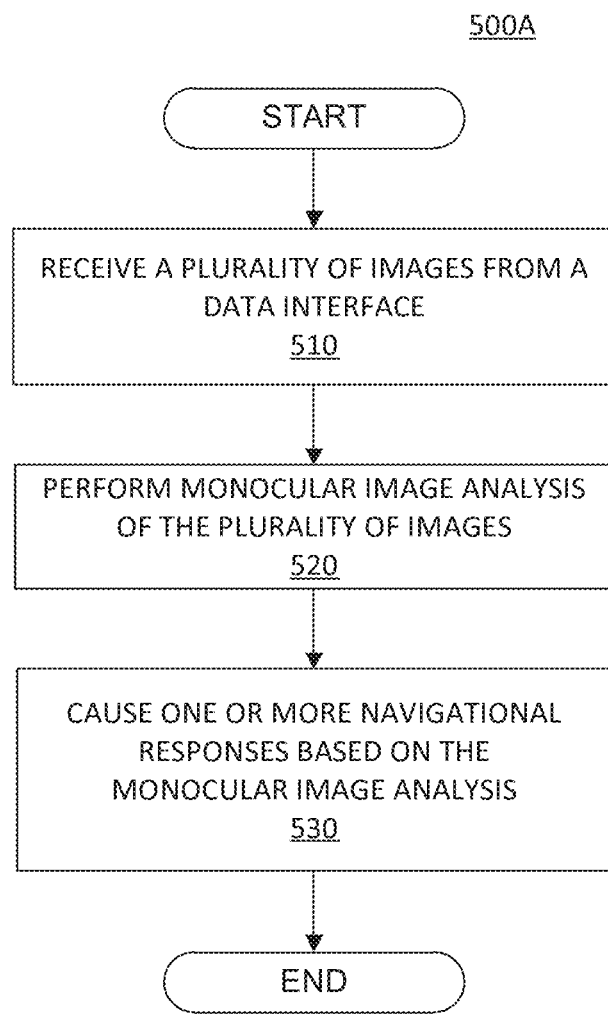
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
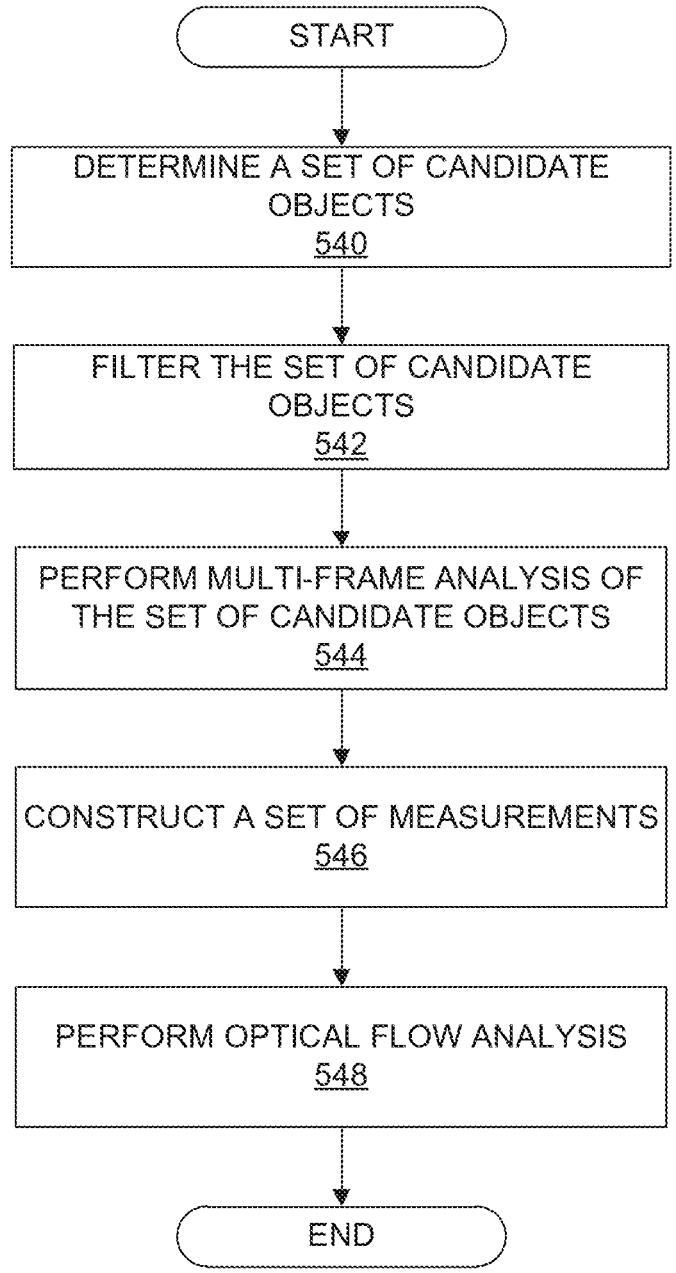
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information. (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
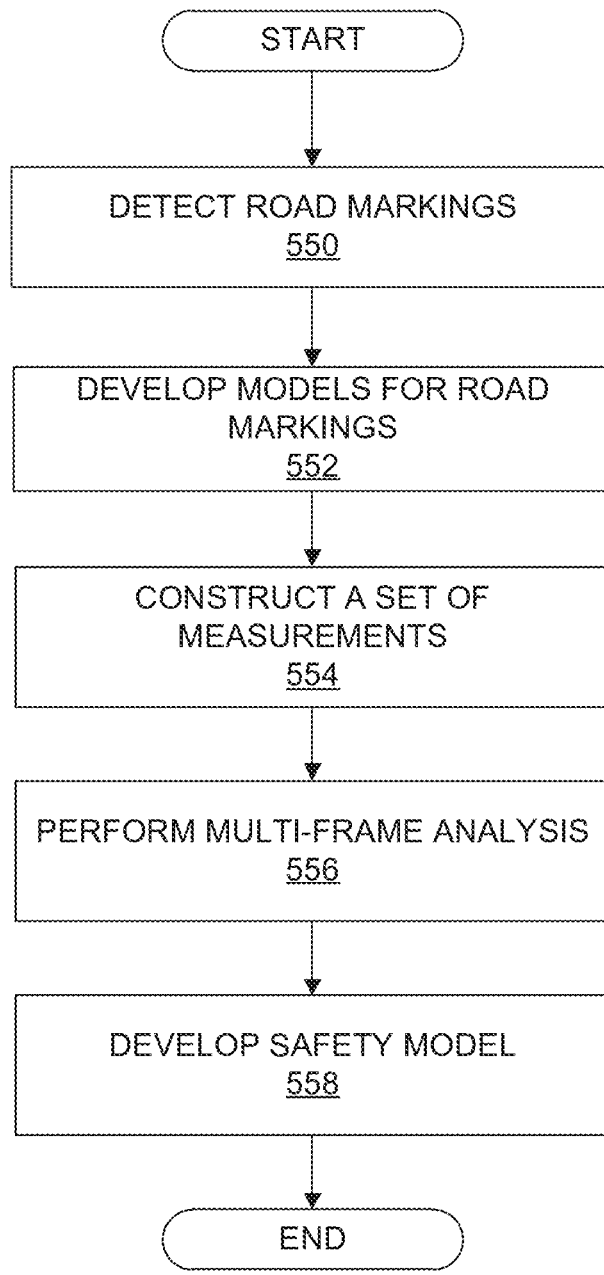
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550, 552, 554, and 556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
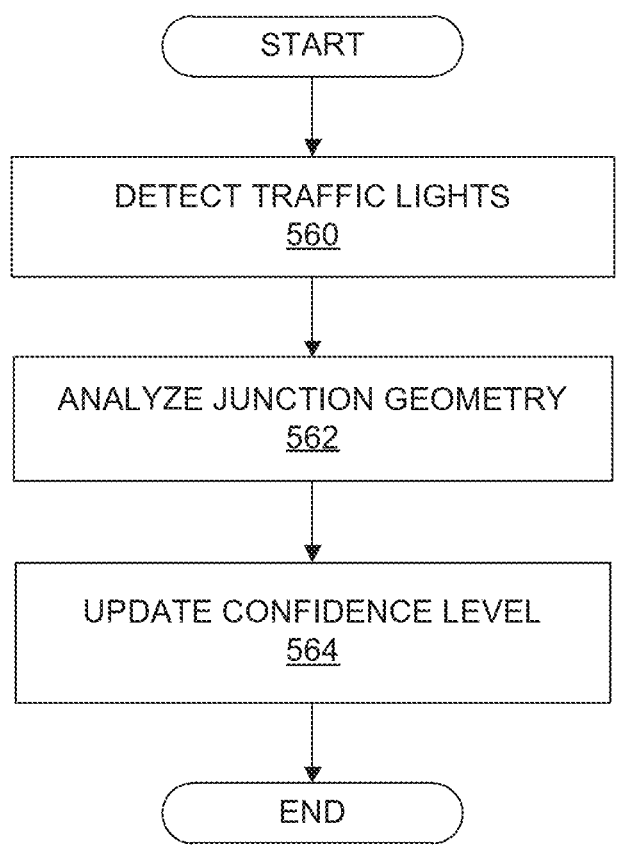
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560, 562, and 564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
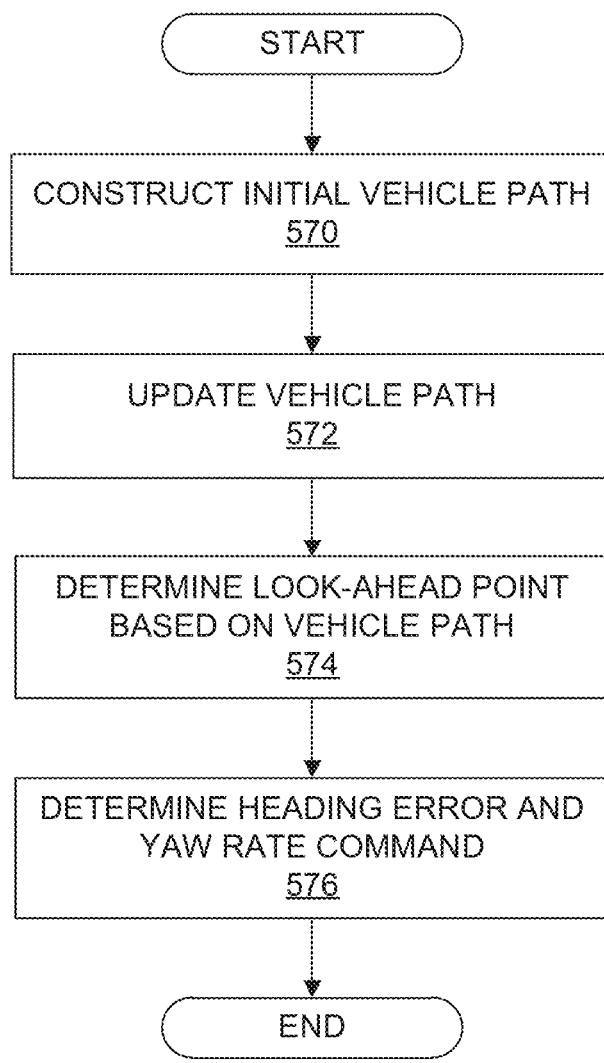
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance $d_i$ between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as ($x_l$, $z_l$)) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan ($x_l/z_l$) Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
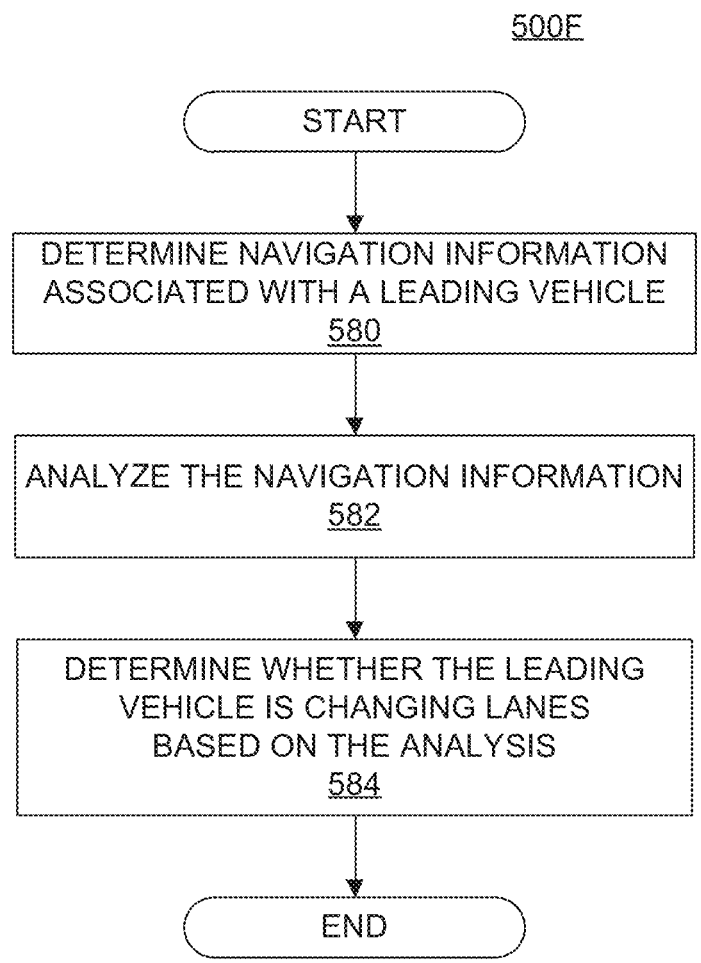
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2+\delta_x^2)/2/(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle Obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights.

Figure 6:
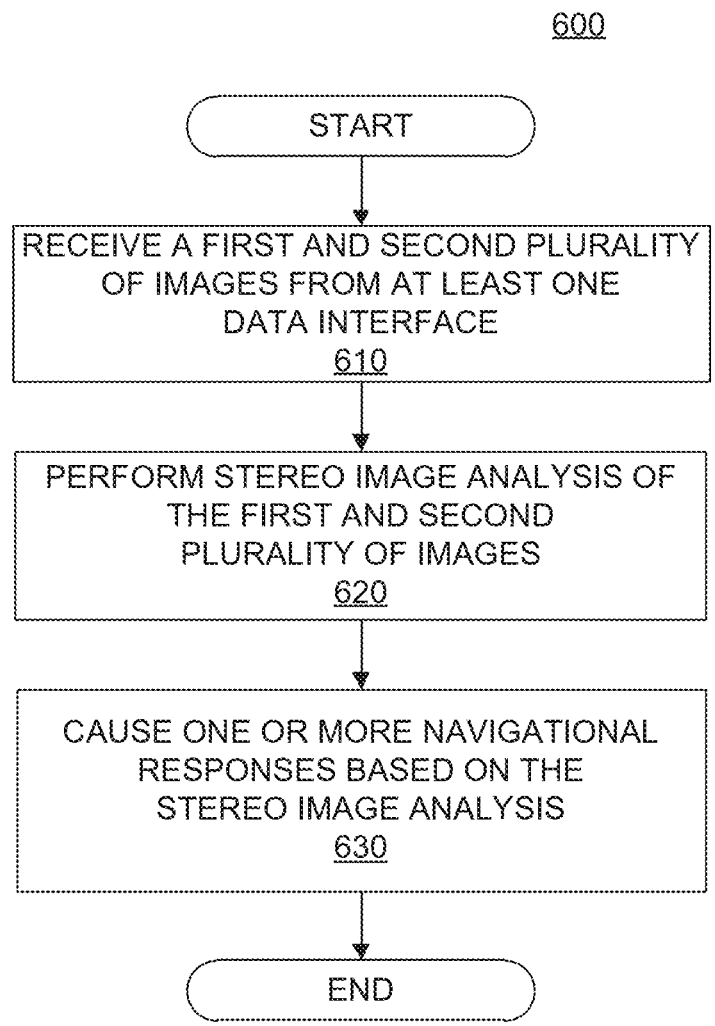
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing if the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
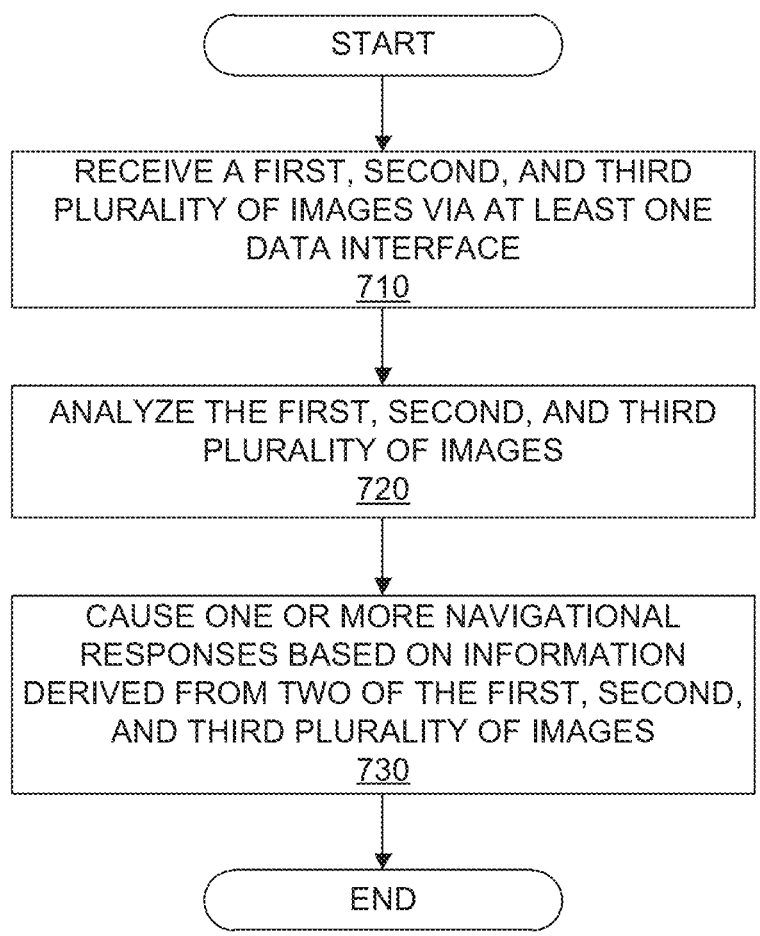
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126 including their respective locations and fields of view 202, 204, and 206 may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position, relative velocity, and/or relative acceleration between vehicle 200 and an object detected within any of the first, second, and third plurality of images. Multiple navigational responses may occur simultaneously, in sequence, or any combination thereof Sparse Road Model for Autonomous Vehicle Navigation In some embodiments, the disclosed systems and methods may use a sparse map for autonomous vehicle navigation. In particular, the sparse map may be for autonomous vehicle navigation along a road segment. For example, the sparse map may provide sufficient information for navigating an autonomous vehicle without storing and/or updating a large quantity of data. As discussed below in further detail, an autonomous vehicle may use the sparse map to navigate one or more roads based on one or more stored trajectories.

Sparse Map for Autonomous Vehicle Navigation

In some embodiments, the disclosed systems and methods may generate a sparse map for autonomous vehicle navigation. For example, the sparse map may provide sufficient information for navigation without requiring excessive data storage or data transfer rates. As discussed below in further detail, a vehicle (which may be an autonomous vehicle) may use the sparse map to navigate one or more roads. For example, in some embodiments, the sparse map may include data related to a road and potentially landmarks along the road that may be sufficient for vehicle navigation, but which also exhibit small data footprints. For example, the sparse data maps described in detail below may require significantly less storage space and data transfer bandwidth as compared with digital maps including detailed map information, such as image data collected along a road.

For example, rather than storing detailed representations of a road segment, the sparse data map may store three-dimensional polynomial representations of preferred vehicle paths along a road. These paths may require very little data storage space. Further, in the described sparse data maps, landmarks may be identified and included in the sparse map road model to aid in navigation. These landmarks may be located at any spacing suitable for enabling vehicle navigation, but in some cases, such landmarks need not be identified and included in the model at high densities and short spacings. Rather, in some cases, navigation may be possible based on landmarks that are spaced apart by at least 50 meters, at least 100 meters, at least 500 meters, at least 1 kilometer, or at least 2 kilometers. As will be discussed in more detail in other sections, the sparse map may be generated based on data collected or measured by vehicles equipped with various sensors and devices, such as image capture devices, Global Positioning System sensors, motion sensors, etc., as the vehicles travel along roadways. In some cases, the sparse map may be generated based on data collected during multiple drives of one or more vehicles along a particular roadway. Generating a sparse map using multiple drives of one or more vehicles may be referred to as "crowdsourcing" a sparse map.

Consistent with disclosed embodiments, an autonomous vehicle system may use a sparse map for navigation. For example, the disclosed systems and methods may distribute a sparse map for generating a road navigation model for an autonomous vehicle and may navigate an autonomous vehicle along a road segment using a sparse map and/or a generated road navigation model. Sparse maps consistent with the present disclosure may include one or more three-dimensional contours that may represent predetermined trajectories that autonomous vehicles may traverse as they move along associated road segments.

Sparse maps consistent with the present disclosure may also include data representing one or more road features. Such road features may include recognized landmarks, road signature profiles, and any other road-related features useful in navigating a vehicle. Sparse maps consistent with the present disclosure may enable autonomous navigation of a vehicle based on relatively small amounts of data included in the sparse map. For example, rather than including detailed representations of a road, such as road edges, road curvature, images associated with road segments, or data detailing other physical features associated with a road segment, the disclosed embodiments of the sparse map may require relatively little storage space (and relatively little bandwidth when portions of the sparse map are transferred to a vehicle) but may still adequately provide for autonomous vehicle navigation. The small data footprint of the disclosed sparse maps, discussed in further detail below, may be achieved in some embodiments by storing representations of road-related elements that require small amounts of data but still enable autonomous navigation.

For example, rather than storing detailed representations of various aspects of a road, the disclosed sparse maps may store polynomial representations of one or more trajectories that a vehicle may follow along the road. Thus, rather than storing (or having to transfer) details regarding the physical nature of the road to enable navigation along the road, using the disclosed sparse maps, a vehicle may be navigated along a particular road segment without, in some cases, having to interpret physical aspects of the road, but rather, by aligning its path of travel with a trajectory (e.g., a polynomial spline) along the particular road segment. In this way, the vehicle may be navigated based mainly upon the stored trajectory (e.g., a polynomial spline) that may require much less storage space than an approach involving storage of roadway images, road parameters, road layout, etc.

In addition to the stored polynomial representations of trajectories along a road segment, the disclosed sparse maps may also include small data objects that may represent a road feature. In some embodiments, the small data objects may include digital signatures, which are derived from a digital image (or a digital signal) that was obtained by a sensor (e.g., a camera or other sensor, such as a suspension sensor) onboard a vehicle traveling along the road segment. The digital signature may have a reduced size relative to the signal that was acquired by the sensor. In some embodiments, the digital signature may be created to be compatible with a classifier function that is configured to detect and to identify the road feature from the signal that is acquired by the sensor, for example, during a subsequent drive. In some embodiments, a digital signature may be created such that the digital signature has a footprint that is as small as possible, while retaining the ability to correlate or match the road feature with the stored signature based on an image (or a digital signal generated by a sensor, if the stored signature is not based on an image and/or includes other data) of the road feature that is captured by a camera onboard a vehicle traveling along the same road segment at a subsequent time.

In some embodiments, a size of the data objects may be further associated with a uniqueness of the road feature. For example, for a road feature that is detectable by a camera onboard a vehicle, and where the camera system onboard the vehicle is coupled to a classifier that is capable of distinguishing the image data corresponding to that road feature as being associated with a particular type of road feature, for example, a road sign, and where such a road sign is locally unique in that area (e.g., there is no identical road sign or road sign of the same type nearby), it may be sufficient to store data indicating the type of the road feature and its location.

As will be discussed in further detail below, road features (e.g., landmarks along a road segment) may be stored as small data objects that may represent a road feature in relatively few bytes, while at the same time providing sufficient information for recognizing and using such a feature for navigation. In one example, a road sign may be identified as a recognized landmark on which navigation of a vehicle may be based. A representation of the road sign may be stored in the sparse map to include, e.g., a few bytes of data indicating a type of landmark (e.g., a stop sign) and a few bytes of data indicating a location of the landmark (e.g., coordinates). Navigating based on such data-light representations of the landmarks (e.g., using representations sufficient for locating, recognizing, and navigating based upon the landmarks) may provide a desired level of navigational functionality associated with sparse maps without significantly increasing the data overhead associated with the sparse maps. This lean representation of landmarks (and other road features) may take advantage of the sensors and processors included onboard such vehicles that are configured to detect, identify, and/or classify certain road features.

When, for example, a sign or even a particular type of a sign is locally unique (e.g., when there is no other sign or no other sign of the same type) in a given area, the sparse map may use data indicating a type of a landmark (a sign or a specific type of sign), and during navigation (e.g., autonomous navigation) when a camera onboard an autonomous vehicle captures an image of the area including a sign (or of a specific type of sign), the processor may process the image, detect the sign (if indeed present in the image), classify the image as a sign (or as a specific type of sign), and correlate the location of the image with the location of the sign as stored in the sparse map.

Generating a Sparse Map

In some embodiments, a sparse map may include at least one line representation of a road surface feature extending along a road segment and a plurality of landmarks associated with the road segment. In certain aspects, the sparse map may be generated via "crowdsourcing," for example, through image analysis of a plurality of images acquired as one or more vehicles traverse the road segment.

Figure 8:
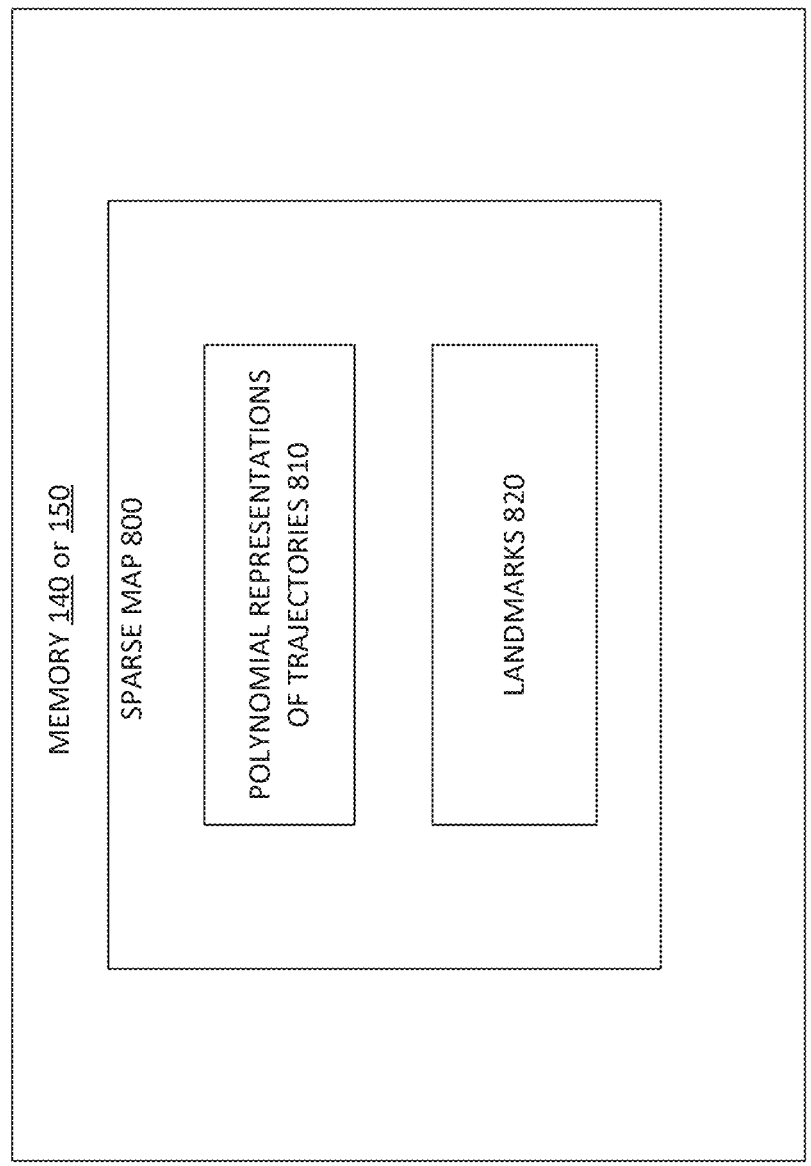
FIG. 8 shows a sparse map for providing autonomous vehicle navigation, consistent with the disclosed embodiments.

FIG. 8 shows a sparse map 800 that one or more vehicles, e.g., vehicle 200 (which may be an autonomous vehicle), may access for providing autonomous vehicle navigation. Sparse map 800 may be stored in a memory, such as memory 140 or 150. Such memory devices may include any types of non-transitory storage devices or computer-readable media. For example, in some embodiments, memory 140 or 150 may include hard drives, compact discs, flash memory, magnetic based memory devices, optical based memory devices, etc. In some embodiments, sparse map 800 may be stored in a database (e.g., map database 160) that may be stored in memory 140 or 150, or other types of storage devices.

In some embodiments, sparse map 800 may be stored on a storage device or a non-transitory computer-readable medium provided onboard vehicle 200 (e.g., a storage device included in a navigation system onboard vehicle 200). A processor (e.g., processing unit 110) provided on vehicle 200 may access sparse map 800 stored in the storage device or computer-readable medium provided onboard vehicle 200 in order to generate navigational instructions for guiding the autonomous vehicle 200 as the vehicle traverses a road segment.

Sparse map 800 need not be stored locally with respect to a vehicle, however. In some embodiments, sparse map 800 may be stored on a storage device or computer-readable medium provided on a remote server that communicates with vehicle 200 or a device associated with vehicle 200. A processor (e.g., processing unit 110) provided on vehicle 200 may receive data included in sparse map 800 from the remote server and may execute the data for guiding the autonomous driving of vehicle 200. In such embodiments, the remote server may store all of sparse map 800 or only a portion thereof. Accordingly, the storage device or computer-readable medium provided onboard vehicle 200 and/or onboard one or more additional vehicles may store the remaining portion(s) of sparse map 800.

Furthermore, in such embodiments, sparse map 800 may be made accessible to a plurality of vehicles traversing various road segments (e.g., tens, hundreds, thousands, or millions of vehicles, etc.). It should be noted also that sparse map 800 may include multiple sub-maps. For example, in some embodiments, sparse map 800 may include hundreds, thousands, millions, or more, of sub-maps that may be used in navigating a vehicle. Such sub-maps may be referred to as local maps, and a vehicle traveling along a roadway may access any number of local maps relevant to a location in which the vehicle is traveling. The local map sections of sparse map 800 may be stored with a Global Navigation Satellite System (GNSS) key as an index to the database of sparse map 800. Thus, while computation of steering angles for navigating a host vehicle in the present system may be performed without reliance upon a GNSS position of the host vehicle, road features, or landmarks, such GNSS information may be used for retrieval of relevant local maps.

In general, sparse map 800 may be generated based on data collected from one or more vehicles as they travel along roadways. For example, using sensors aboard the one or more vehicles (e.g., cameras, speedometers, GPS, accelerometers, etc.), the trajectories that the one or more vehicles travel along a roadway may be recorded, and the polynomial representation of a preferred trajectory for vehicles making subsequent trips along the roadway may be determined based on the collected trajectories travelled by the one or more vehicles. Similarly, data collected by the one or more vehicles may aid in identifying potential landmarks along a particular roadway. Data collected from traversing vehicles may also be used to identify road profile information, such as road width profiles, road roughness profiles, traffic line spacing profiles, road conditions, etc. Using the collected information, sparse map 800 may be generated and distributed (e.g., for local storage or via on-the-fly data transmission) for use in navigating one or more autonomous vehicles. However, in some embodiments, map generation may not end upon initial generation of the map. As will be discussed in greater detail below, sparse map 800 may be continuously or periodically updated based on data collected from vehicles as those vehicles continue to traverse roadways included in sparse map 800.

Data recorded in sparse map 800 may include position information based on Global Positioning System (GPS) data. For example, location information may be included in sparse map 800 for various map elements, including, for example, landmark locations, road profile locations, etc. Locations for map elements included in sparse map 800 may be obtained using GPS data collected from vehicles traversing a roadway. For example, a vehicle passing an identified landmark may determine a location of the identified landmark using GPS position information associated with the vehicle and a determination of a location of the identified landmark relative to the vehicle (e.g., based on image analysis of data collected from one or more cameras on board the vehicle). Such location determinations of an identified landmark (or any other feature included in sparse map 800) may be repeated as additional vehicles pass the location of the identified landmark. Some or all of the additional location determinations may be used to refine the location information stored in sparse map 800 relative to the identified landmark. For example, in some embodiments, multiple position measurements relative to a particular feature stored in sparse map 800 may be averaged together. Any other mathematical operations, however, may also be used to refine a stored location of a map element based on a plurality of determined locations for the map element.

The sparse map of the disclosed embodiments may enable autonomous navigation of a vehicle using relatively small amounts of stored data. In some embodiments, sparse map 800 may have a data density (e.g., including data representing the target trajectories, landmarks, and any other stored road features) of less than 2 MB per kilometer of roads, less than 1 MB per kilometer of roads, less than 500 kB per kilometer of roads, or less than 100 kB per kilometer of roads. In some embodiments, the data density of sparse map 800 may be less than 10 kB per kilometer of roads or even less than 2 kB per kilometer of roads (e.g., 1.6 kB per kilometer), or no more than 1.0 kB per kilometer of roads, or no more than 20 kB per kilometer of roads. In some embodiments, most, if not all, of the roadways of the United States may be navigated autonomously using a sparse map having a total of 4 GB or less of data. These data density values may represent an average over an entire sparse map 800, over a local map within sparse map 800, and/or over a particular road segment within sparse map 800.

As noted, sparse map 800 may include representations of a plurality of target trajectories 810 for guiding autonomous driving or navigation along a road segment. Such target trajectories may be stored as three-dimensional splines. The target trajectories stored in sparse map 800 may be determined based on two or more reconstructed trajectories of prior traversals of vehicles along a particular road segment, for example. A road segment may be associated with a single target trajectory or multiple target trajectories. For example, on a two lane road, a first target trajectory may be stored to represent an intended path of travel along the road in a first direction, and a second target trajectory may be stored to represent an intended path of travel along the road in another direction (e.g., opposite to the first direction). Additional target trajectories may be stored with respect to a particular road segment. For example, on a multi-lane road one or more target trajectories may be stored representing intended paths of travel for vehicles in one or more lanes associated with the multi-lane road. In some embodiments, each lane of a multi-lane road may be associated with its own target trajectory. In other embodiments, there may be fewer target trajectories stored than lanes present on a multi-lane road. In such cases, a vehicle navigating the multi-lane road may use any of the stored target trajectories to guides its navigation by taking into account an amount of lane offset from a lane for which a target trajectory is stored (e.g., if a vehicle is traveling in the left most lane of a three lane highway, and a target trajectory is stored only for the middle lane of the highway, the vehicle may navigate using the target trajectory of the middle lane by accounting for the amount of lane offset between the middle lane and the left-most lane when generating navigational instructions).

In some embodiments, the target trajectory may represent an ideal path that a vehicle should take as the vehicle travels. The target trajectory may be located, for example, at an approximate center of a lane of travel. In other cases, the target trajectory may be located elsewhere relative to a road segment. For example, a target trajectory may approximately coincide with a center of a road, an edge of a road, or an edge of a lane, etc. In such cases, navigation based on the target trajectory may include a determined amount of offset to be maintained relative to the location of the target trajectory. Moreover, in some embodiments, the determined amount of offset to be maintained relative to the location of the target trajectory may differ based on a type of vehicle (e.g., a passenger vehicle including two axles may have a different offset from a truck including more than two axles along at least a portion of the target trajectory).

Sparse map 800 may also include data relating to a plurality of predetermined landmarks 820 associated with particular road segments, local maps, etc. As discussed in greater detail below, these landmarks may be used in navigation of the autonomous vehicle. For example, in some embodiments, the landmarks may be used to determine a current position of the vehicle relative to a stored target trajectory. With this position information, the autonomous vehicle may be able to adjust a heading direction to match a direction of the target trajectory at the determined location.

The plurality of landmarks 820 may be identified and stored in sparse map 800 at any suitable spacing. In some embodiments, landmarks may be stored at relatively high densities (e.g., every few meters or more). In some embodiments, however, significantly larger landmark spacing values may be employed. For example, in sparse map 800, identified (or recognized) landmarks may be spaced apart by 10 meters, 20 meters, 50 meters, 100 meters, 1 kilometer, or 2 kilometers. In some cases, the identified landmarks may be located at distances of even more than 2 kilometers apart.

Between landmarks, and therefore between determinations of vehicle position relative to a target trajectory, the vehicle may navigate based on dead reckoning in which the vehicle uses sensors to determine its ego motion and estimate its position relative to the target trajectory. Because errors may accumulate during navigation by dead reckoning, over time the position determinations relative to the target trajectory may become increasingly less accurate. The vehicle may use landmarks occurring in sparse map 800 (and their known locations) to remove the dead reckoning-induced errors in position determination. In this way, the identified landmarks included in sparse map 800 may serve as navigational anchors from which an accurate position of the vehicle relative to a target trajectory may be determined. Because a certain amount of error may be acceptable in position location, an identified landmark need not always be available to an autonomous vehicle. Rather, suitable navigation may be possible even based on landmark spacings, as noted above, of 10 meters, 20 meters, 50 meters, 100 meters, 500 meters, 1 kilometer, 2 kilometers, or more. In some embodiments, a density of 1 identified landmark every 1 km of road may be sufficient to maintain a longitudinal position determination accuracy within 1 m. Thus, not every potential landmark appearing along a road segment need be stored in sparse map 800.

Moreover, in some embodiments, lane markings may be used for localization of the vehicle during landmark spacings. By using lane markings during landmark spacings, the accumulation of during navigation by dead reckoning may be minimized.

Figure 9A:
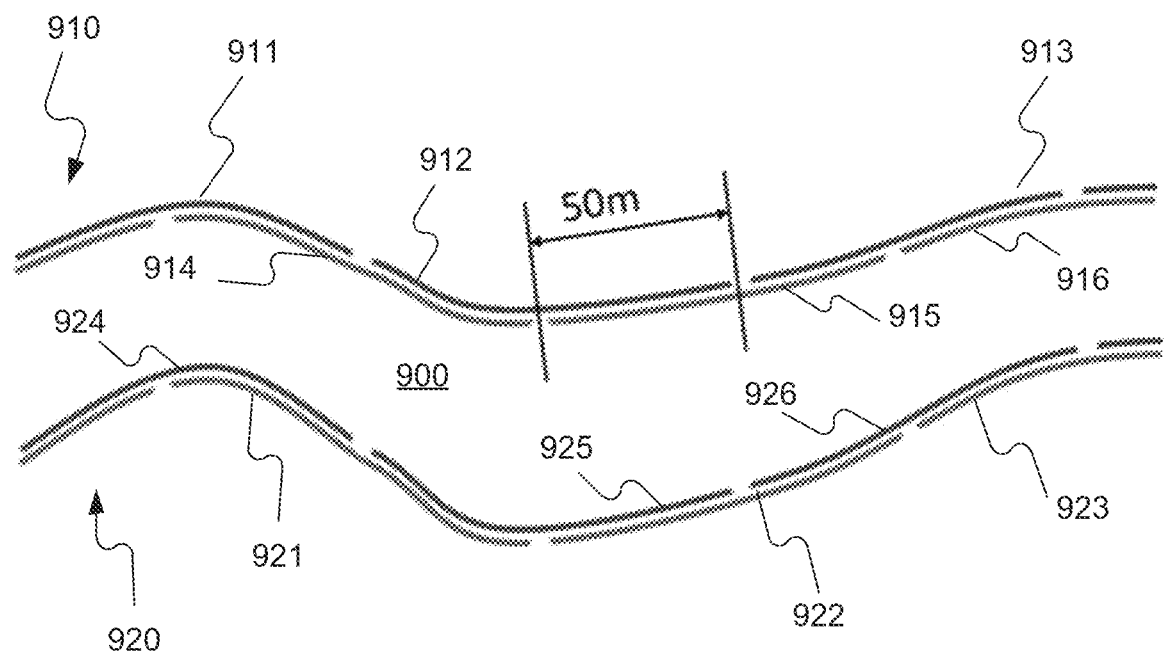
FIG. 9A illustrates a polynomial representation of a portions of a road segment consistent with the disclosed embodiments.

In addition to target trajectories and identified landmarks, sparse map 800 may include information relating to various other road features. For example, FIG. 9A illustrates a representation of curves along a particular road segment that may be stored in sparse map 800. In some embodiments, a single lane of a road may be modeled by a three-dimensional polynomial description of left and right sides of the road. Such polynomials representing left and right sides of a single lane are shown in FIG. 9A. Regardless of how many lanes a road may have, the road may be represented using polynomials in a way similar to that illustrated in FIG. 9A. For example, left and right sides of a multi-lane road may be represented by polynomials similar to those shown in FIG. 9A, and intermediate lane markings included on a multi-lane road (e.g., dashed markings representing lane boundaries, solid yellow lines representing boundaries between lanes traveling in different directions, etc.) may also be represented using polynomials such as those shown in FIG. 9A.

As shown in FIG. 9A, a lane 900 may be represented using polynomials (e.g., a first order, second order, third order, or any suitable order polynomials). For illustration, lane 900 is shown as a two-dimensional lane and the polynomials are shown as two-dimensional polynomials. As depicted in FIG. 9A, lane 900 includes a left side 910 and a right side 920. In some embodiments, more than one polynomial may be used to represent a location of each side of the road or lane boundary. For example, each of left side 910 and right side 920 may be represented by a plurality of polynomials of any suitable length. In some cases, the polynomials may have a length of about 100 m, although other lengths greater than or less than 100 m may also be used. Additionally, the polynomials can overlap with one another in order to facilitate seamless transitions in navigating based on subsequently encountered polynomials as a host vehicle travels along a roadway. For example, each of left side 910 and right side 920 may be represented by a plurality of third order polynomials separated into segments of about 100 meters in length (an example of the first predetermined range), and overlapping each other by about 50 meters. The polynomials representing the left side 910 and the right side 920 may or may not have the same order. For example, in some embodiments, some polynomials may be second order polynomials, some may be third order polynomials, and some may be fourth order polynomials.

In the example shown in FIG. 9A, left side 910 of lane 900 is represented by two groups of third order polynomials. The first group includes polynomial segments 911, 912, and 913.

The second group includes polynomial segments 914, 915, and 916. The two groups, while substantially parallel to each other, follow the locations of their respective sides of the road. Polynomial segments 911, 912, 913, 914, 915, and 916 have a length of about 100 meters and overlap adjacent segments in the series by about 50 meters. As noted previously, however, polynomials of different lengths and different overlap amounts may also be used. For example, the polynomials may have lengths of 500 m, 1 km, or more, and the overlap amount may vary from 0 to 50 m, 50 m to 100 m, or greater than 100 m. Additionally, while FIG. 9A is shown as representing polynomials extending in 2D space (e.g., on the surface of the paper), it is to be understood that these polynomials may represent curves extending in three dimensions (e.g., including a height component) to represent elevation changes in a road segment in addition to X-Y curvature. In the example shown in FIG. 9A, right side 920 of lane 900 is further represented by a first group having polynomial segments 921, 922, and 923 and a second group having polynomial segments 924, 925, and 926.

Figure 9B:
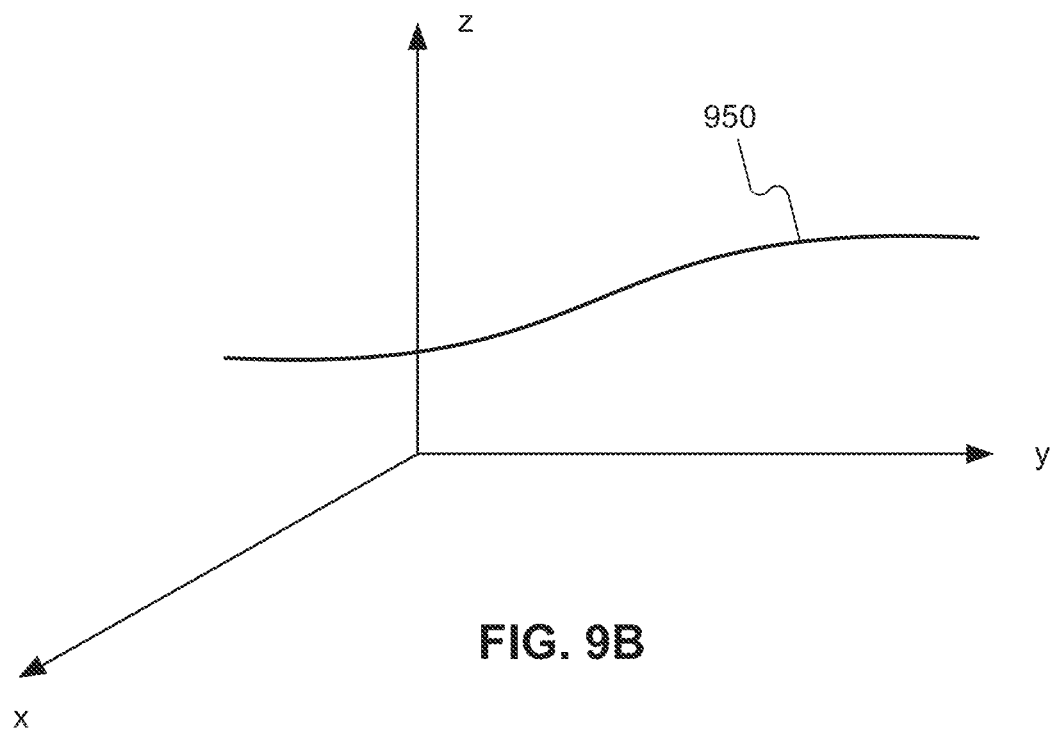
FIG. 9B illustrates a curve in three-dimensional space representing a target trajectory of a vehicle, for a particular road segment, included in a sparse map consistent with the disclosed embodiments.

Returning to the target trajectories of sparse map 800, FIG. 9B shows a three-dimensional polynomial representing a target trajectory for a vehicle traveling along a particular road segment. The target trajectory represents not only the X-Y path that a host vehicle should travel along a particular road segment, but also the elevation change that the host vehicle will experience when traveling along the road segment. Thus, each target trajectory in sparse map 800 may be represented by one or more three-dimensional polynomials, like the three-dimensional polynomial 950 shown in FIG. 9B. Sparse map 800 may include a plurality of trajectories (e.g., millions or billions or more to represent trajectories of vehicles along various road segments along roadways throughout the world). In some embodiments, each target trajectory may correspond to a spline connecting three-dimensional polynomial segments.

Regarding the data footprint of polynomial curves stored in sparse map 800, in some embodiments, each third degree polynomial may be represented by four parameters, each requiring four bytes of data. Suitable representations may be obtained with third degree polynomials requiring about 192 bytes of data for every 100 m. This may translate to approximately 200 kB per hour in data usage/transfer requirements for a host vehicle traveling approximately 100 km/hr.

Sparse map 800 may describe the lanes network using a combination of geometry descriptors and meta-data. The geometry may be described by polynomials or splines as described above. The meta-data may describe the number of lanes, special characteristics (such as a car pool lane), and possibly other sparse labels. The total footprint of such indicators may be negligible.

Accordingly, a sparse map according to embodiments of the present disclosure may include at least one line representation of a road surface feature extending along the road segment, each line representation representing a path along the road segment substantially corresponding with the road surface feature. In some embodiments, as discussed above, the at least one line representation of the road surface feature may include a spline, a polynomial representation, or a curve. Furthermore, in some embodiments, the road surface feature may include at least one of a road edge or a lane marking. Moreover, as discussed below with respect to "crowdsourcing," the road surface feature may be identified through image analysis of a plurality of images acquired as one or more vehicles traverse the road segment.

As previously noted, sparse map 800 may include a plurality of predetermined landmarks associated with a road segment. Rather than storing actual images of the landmarks and relying, for example, on image recognition analysis based on captured images and stored images, each landmark in sparse map 800 may be represented and recognized using less data than a stored, actual image would require. Data representing landmarks may still include sufficient information for describing or identifying the landmarks along a road. Storing data describing characteristics of landmarks, rather than the actual images of landmarks, may reduce the size of sparse map 800.

Figure 10:
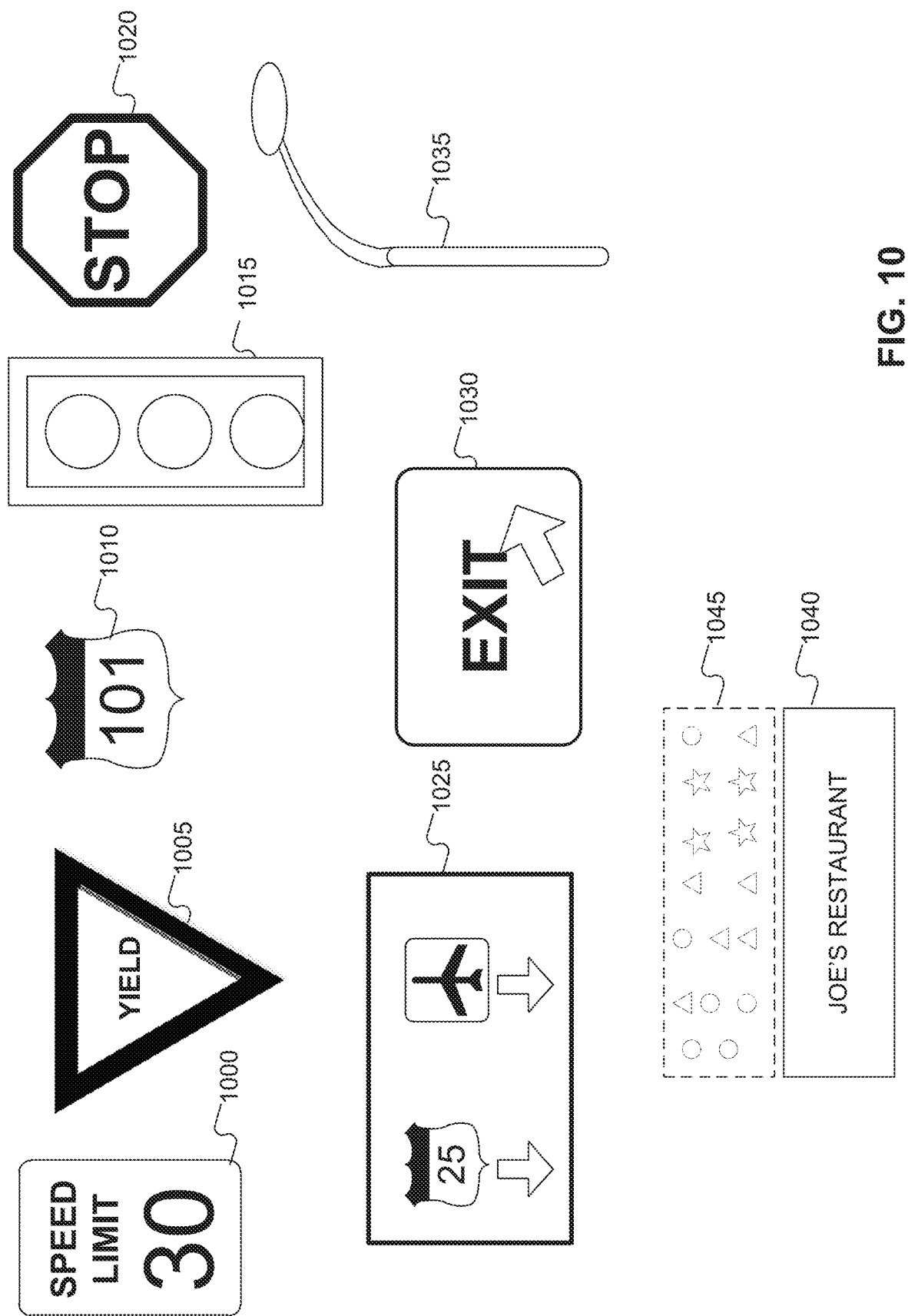
FIG. 10 illustrates example landmarks that may be included in sparse map consistent with the disclosed embodiments.

FIG. 10 illustrates examples of types of landmarks that may be represented in sparse map 800. The landmarks may include any visible and identifiable objects along a road segment. The landmarks may be selected such that they are fixed and do not change often with respect to their locations and/or content. The landmarks included in sparse map 800 may be useful in determining a location of vehicle 200 with respect to a target trajectory as the vehicle traverses a particular road segment. Examples of landmarks may include traffic signs, directional signs, general signs (e.g., rectangular signs), roadside fixtures (e.g., lampposts, reflectors, etc.), and any other suitable category. In some embodiments, lane marks on the road, may also be included as landmarks in sparse map 800.

Examples of landmarks shown in FIG. 10 include traffic signs, directional signs, roadside fixtures, and general signs. Traffic signs may include, for example, speed limit signs (e.g., speed limit sign 1000), yield signs (e.g., yield sign 1005), route number signs (e.g., route number sign 1010), traffic light signs (e.g., traffic light sign 1015), stop signs (e.g., stop sign 1020). Directional signs may include a sign that includes one or more arrows indicating one or more directions to different places. For example, directional signs may include a highway sign 1025 having arrows for directing vehicles to different roads or places, an exit sign 1030 having an arrow directing vehicles off a road, etc. Accordingly, at least one of the plurality of landmarks may include a road sign.

General signs may be unrelated to traffic. For example, general signs may include billboards used for advertisement, or a welcome board adjacent a border between two countries, states, counties, cities, or towns. FIG. 10 shows a general sign 1040 ("Joe's Restaurant"). Although general sign 1040 may have a rectangular shape, as shown in FIG. 10, general sign 1040 may have other shapes, such as square, circle, triangle, etc.

Landmarks may also include roadside fixtures. Roadside fixtures may be objects that are not signs, and may not be related to traffic or directions. For example, roadside fixtures may include lampposts (e.g., lamppost 1035), power line posts, traffic light posts, etc.

Landmarks may also include beacons that may be specifically designed for usage in an autonomous vehicle navigation system. For example, such beacons may include stand-alone structures placed at predetermined intervals to aid in navigating a host vehicle. Such beacons may also include visual/graphical information added to existing road signs (e.g., icons, emblems, bar codes, etc.) that may be identified or recognized by a vehicle traveling along a road segment. Such beacons may also include electronic components. In such embodiments, electronic beacons (e.g., RFID tags, etc.) may be used to transmit non-visual information to a host vehicle. Such information may include, for example, landmark identification and/or landmark location information that a host vehicle may use in determining its position along a target trajectory.

In some embodiments, the landmarks included in sparse map 800 may be represented by a data object of a predetermined size. The data representing a landmark may include any suitable parameters for identifying a particular landmark. For example, in some embodiments, landmarks stored in sparse map 800 may include parameters such as a physical size of the landmark (e.g., to support estimation of distance to the landmark based on a known size/scale), a distance to a previous landmark, lateral offset, height, a type code (e.g., a landmark type what type of directional sign, traffic sign, etc.), a UPS coordinate (e.g., to support global localization), and any other suitable parameters. Each parameter may be associated with a data size. For example, a landmark size may be stored using κ bytes of data. A distance to a previous landmark, a lateral offset, and height may be specified using 12 bytes of data. A type code associated with a landmark such as a directional sign or a traffic sign may require about 2 bytes of data. For general signs, an image signature enabling identification of the general sign may be stored using 50 bytes of data storage. The landmark GPS position may be associated with 16 bytes of data storage. These data sizes for each parameter are examples only, and other data sizes may also be used.

Representing landmarks in sparse map 800 in this manner may offer a lean solution for efficiently representing landmarks in the database. In some embodiments, signs may be referred to as semantic signs and non-semantic signs. A semantic sign may include any class of signs for which there's a standardized meaning (e.g., speed limit signs, warning signs, directional signs, etc.). A non-semantic sign may include any sign that is not associated with a standardized meaning (e.g., general advertising signs, signs identifying business establishments, etc.). For example, each semantic sign may be represented with 38 bytes of data (e.g., 8 bytes for size; 12 bytes for distance to previous landmark, lateral offset, and height; 2 bytes for a type code; and 16 bytes for GPS coordinates). Sparse map 800 may use a tag system to represent landmark types. In some cases, each traffic sign or directional sign may be associated with its own tag, which may be stored in the database as part of the landmark identification. For example, the database may include on the order of 1000 different tags to represent various traffic signs and on the order of about 10000 different tags to represent directional signs. Of course, any suitable number of tags may be used, and additional tags may be created as needed. General purpose signs may be represented in some embodiments using less than about 100 bytes (e.g., about 86 bytes including 8 bytes for size; 12 bytes for distance to previous landmark, lateral offset, and height; 50 bytes for an image signature; and 16 bytes for GPS coordinates).

Thus, for semantic road signs not requiring an image signature, the data density impact to sparse map 800, even at relatively high landmark densities of about 1 per 50 m, may be on the order of about 760 bytes per kilometer (e.g., 20 landmarks per km×38 bytes per landmark=760 bytes). Even for general purpose signs including an image signature component, the data density impact is about 1.72 kB per km (e.g., 20 landmarks per km×86 bytes per landmark=1,720 bytes). For semantic road signs, this equates to about 76 kB per hour of data usage for a vehicle traveling 100 km/hr. For general purpose signs, this equates to about 170 kB per hour for a vehicle traveling 100 km/hr.

In some embodiments, a generally rectangular object, such as a rectangular sign, may be represented in sparse map 800 by no more than 100 bytes of data. The representation of the generally rectangular object (e.g., general sign 1040) in sparse map 800 may include a condensed image signature (e.g., condensed image signature 1045) associated with the generally rectangular object. This condensed image signature may be used, for example, to aid in identification of a general purpose sign, for example, as a recognized landmark. Such a condensed image signature (e.g., image information derived from actual image data representing an object) may avoid a need for storage of an actual image of an object or a need for comparative image analysis performed on actual images in order to recognize landmarks.

Referring to FIG. 10, sparse map 800 may include or store a condensed image signature 1045 associated with a general sign 1040, rather than an actual image of general sign 1040. For example, after an image capture device (e.g., image capture device 122, 124, or 126) captures an image of general sign 1040, a processor (e.g., image processor 190 or any other processor that can process images either aboard or remotely located relative to a host vehicle) may perform an image analysis to extract/create condensed image signature 1045 that includes a unique signature or pattern associated with general sign 1040. In one embodiment, condensed image signature 1045 may include a shape, color pattern, a brightness pattern, or any other feature that may be extracted from the image of general sign 1040 for describing general sign 1040.

For example, in FIG. 10, the circles, triangles, and stars shown in condensed image signature 1045 may represent areas of different colors. The pattern represented by the circles, triangles, and stars may be stored in sparse map 800, e.g., within the 50 bytes designated to include an image signature. Notably, the circles, triangles, and stars are not necessarily meant to indicate that such shapes are stored as part of the image signature. Rather, these shapes are meant to conceptually represent recognizable areas having discernible color differences, textual areas, graphical shapes, or other variations in characteristics that may be associated with a general purpose sign. Such condensed image signatures can be used to identify a landmark in the form of a general sign. For example, the condensed image signature can be used to perform a same-not-same analysis based on a comparison of a stored condensed image signature with image data captured, for example, using a camera onboard an autonomous vehicle.

Accordingly, the plurality of landmarks may be identified through image analysis of the plurality of images acquired as one or more vehicles traverse the road segment. As explained below with respect to "crowdsourcing," in some embodiments, the image analysis to identify the plurality of landmarks may include accepting potential landmarks when a ratio of images in which the landmark does appear to images in which the landmark does not appear exceeds a threshold. Furthermore, in some embodiments, the image analysis to identify the plurality of landmarks may include rejecting potential landmarks when a ratio of images in which the landmark does not appear to images in which the landmark does appear exceeds a threshold.

Figure 11A:
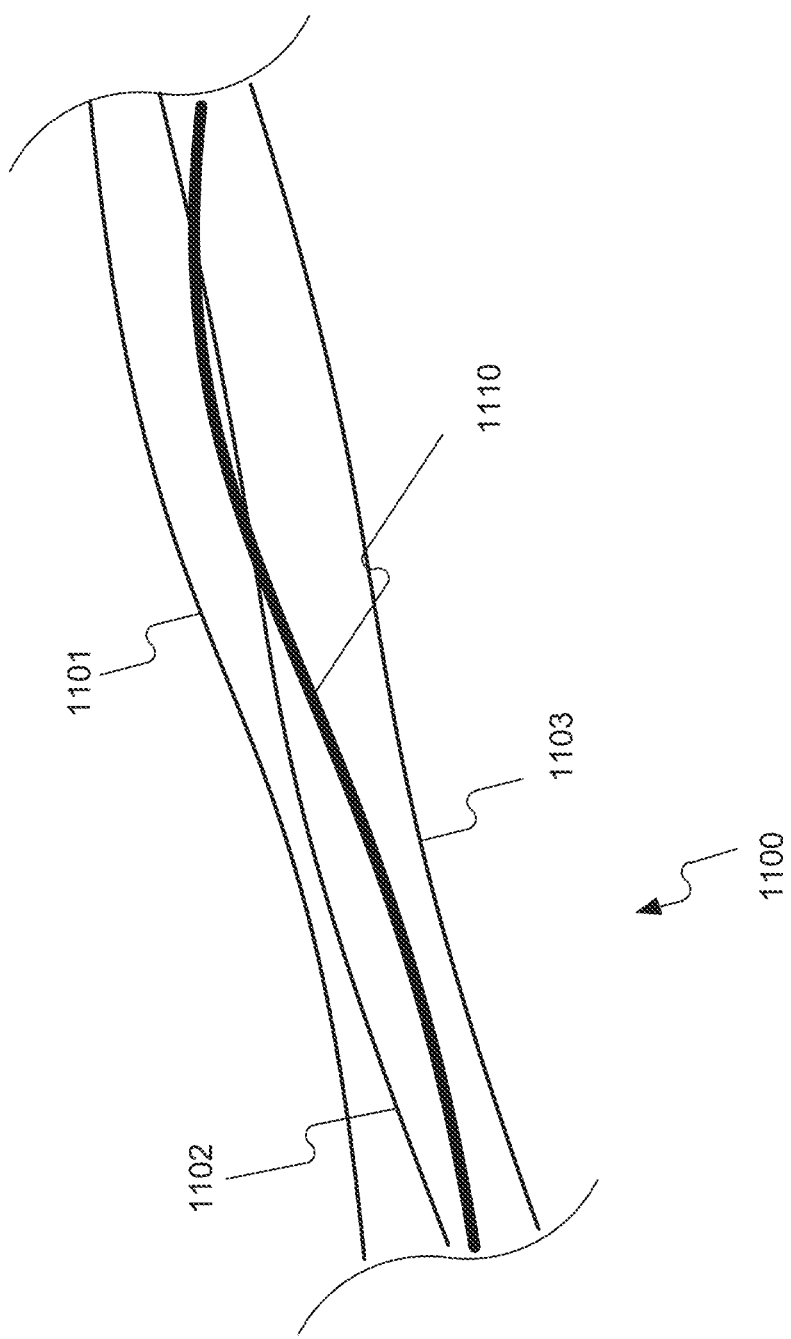
FIG. 11A shows polynomial representations of trajectories consistent with the disclosed embodiments.

Returning to the target trajectories a host vehicle may use to navigate a particular road segment, FIG. 11A shows polynomial representations trajectories capturing during a process of building or maintaining sparse map 800. A polynomial representation of a target trajectory included in sparse map 800 may be determined based on two or more reconstructed trajectories of prior traversals of vehicles along the same road segment. In some embodiments, the polynomial representation of the target trajectory included in sparse map 800 may be an aggregation of two or more reconstructed trajectories of prior traversals of vehicles along the same road segment. In some embodiments, the polynomial representation of the target trajectory included in sparse map 800 may be an average of the two or more reconstructed trajectories of prior traversals of vehicles along the same road segment. Other mathematical operations may also be used to construct a target trajectory along a road path based on reconstructed trajectories collected from vehicles traversing along a road segment.

As shown in FIG. 11A, a road segment 1100 may be travelled by a number of vehicles 200 at different times. Each vehicle 200 may collect data relating to a path that the vehicle took along the road segment. The path traveled by a particular vehicle may be determined based on camera data, accelerometer information, speed sensor information, and/or GI'S information, among other potential sources. Such data may be used to reconstruct trajectories of vehicles traveling along the road segment, and based on these reconstructed trajectories, a target trajectory (or multiple target trajectories) may be determined for the particular road segment. Such target trajectories may represent a preferred path of a host vehicle (e.g., guided by an autonomous navigation system) as the vehicle travels along the road segment.

In the example shown in FIG. 11A, a first reconstructed trajectory 1101 may be determined based on data received from a first vehicle traversing road segment 1100 at a first time period (e.g., day 1), a second reconstructed trajectory 1102 may be obtained from a second vehicle traversing road segment 1100 at a second time period (e.g., day 2), and a third reconstructed trajectory 1103 may be obtained from a third vehicle traversing road segment 1100 at a third time period (e.g., day 3). Each trajectory 1101, 1102, and 1103 may be represented by a polynomial, such as a three-dimensional polynomial. It should be noted that in some embodiments, any of the reconstructed trajectories may be assembled onboard the vehicles traversing road segment 1100.

Additionally, or alternatively, such reconstructed trajectories may be determined on a server side based on information received from vehicles traversing road segment 1100. For example, in some embodiments, vehicles 200 may transmit data to one or more servers relating to their motion along road segment 1100 (e.g., steering angle, heading, time, position, speed, sensed road geometry, and/or sensed landmarks, among things). The server may reconstruct trajectories for vehicles 200 based on the received data. The server may also generate a target trajectory for guiding navigation of autonomous vehicle that will travel along the same road segment 1100 at a later time based on the first, second, and third trajectories 1101, 1102, and 1103. While a target trajectory may be associated with a single prior traversal of a road segment, in some embodiments, each target trajectory included in sparse map 800 may be determined based on two or more reconstructed trajectories of vehicles traversing the same road segment. In FIG. 11A, the target trajectory is represented by 1110. In some embodiments, the target trajectory 1110 may be generated based on an average of the first, second, and third trajectories 1101, 1102, and 1103. In some embodiments, the target trajectory 1110 included in sparse map 800 may be an aggregation (e.g., a weighted combination) of two or more reconstructed trajectories.

Figure 11B:
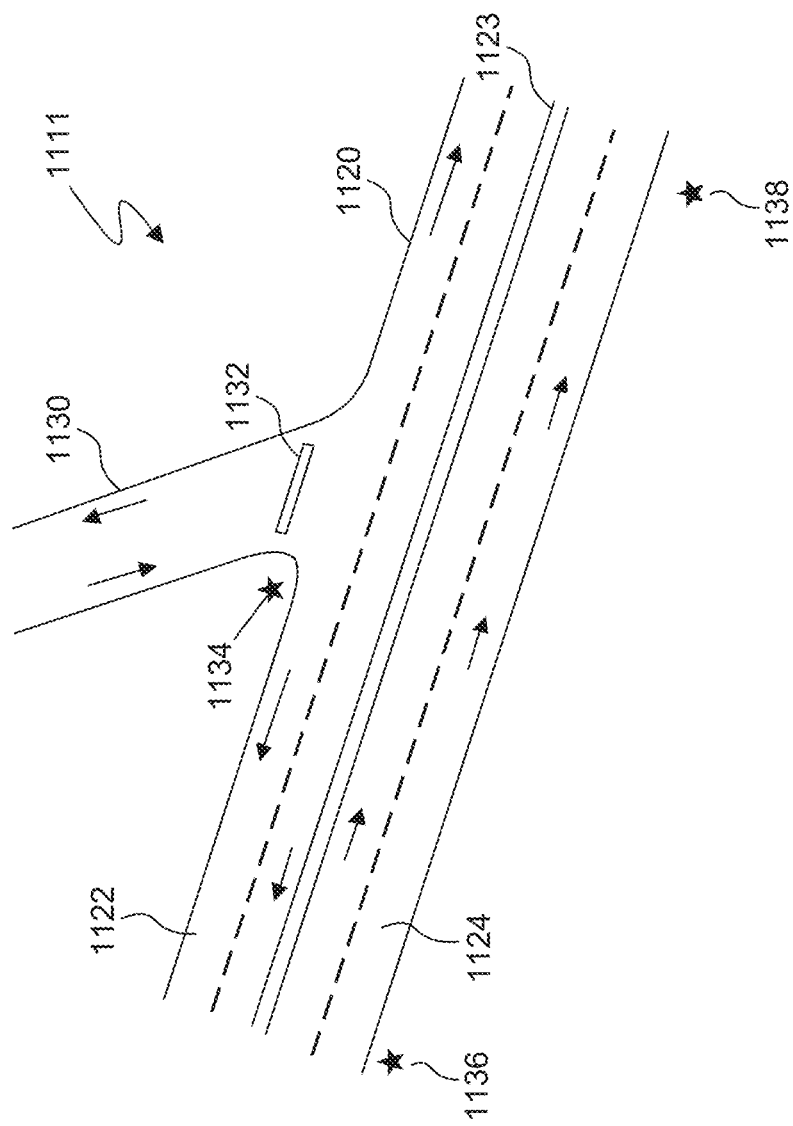
FIGS. 11B and 11C show target trajectories along a multi-lane road consistent with disclosed embodiments.
Figure 11C:
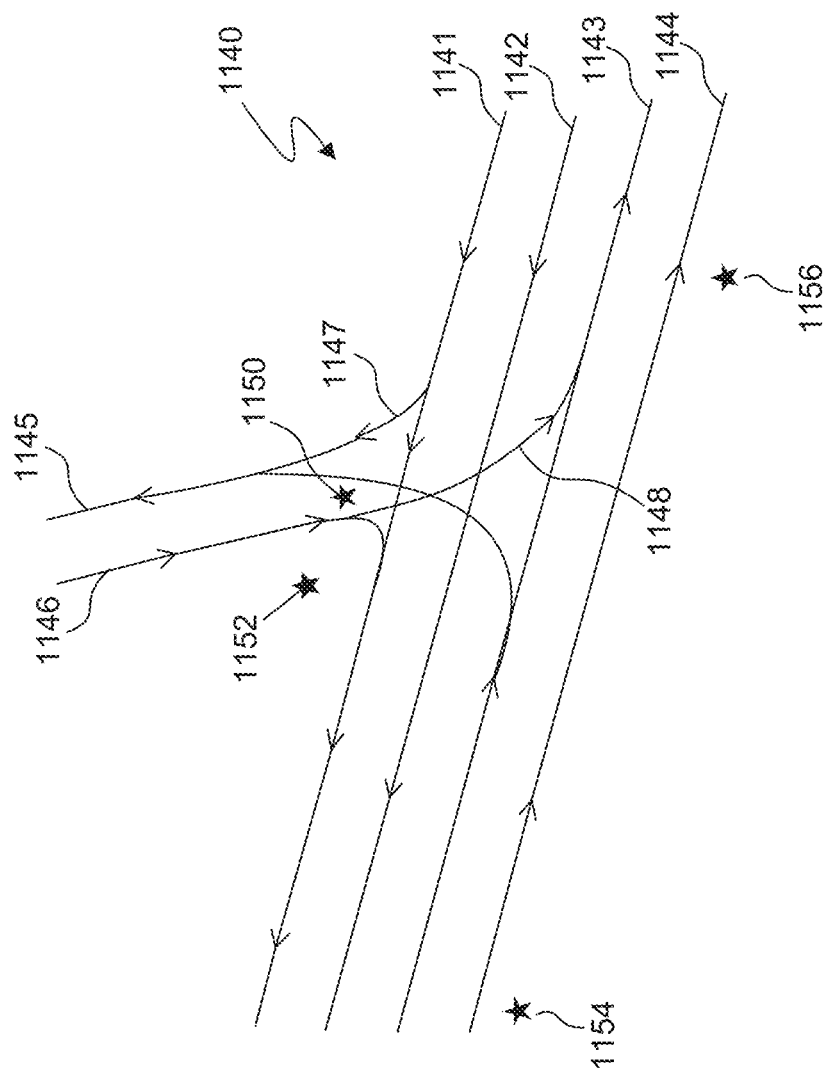

FIGS. 11B and 11C further illustrate the concept of target trajectories associated with road segments present within a geographic region 1111. As shown in FIG. 11B, a first road segment 1120 within geographic region 1111 may include a multilane road, which includes two lanes 1122 designated for vehicle travel in a first direction and two additional lanes 1124 designated for vehicle travel in a second direction opposite to the first direction. Lanes 1122 and lanes 1124 may be separated by a double yellow line 1123. Geographic region 1111 may also include a branching road segment 1130 that intersects with road segment 1120. Road segment 1130 may include a two-lane road, each lane being designated for a different direction of travel. Geographic region 1111 may also include other road features, such as a stop line 1132, a stop sign 1134, a speed limit sign 1136, and a hazard sign 1138.

As shown in FIG. 11C, sparse map 800 may include a local map 1140 including a road model for assisting with autonomous navigation of vehicles within geographic region 1111. For example, local map 1140 may include target trajectories for one or more lanes associated with road segments 1120 and/or 1130 within geographic region 1111. For example, local map 1140 may include target trajectories 1141 and/or 1142 that an autonomous vehicle may access or rely upon when traversing lanes 1122. Similarly, local map 1140 may include target trajectories 1143 and/or 1144 that an autonomous vehicle may access or rely upon when traversing lanes 1124. Further, local map 1140 may include target trajectories 1145 and/or 1146 that an autonomous vehicle may access or rely upon when traversing road segment 1130. Target trajectory 1147 represents a preferred path an autonomous vehicle should follow when transitioning from lanes 1120 (and specifically, relative to target trajectory 1141 associated with a right-most lane of lanes 1120) to road segment 1130 (and specifically, relative to a target trajectory 1145 associated with a first side of road segment 1130. Similarly, target trajectory 1148 represents a preferred path an autonomous vehicle should follow when transitioning from road segment 1130 (and specifically, relative to target trajectory 1146) to a portion of road segment 1124 (and specifically, as shown, relative to a target trajectory 1143 associated with a left lane of lanes 1124.

Sparse map 800 may also include representations of other road-related features associated with geographic region 1111. For example, sparse map 800 may also include representations of one or more landmarks identified in geographic region 1111. Such landmarks may include a first landmark 1150 associated with stop line 1132, a second landmark 1152 associated with stop sign 1134, a third landmark associated with speed limit sign 1154, and a fourth landmark 1156 associated with hazard sign 1138. Such landmarks may be used, for example, to assist an autonomous vehicle in determining its current location relative to any of the shown target trajectories, such that the vehicle may adjust its heading to match a direction of the target trajectory at the determined location.

Figure 11D:
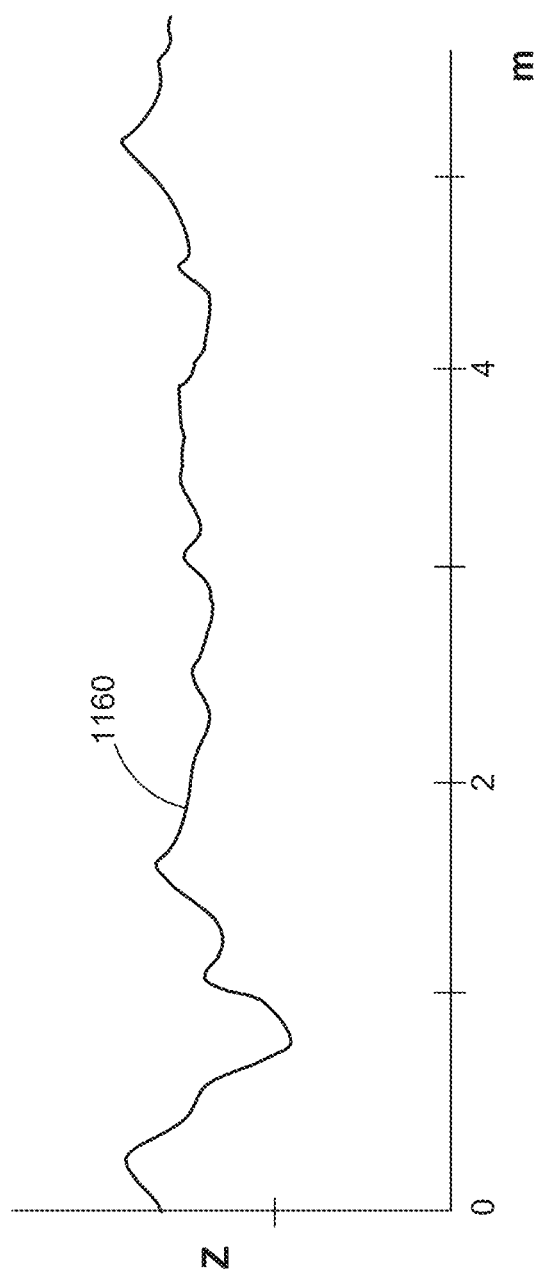
FIG. 11D shows an example road signature profile consistent with disclosed embodiments.

In some embodiments, sparse map 800 may also include road signature profiles. Such road signature profiles may be associated with any discernible/measurable variation in at least one parameter associated with a road. For example, in some cases, such profiles may be associated with variations in road surface information such as variations in surface roughness of a particular road segment, variations in road width over a particular road segment, variations in distances between dashed lines painted along a particular road segment, variations in road curvature along a particular road segment, etc. FIG. 11D shows an example of a road signature profile 1160. While profile 1160 may represent any of the parameters mentioned above, or others, in one example, profile 1160 may represent a measure of road surface roughness, as obtained, for example, by monitoring one or more sensors providing outputs indicative of an amount of suspension displacement as a vehicle travels a particular road segment.

Alternatively or concurrently, profile 1160 may represent variation in road width, as determined based on image data obtained via a camera onboard a vehicle traveling a particular road segment. Such profiles may be useful, for example, in determining a particular location of an autonomous vehicle relative to a particular target trajectory. That is, as it traverses a road segment, an autonomous vehicle may measure a profile associated with one or more parameters associated with the road segment. If the measured profile can be correlated/matched with a predetermined profile that plots the parameter variation with respect to position along the road segment, then the measured and predetermined profiles may be used (e.g., by overlaying corresponding sections of the measured and predetermined profiles) in order to determine a current position along the road segment and, therefore, a current position relative to a target trajectory for the road segment.

In some embodiments, sparse map 800 may include different trajectories based on different characteristics associated with a user of autonomous vehicles, environmental conditions, and/or other parameters relating to driving. For example, in some embodiments, different trajectories may be generated based on different user preferences and/or profiles. Sparse map 800 including such different trajectories may be provided to different autonomous vehicles of different users. For example, some users may prefer to avoid toll roads, while others may prefer to take the shortest or fastest routes, regardless of whether there is a toll road on the route. The disclosed systems may generate different sparse maps with different trajectories based on such different user preferences or profiles. As another example, some users may prefer to travel in a fast moving lane, while others may prefer to maintain a position in the central lane at all times.

Different trajectories may be generated and included in sparse map 800 based on different environmental conditions, such as day and night, snow, rain, fog, etc. Autonomous vehicles driving under different environmental conditions may be provided with sparse map 800 generated based on such different environmental conditions. In some embodiments, cameras provided on autonomous vehicles may detect the environmental conditions, and may provide such information back to a server that generates and provides sparse maps. For example, the server may generate or update an already generated sparse map 800 to include trajectories that may be more suitable or safer for autonomous driving under the detected environmental conditions. The update of sparse map 800 based on environmental conditions may be performed dynamically as the autonomous vehicles are traveling along roads.

Other different parameters relating to driving may also be used as a basis for generating and providing different sparse maps to different autonomous vehicles. For example, when an autonomous vehicle is traveling at a high speed, turns may be tighter. Trajectories associated with specific lanes, rather than roads, may be included in sparse map 800 such that the autonomous vehicle may maintain within a specific lane as the vehicle follows a specific trajectory. When an image captured by a camera onboard the autonomous vehicle indicates that the vehicle has drifted outside of the lane (e.g., crossed the lane mark), an action may be triggered within the vehicle to bring the vehicle back to the designated lane according to the specific trajectory.

Crowdsourcing a Sparse Map

In some embodiments, the disclosed systems and methods may generate a sparse map for autonomous vehicle navigation. For example, disclosed systems and methods may use crowdsourced data for generation of a sparse that one or more autonomous vehicles may use to navigate along a system of roads. As used herein, "crowdsourcing" means that data are received from various vehicles (e.g., autonomous vehicles) travelling on a road segment at different times, and such data are used to generate and/or update the road model. The model may, in turn, be transmitted to the vehicles or other vehicles later travelling along the road segment for assisting autonomous vehicle navigation. The road model may include a plurality of target trajectories representing preferred trajectories that autonomous vehicles should follow as they traverse a road segment. The target trajectories may be the same as a reconstructed actual trajectory collected from a vehicle traversing a road segment, which may be transmitted from the vehicle to a server. In some embodiments, the target trajectories may be different from actual trajectories that one or more vehicles previously took when traversing a road segment. The target trajectories may be generated based on actual trajectories (e.g., through averaging or any other suitable operation).

The vehicle trajectory data that a vehicle may upload to a server may correspond with the actual reconstructed trajectory for the vehicle or may correspond to a recommended trajectory, which may be based on or related to the actual reconstructed trajectory of the vehicle, but may differ from the actual reconstructed trajectory. For example, vehicles may modify their actual, reconstructed trajectories and submit (e.g., recommend) to the server the modified actual trajectories. The road model may use the recommended, modified trajectories as target trajectories for autonomous navigation of other vehicles.

In addition to trajectory information, other information for potential use in building a sparse data map 800 may include information relating to potential landmark candidates. For example, through crowd sourcing of information, the disclosed systems and methods may identify potential landmarks in an environment and refine landmark positions. The landmarks may be used by a navigation system of autonomous vehicles to determine and/or adjust the position of the vehicle along the target trajectories.

The reconstructed trajectories that a vehicle may generate as the vehicle travels along a road may be obtained by any suitable method. In some embodiments, the reconstructed trajectories may be developed by stitching together segments of motion for the vehicle, using, e.g., ego motion estimation (e.g., three dimensional translation and three dimensional rotation of the camera, and hence the body of the vehicle). The rotation and translation estimation may be determined based on analysis of images captured by one or more image capture devices along with information from other sensors or devices, such as inertial sensors and speed sensors. For example, the inertial sensors may include an accelerometer or other suitable sensors configured to measure changes in translation and/or rotation of the vehicle body. The vehicle may include a speed sensor that measures a speed of the vehicle.

In some embodiments, the ego motion of the camera (and hence the vehicle body) may be estimated based on an optical flow analysis of the captured images. An optical flow analysis of a sequence of images identifies movement of pixels from the sequence of images, and based on the identified movement, determines motions of the vehicle. The ego motion may be integrated over time and along the road segment to reconstruct a trajectory associated with the road segment that the vehicle has followed.

Data (e.g., reconstructed trajectories) collected by multiple vehicles in multiple drives along a road segment at different times may be used to construct the road model (e.g., including the target trajectories, etc.) included in sparse data map 800. Data collected by multiple vehicles in multiple drives along a road segment at different times may also be averaged to increase an accuracy of the model. In some embodiments, data regarding the road geometry and/or landmarks may be received from multiple vehicles that travel through the common road segment at different times. Such data received from different vehicles may be combined to generate the road model and/or to update the road model.

The geometry of a reconstructed trajectory (and also a target trajectory) along a road segment may be represented by a curve in three dimensional space, which may be a spline connecting three dimensional polynomials. The reconstructed trajectory curve may be determined from analysis of a video stream or a plurality of images captured by a camera installed on the vehicle. In some embodiments, a location is identified in each frame or image that is a few meters ahead of the current position of the vehicle. This location is where the vehicle is expected to travel to in a predetermined time period. This operation may be repeated frame by frame, and at the same time, the vehicle may compute the camera's ego motion (rotation and translation). At each frame or image, a short range model for the desired path is generated by the vehicle in a reference frame that is attached to the camera. The short range models may be stitched together to obtain a three dimensional model of the road in some coordinate frame, which may be an arbitrary or predetermined coordinate frame. The three dimensional model of the road may then be fitted by a spline, which may include or connect one or more polynomials of suitable orders.

To conclude the short range road model at each frame, one or more detection modules may be used. For example, a bottom-up lane detection module may be used. The bottom-up lane detection module may be useful when lane marks are drawn on the road. This module may look for edges in the image and assembles them together to form the lane marks. A second module may be used together with the bottom-up lane detection module. The second module is an end-to-end deep neural network, which may be trained to predict the correct short range path from an input image. In both modules, the road model may be detected in the image coordinate frame and transformed to a three dimensional space that may be virtually attached to the camera.

Although the reconstructed trajectory modeling method may introduce an accumulation of errors due to the integration of ego motion over a long period of time, which may include a noise component, such errors may be inconsequential as the generated model may provide sufficient accuracy for navigation over a local scale. In addition, it is possible to cancel the integrated error by using external sources of information, such as satellite images or geodetic measurements. For example, the disclosed systems and methods may use a GNSS receiver to cancel accumulated errors. However, the GNSS positioning signals may not be always available and accurate. The disclosed systems and methods may enable a steering application that depends weakly on the availability and accuracy of GNSS positioning. In such systems, the usage of the GNSS signals may be limited. For example, in some embodiments, the disclosed systems may use the GNSS signals for database indexing purposes only.

In some embodiments, the range scale (e.g., local scale) that may be relevant for an autonomous vehicle navigation steering application may be on the order of 50 meters, 100 meters, 200 meters, 300 meters, etc. Such distances may be used, as the geometrical road model is mainly used for two purposes: planning the trajectory ahead and localizing the vehicle on the road model. In some embodiments, the planning task may use the model over a typical range of 40 meters ahead (or any other suitable distance ahead, such as 20 meters, 30 meters, 50 meters), when the control algorithm steers the vehicle according to a target point located 1.3 seconds ahead (or any other time such as 1.5 seconds, 1.7 seconds, 2 seconds, etc.). The localization task uses the road model over a typical range of 60 meters behind the car (or any other suitable distances, such as 50 meters, 100 meters, 150 meters, etc.), according to a method called "tail alignment" described in more detail in another section. The disclosed systems and methods may generate a geometrical model that has sufficient accuracy over particular range, such as 100 meters, such that a planned trajectory will not deviate by more than, for example, 30 cm from the lane center.

As explained above, a three dimensional road model may be constructed from detecting short range sections and stitching them together. The stitching may be enabled by computing a six degree ego motion model, using the videos and/or images captured by the camera, data from the inertial sensors that reflect the motions of the vehicle, and the host vehicle velocity signal. The accumulated error may be small enough over some local range scale, such as of the order of 100 meters. All this may be completed in a single drive over a particular road segment.

In some embodiments, multiple drives may be used to average the resulted model, and to increase its accuracy further. The same car may travel the same route multiple times, or multiple cars may send their collected model data to a central server. In any case, a matching procedure may be performed to identify overlapping models and to enable averaging in order to generate target trajectories. The constructed model (e.g., including the target trajectories) may be used for steering once a convergence criterion is met. Subsequent drives may be used for further model improvements and in order to accommodate infrastructure changes.

Sharing of driving experience (such as sensed data) between multiple cars becomes feasible if they are connected to a central server. Each vehicle client may store a partial copy of a universal road model, which may be relevant for its current position. A bidirectional update procedure between the vehicles and the server may be performed by the vehicles and the server. The small footprint concept discussed above enables the disclosed systems and methods to perform the bidirectional updates using a very small bandwidth.

Information relating to potential landmarks may also be determined and forwarded to a central server. For example, the disclosed systems and methods may determine one or more physical properties of a potential landmark based on one or more images that include the landmark. The physical properties may include a physical size (e.g., height, width) of the landmark, a distance from a vehicle to a landmark, a distance between the landmark to a previous landmark, the lateral position of the landmark (e.g., the position of the landmark relative to the lane of travel), the GPS coordinates of the landmark, a type of landmark, identification of text on the landmark, etc. For example, a vehicle may analyze one or more images captured by a camera to detect a potential landmark, such as a speed limit sign.

The vehicle may determine a distance from the vehicle to the landmark based on the analysis of the one or more images. In some embodiments, the distance may be determined based on analysis of images of the landmark using a suitable image analysis method, such as a scaling method and/or an optical flow method. In some embodiments, the disclosed systems and methods may be configured to determine a type or classification of a potential landmark. In case the vehicle determines that a certain potential landmark corresponds to a predetermined type or classification stored in a sparse map, it may be sufficient for the vehicle to communicate to the server an indication of the type or classification of the landmark, along with its location. The server may store such indications. At a later time, other vehicles may capture an image of the landmark, process the image (e.g., using a classifier), and compare the result from processing the image to the indication stored in the server with regard to the type of landmark. There may be various types of landmarks, and different types of landmarks may be associated with different types of data to be uploaded to and stored in the server, different processing onboard the vehicle may detects the landmark and communicate information about the landmark to the server, and the system onboard the vehicle may receive the landmark data from the server and use the landmark data for identifying a landmark in autonomous navigation.

In some embodiments, multiple autonomous vehicles travelling on a road segment may communicate with a server. The vehicles (or clients) may generate a curve describing its drive (e.g., through ego motion integration) in an arbitrary coordinate frame. The vehicles may detect landmarks and locate them in the same frame. The vehicles may upload the curve and the landmarks to the server. The server may collect data from vehicles over multiple drives, and generate a unified road model. For example, as discussed below with respect to FIG. 19, the server may generate a sparse map having the unified road model using the uploaded curves and landmarks.

The server may also distribute the model to clients (e.g., vehicles). For example, the server may distribute the sparse map to one or more vehicles. The server may continuously or periodically update the model when receiving new data from the vehicles. For example, the server may process the new data to evaluate whether the data includes information that should trigger an updated, or creation of new data on the server. The server may distribute the updated model or the updates to the vehicles for providing autonomous vehicle navigation.

The server may use one or more criteria for determining whether new data received from the vehicles should trigger an update to the model or trigger creation of new data. For example, when the new data indicates that a previously recognized landmark at a specific location no longer exists, or is replaced by another landmark, the server may determine that the new data should trigger an update to the model. As another example, when the new data indicates that a road segment has been closed, and when this has been corroborated by data received from other vehicles, the server may determine that the new data should trigger an update to the model.

The server may distribute the updated model (or the updated portion of the model) to one or more vehicles that are traveling on the road segment, with which the updates to the model are associated. The server may also distribute the updated model to vehicles that are about to travel on the road segment, or vehicles whose planned trip includes the road segment, with which the updates to the model are associated. For example, while an autonomous vehicle is traveling along another road segment before reaching the road segment with which an update is associated, the server may distribute the updates or updated model to the autonomous vehicle before the vehicle reaches the road segment.

In some embodiments, the remote server may collect trajectories and landmarks from multiple clients (e.g., vehicles that travel along a common road segment). The server may match curves using landmarks and create an average road model based on the trajectories collected from the multiple vehicles. The server may also compute a graph of roads and the most probable path at each node or conjunction of the road segment. For example, the remote server may align the trajectories to generate a crowdsourced sparse map from the collected trajectories.

The server may average landmark properties received from multiple vehicles that travelled along the common road segment, such as the distances between one landmark to another (e.g., a previous one along the road segment) as measured by multiple vehicles, to determine an arc-length parameter and support localization along the path and speed calibration for each client vehicle. The server may average the physical dimensions of a landmark measured by multiple vehicles travelled along the common road segment and recognized the same landmark. The averaged physical dimensions may be used to support distance estimation, such as the distance from the vehicle to the landmark. The server may average lateral positions of a landmark (e.g., position from the lane in which vehicles are travelling in to the landmark) measured by multiple vehicles travelled along the common road segment and recognized the same landmark. The averaged lateral portion may be used to support lane assignment. The server may average the GPS coordinates of the landmark measured by multiple vehicles travelled along the same road segment and recognized the same landmark. The averaged GPS coordinates of the landmark may be used to support global localization or positioning of the landmark in the road model.

In some embodiments, the server may identify model changes, such as constructions, detours, new signs, removal of signs, etc., based on data received from the vehicles. The server may continuously or periodically or instantaneously update the model upon receiving new data from the vehicles. The server may distribute updates to the model or the updated model to vehicles for providing autonomous navigation. For example, as discussed further below, the server may use crowdsourced data to filter out "ghost" landmarks detected by vehicles.

In some embodiments, the server may analyze driver interventions during the autonomous driving. The server may analyze data received from the vehicle at the time and location where intervention occurs, and/or data received prior to the time the intervention occurred. The server may identify certain portions of the data that caused or are closely related to the intervention, for example, data indicating a temporary lane closure setup, data indicating a pedestrian in the road. The server may update the model based on the identified data. For example, the server may modify one or more trajectories stored in the model.

Figure 12:
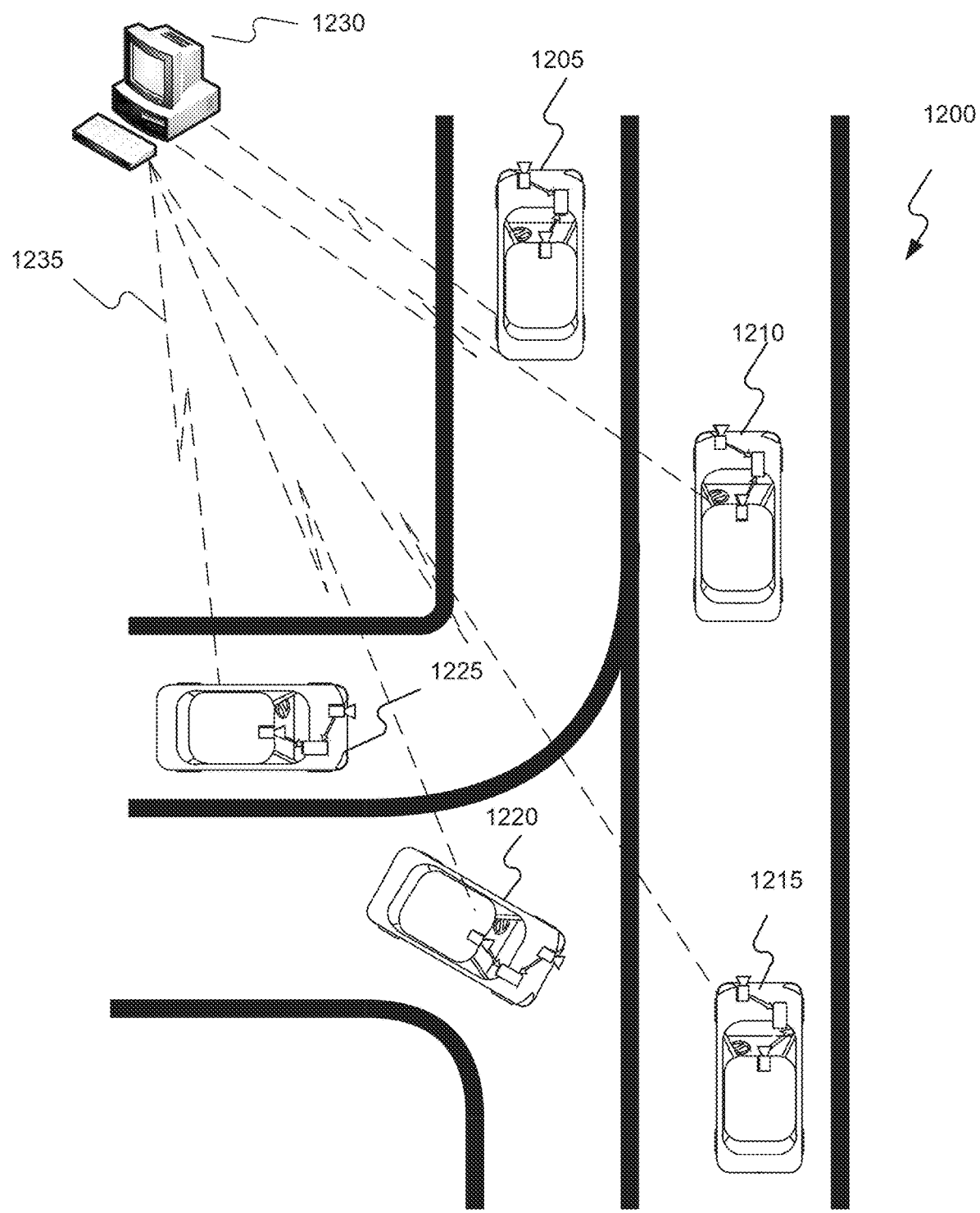
FIG. 12 is a schematic illustration of a system that uses crowd sourcing data received from a plurality of vehicles for autonomous vehicle navigation, consistent with the disclosed embodiments.

FIG. 12 is a schematic illustration of a system that uses crowdsourcing to generate a sparse map (as well as distribute and navigate using a crowdsourced sparse map). FIG. 12 shows a road segment 1200 that includes one or more lanes. A plurality of vehicles 1205, 1210, 1215, 1220, and 1225 may travel on road segment 1200 at the same time or at different times (although shown as appearing on road segment 1200 at the same time in FIG. 12). At least one of vehicles 1205, 1210, 1215, 1220, and 1225 may be an autonomous vehicle. For simplicity of the present example, all of the vehicles 1205, 1210, 1215, 1220, and 1225 are presumed to be autonomous vehicles.

Each vehicle may be similar to vehicles disclosed in other embodiments (e.g., vehicle 200), and may include components or devices included in or associated with vehicles disclosed in other embodiments. Each vehicle may be equipped with an image capture device or camera (e.g., image capture device 122 or camera 122). Each vehicle may communicate with a remote server 1230 via one or more networks (e.g., over a cellular network and/or the Internet, etc.) through wireless communication paths 1235, as indicated by the dashed lines. Each vehicle may transmit data to server 1230 and receive data from server 1230. For example, server 1230 may collect data from multiple vehicles travelling on the road segment 1200 at different times, and may process the collected data to generate an autonomous vehicle road navigation model, or an update to the model. Server 1230 may transmit the autonomous vehicle road navigation model or the update to the model to the vehicles that transmitted data to server 1230. Server 1230 may transmit the autonomous vehicle road navigation model or the update to the model to other vehicles that travel on road segment 1200 at later times.

As vehicles 1205, 1210, 1215, 1220, and 1225 travel on road segment 1200, navigation information collected (e.g., detected, sensed, or measured) by vehicles 1205, 1210, 1215, 1220, and 1225 may be transmitted to server 1230. In some embodiments, the navigation information may be associated with the common road segment 1200. The navigation information may include a trajectory associated with each of the vehicles 1205, 1210, 1215, 1220, and 1225 as each vehicle travels over road segment 1200. In some embodiments, the trajectory may be reconstructed based on data sensed by various sensors and devices provided on vehicle 1205. For example, the trajectory may be reconstructed based on at least one of accelerometer data, speed data, landmarks data, road geometry or profile data, vehicle positioning data, and ego motion data. In some embodiments, the trajectory may be reconstructed based on data from inertial sensors, such as accelerometer, and the velocity of vehicle 1205 sensed by a speed sensor. In addition, in some embodiments, the trajectory may be determined (e.g., by a processor onboard each of vehicles 1205, 1210, 1215, 1220, and 1225) based on sensed ego motion of the camera, which may indicate three dimensional translation and/or three dimensional rotations (or rotational motions). The ego motion of the camera (and hence the vehicle body) may be determined from analysis of one or more images captured by the camera.

In some embodiments, the trajectory of vehicle 1205 may be determined by a processor provided aboard vehicle 1205 and transmitted to server 1230. In other embodiments, server 1230 may receive data sensed by the various sensors and devices provided in vehicle 1205, and determine the trajectory based on the data received from vehicle 1205.

In some embodiments, the navigation information transmitted from vehicles 1205, 1210, 1215, 1220, and 1225 to server 1230 may include data regarding the road surface, the road geometry, or the road profile. The geometry of road segment 1200 may include lane structure and/or landmarks. The lane structure may include the total number of lanes of road segment 1200, the type of lanes (e.g., one-way lane, two-way lane, driving lane, passing lane, etc.), markings on lanes, width of lanes, etc. In some embodiments, the navigation information may include a lane assignment, e.g., which lane of a plurality of lanes a vehicle is traveling in. For example, the lane assignment may be associated with a numerical value "3" indicating that the vehicle is traveling on the third lane from the left or right. As another example, the lane assignment may be associated with a text value "center lane" indicating the vehicle is traveling on the center lane.

Server 1230 may store the navigation information on a non-transitory computer-readable medium, such as a hard drive, a compact disc, a tape, a memory, etc. Server 1230 may generate (e.g., through a processor included in server 1230) at least a portion of an autonomous vehicle road navigation model for the common road segment 1200 based on the navigation information received from the plurality of vehicles 1205, 1210, 1215, 1220, and 1225 and may store the model as a portion of a sparse map. Server 1230 may determine a trajectory associated with each lane based on crowdsourced data (e.g., navigation information) received from multiple vehicles (e.g., 1205, 1210, 1215, 1220, and 1225) that travel on a lane of road segment at different times. Server 1230 may generate the autonomous vehicle road navigation model or a portion of the model (e.g., an updated portion) based on a plurality of trajectories determined based on the crowd sourced navigation data. Server 1230 may transmit the model or the updated portion of the model to one or more of autonomous vehicles 1205, 1210, 1215, 1220, and 1225 traveling on road segment 1200 or any other autonomous vehicles that travel on road segment at a later time for updating an existing autonomous vehicle road navigation model provided in a navigation system of the vehicles. The autonomous vehicle road navigation model may be used by the autonomous vehicles in autonomously navigating along the common road segment 1200.

As explained above, the autonomous vehicle road navigation model may be included in a sparse map (e.g., sparse map 800 depicted in FIG. 8). Sparse map 800 may include sparse recording of data related to road geometry and/or landmarks along a road, which may provide sufficient information for guiding autonomous navigation of an autonomous vehicle, yet does not require excessive data storage. In some embodiments, the autonomous vehicle road navigation model may be stored separately from sparse map 800, and may use map data from sparse map 800 when the model is executed for navigation. In some embodiments, the autonomous vehicle road navigation model may use map data included in sparse map 800 for determining target trajectories along road segment 1200 for guiding autonomous navigation of autonomous vehicles 1205, 1210, 1215, 1220, and 1225 or other vehicles that later travel along road segment 1200. For example, when the autonomous vehicle road navigation model is executed by a processor included in a navigation system of vehicle 1205, the model may cause the processor to compare the trajectories determined based on the navigation information received from vehicle 1205 with predetermined trajectories included in sparse map 800 to validate and/or correct the current traveling course of vehicle 1205.

In the autonomous vehicle road navigation model, the geometry of a road feature or target trajectory may be encoded by a curve in a three-dimensional space. In one embodiment, the curve may be a three dimensional spline including one or more connecting three dimensional polynomials. As one of skill in the art would understand, a spline may be a numerical function that is piece-wise defined by a series of polynomials for fitting data. A spline for fitting the three dimensional geometry data of the road may include a linear spline (first order), a quadratic spline (second order), a cubic spline (third order), or any other splines (other orders), or a combination thereof. The spline may include one or more three dimensional polynomials of different orders connecting (e.g., fitting) data points of the three dimensional geometry data of the road. In some embodiments, the autonomous vehicle road navigation model may include a three dimensional spline corresponding to a target trajectory along a common road segment (e.g., road segment 1200) or a lane of the road segment 1200.

As explained above, the autonomous vehicle road navigation model included in the sparse map may include other information, such as identification of at least one landmark along road segment 1200. The landmark may be visible within a field of view of a camera (e.g., camera 122) installed on each of vehicles 1205, 1210, 1215, 1220, and 1225. In some embodiments, camera 122 may capture an image of a landmark. A processor (e.g., processor 180, 190, or processing unit 110) provided on vehicle 1205 may process the image of the landmark to extract identification information for the landmark. The landmark identification information, rather than an actual image of the landmark, may be stored in sparse map 800. The landmark identification information may require much less storage space than an actual image. Other sensors or systems (e.g., GPS system) may also provide certain identification information of the landmark (e.g., position of landmark) The landmark may include at least one of a traffic sign, an arrow marking, a lane marking, a dashed lane marking, a traffic light, a stop line, a directional sign (e.g., a highway exit sign with an arrow indicating a direction, a highway sign with arrows pointing to different directions or places), a landmark beacon, or a lamppost. A landmark beacon refers to a device (e.g., an REED device) installed along a road segment that transmits or reflects a signal to a receiver installed on a vehicle, such that when the vehicle passes by the device, the beacon received by the vehicle and the location of the device (e.g., determined from GPS location of the device) may be used as a landmark to be included in the autonomous vehicle road navigation model and/or the sparse map 800.

The identification of at least one landmark may include a position of the at least one landmark. The position of the landmark may be determined based on position measurements performed using sensor systems (e.g., Global Positioning Systems, inertial based positioning systems, landmark beacon, etc.) associated with the plurality of vehicles 1205, 1210, 1215, 1220, and 1225. In some embodiments, the position of the landmark may be determined by averaging the position measurements detected, collected, or received by sensor systems on different vehicles 1205, 1210, 1215, 1220, and 1225 through multiple drives. For example, vehicles 1205, 1210, 1215, 1220, and 1225 may transmit position measurements data to server 1230, which may average the position measurements and use the averaged position measurement as the position of the landmark. The position of the landmark may be continuously refined by measurements received from vehicles in subsequent drives.

The identification of the landmark may include a size of the landmark. The processor provided on a vehicle (e.g., 1205) may estimate the physical size of the landmark based on the analysis of the images. Server 1230 may receive multiple estimates of the physical size of the same landmark from different vehicles over different drives. Server 1230 may average the different estimates to arrive at a physical size for the landmark, and store that landmark size in the road model. The physical size estimate may be used to further determine or estimate a distance from the vehicle to the landmark. The distance to the landmark may be estimated based on the current speed of the vehicle and a scale of expansion based on the position of the landmark appearing in the images relative to the focus of expansion of the camera. For example, the distance to landmark may be estimated by $Z=V*dt*R/D$, where V is the speed of vehicle, R is the distance in the image from the landmark at time t1 to the focus of expansion, and D is the change in distance for the landmark in the image from t1 to t2. dt represents the (t2−t1). For example, the distance to landmark may be estimated by $Z=V*dt*R/D$, where V is the speed of vehicle, R is the distance in the image between the landmark and the focus of expansion, dt is a time interval, and D is the image displacement of the landmark along the epipolar line. Other equations equivalent to the above equation, such as $Z=V*\omega/\Delta\omega$, may be used for estimating the distance to the landmark. Here, V is the vehicle speed, $\omega$ is an image length (like the object width), and $\Delta\omega$ is the change of that image length in a unit of time.

When the physical size of the landmark is known, the distance to the landmark may also be determined based on the following equation: $Z=f*W/\omega$, where f is the focal length, W is the size of the landmark (e.g., height or width), $\omega$ is the number of pixels when the landmark leaves the image. From the above equation, a change in distance Z may be calculated using $\Delta Z=f*W*\Delta\omega/\omega^2+\Delta W/\omega$, where $\Delta W$ decays to zero by averaging, and where $\Delta\omega$ is the number of pixels representing a bounding box accuracy in the image. A value estimating the physical size of the landmark may be calculated by averaging multiple observations at the server side. The resulting error in distance estimation may be very small. There are two sources of error that may occur when using the formula above, namely $\Delta W$ and $\Delta\omega$. Their contribution to the distance error is given by $\Delta Z=f*W*\Delta\omega/\omega^2$ $f*\Delta W/\omega$. However, $\Delta W$ decays to zero by averaging; hence $\Delta Z$ is determined by $\Delta\omega$ (e.g., the inaccuracy of the bounding box in the image).

For landmarks of unknown dimensions, the distance to the landmark may be estimated by tracking feature points on the landmark between successive frames. For example, certain features appearing on a speed limit sign may be tracked between two or more image frames. Based on these tracked features, a distance distribution per feature point may be generated. The distance estimate may be extracted from the distance distribution. For example, the most frequent distance appearing in the distance distribution may be used as the distance estimate. As another example, the average of the distance distribution may be used as the distance estimate.

Figure 13:
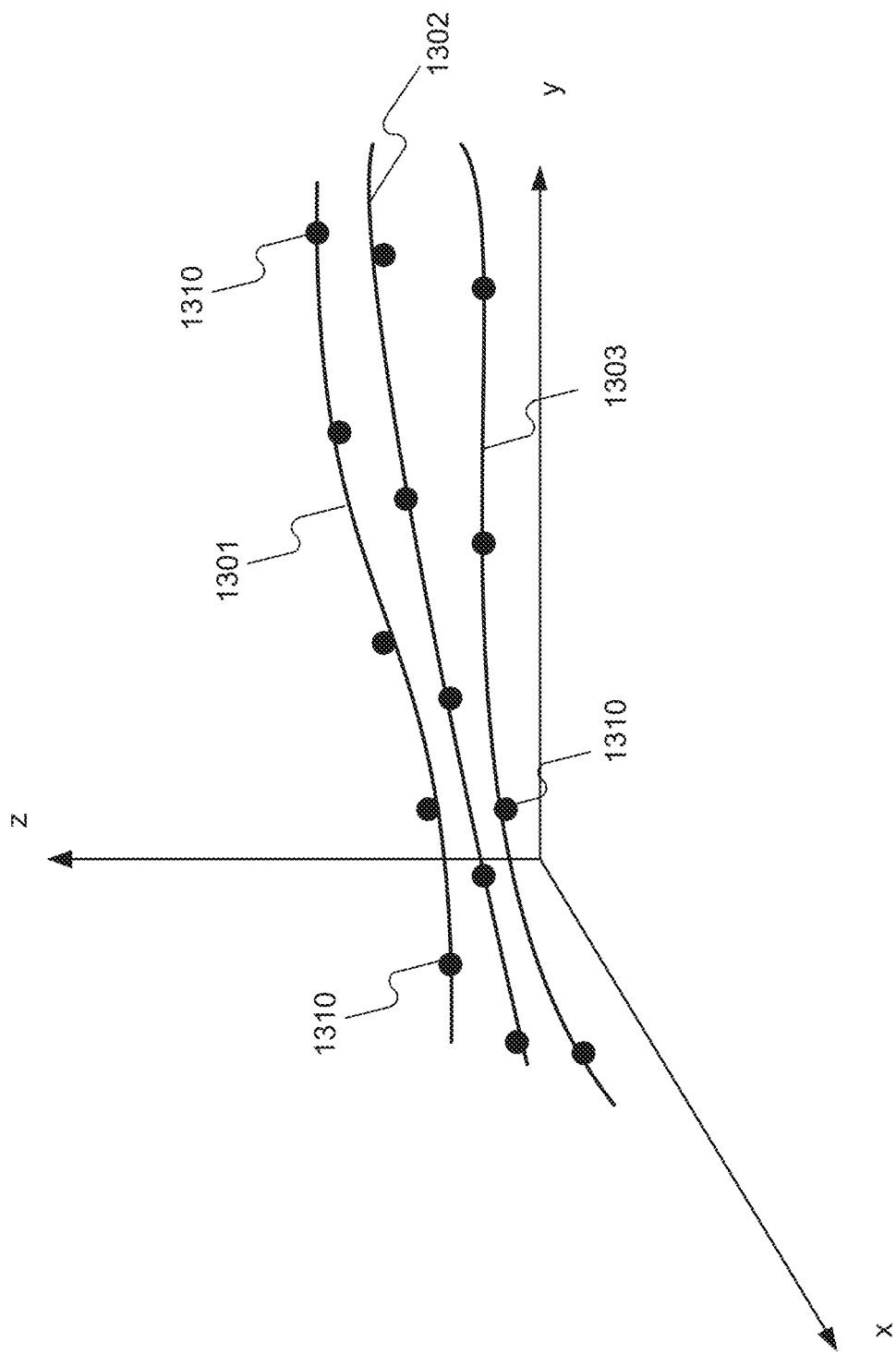
FIG. 13 illustrates an example autonomous vehicle road navigation model represented by a plurality of three dimensional splines, consistent with the disclosed embodiments.

FIG. 13 illustrates an example autonomous vehicle road navigation model represented by a plurality of three dimensional splines 1301, 1302, and 1303. The curves 1301, 1302, and 1303 shown in FIG. 13 are for illustration purpose only. Each spline may include one or more three dimensional polynomials connecting a plurality of data points 1310. Each polynomial may be a first order polynomial, a second order polynomial, a third order polynomial, or a combination of any suitable polynomials having different orders. Each data point 1310 may be associated with the navigation information received from vehicles 1205, 1210, 1215, 1220, and 1225. In some embodiments, each data point 1310 may be associated with data related to landmarks (e.g., size, location, and identification information of landmarks) and/or road signature profiles (e.g., road geometry, road roughness profile, road curvature profile, road width profile). In some embodiments, some data points 1310 may be associated with data related to landmarks, and others may be associated with data related to road signature profiles.

Figure 14:
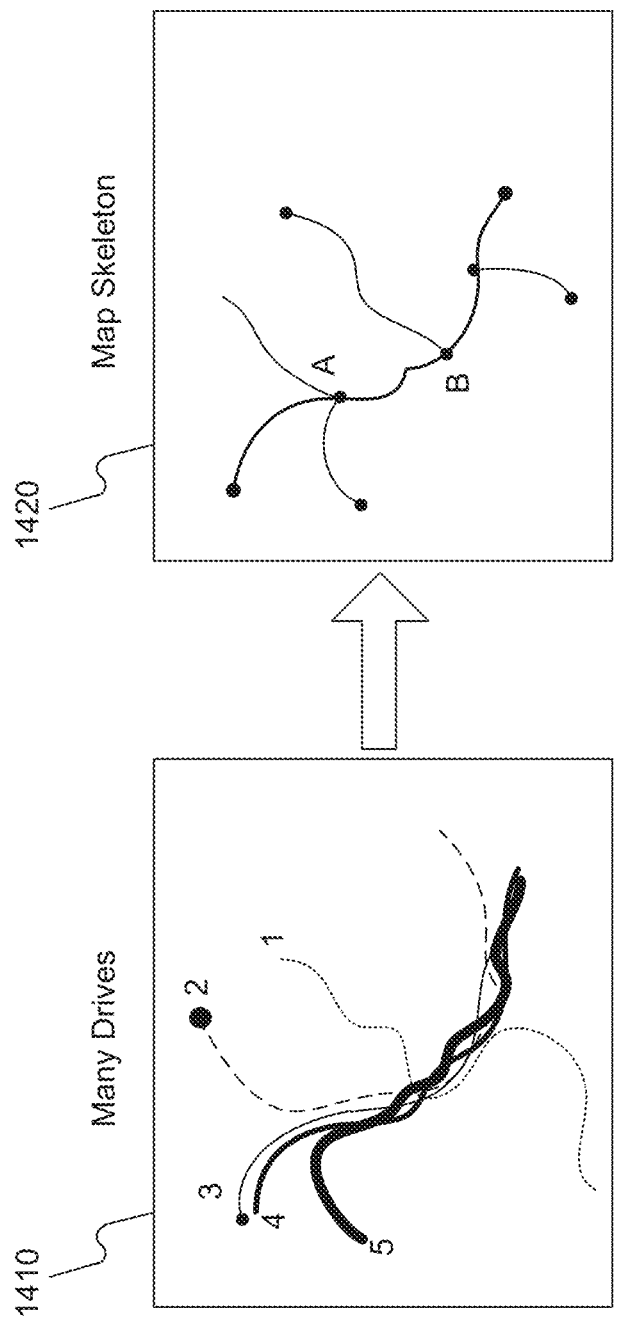
FIG. 14 shows a map skeleton generated from combining location information from many drives, consistent with the disclosed embodiments.

FIG. 14 illustrates raw location data 1410 (e.g., GPS data) received from five separate drives. One drive may be separate from another drive if it was traversed by separate vehicles at the same time, by the same vehicle at separate times, or by separate vehicles at separate times. To account for errors in the location data 1410 and for differing locations of vehicles within the same lane (e.g., one vehicle may drive closer to the left of a lane than another), server 1230 may generate a map skeleton 1420 using one or more statistical techniques to determine whether variations in the raw location data 1410 represent actual divergences or statistical errors. Each path within skeleton 1420 may be linked back to the raw data 1410 that formed the path. For example, the path between A and B within skeleton 1420 is linked to raw data 1410 from drives 2, 3, 4, and 5 but not from drive 1. Skeleton 1420 may not be detailed enough to be used to navigate a vehicle (e.g., because it combines drives from multiple lanes on the same road unlike the splines described above) but may provide useful topological information and may be used to define intersections.

Figure 15:
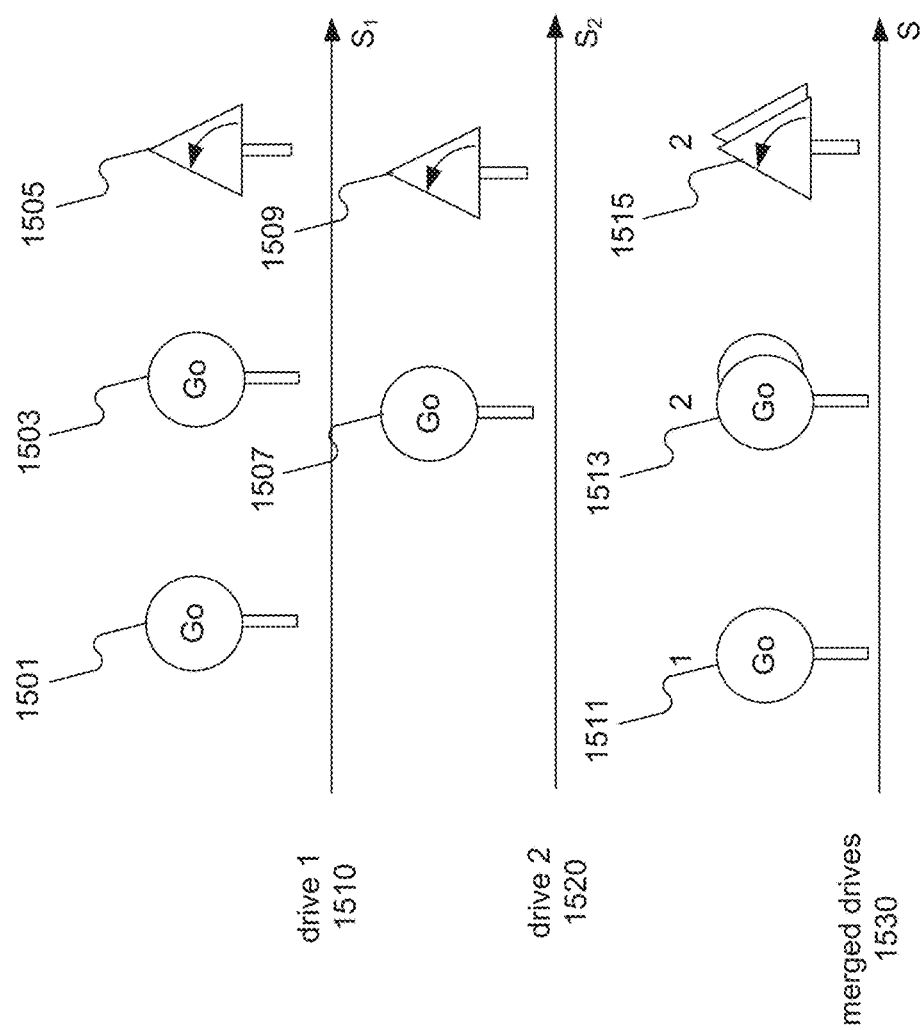
FIG. 15 shows an example of a longitudinal alignment of two drives with example signs as landmarks, consistent with the disclosed embodiments.

FIG. 15 illustrates an example by which additional detail may be generated for a sparse map within a segment of a map skeleton (e.g., segment A to B within skeleton 1420). As depicted in FIG. 15, the data. (e.g. ego-motion data, road markings data, and the like) may be shown as a function of position S (or $S_1$ or $S_2$) along the drive. Server 1230 may identify landmarks for the sparse map by identifying unique matches between landmarks 1501, 1503, and 1505 of drive 1510 and landmarks 1507 and 1509 of drive 1520. Such a matching algorithm may result in identification of landmarks 1511, 1513, and 1515. One skilled in the art would recognize, however, that other matching algorithms may be used. For example, probability optimization may be used in lieu of or in combination with unique matching. Server 1230 may longitudinally align the drives to align the matched landmarks. For example, server 1230 may select one drive (e.g., drive 1520) as a reference drive and then shift and/or elastically stretch the other drive(s) (e.g., drive 1510) for alignment.

Figure 16:
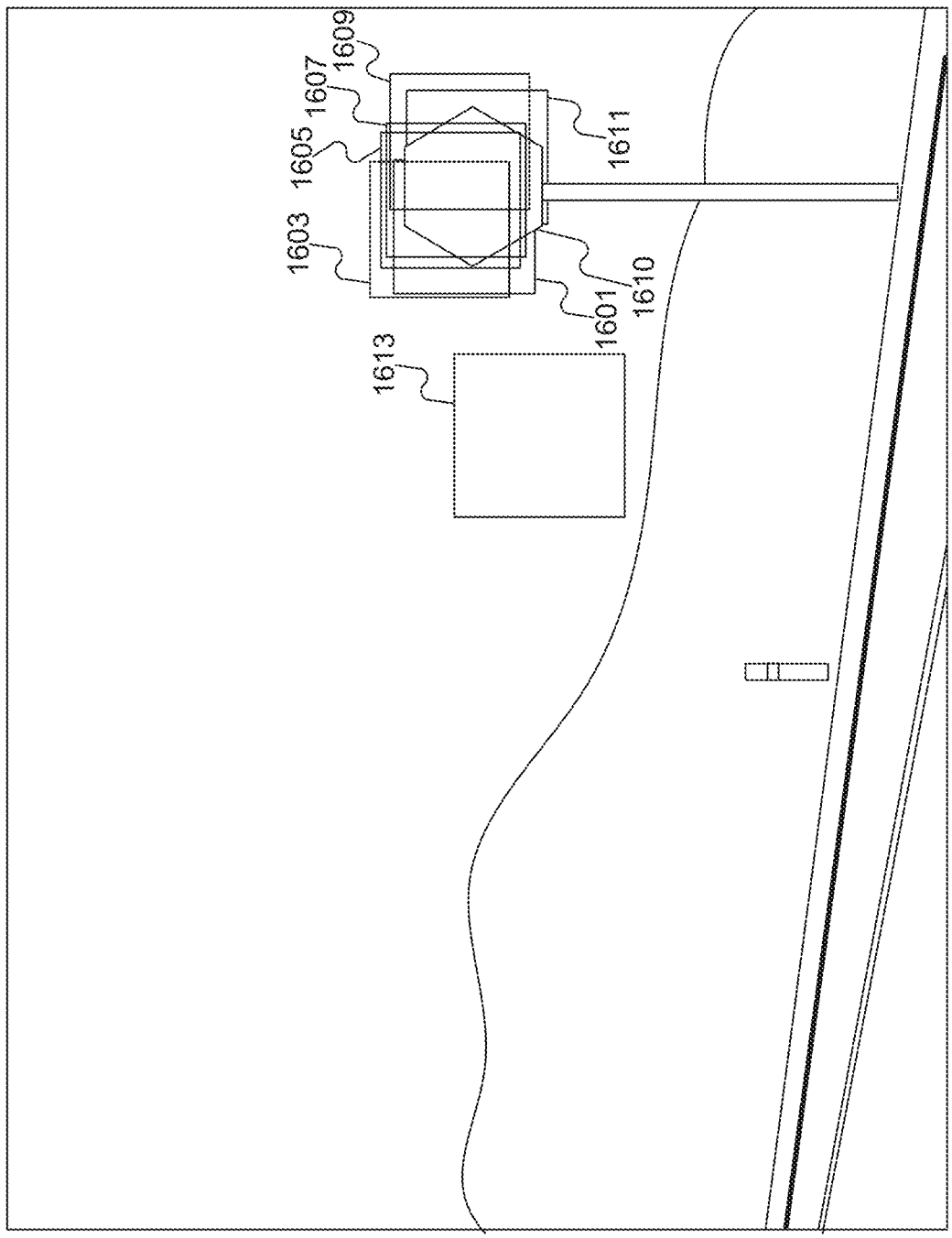
FIG. 16 shows an example of a longitudinal alignment of many drives with an example sign as a landmark, consistent with the disclosed embodiments.

FIG. 16 shows an example of aligned landmark data for use in a sparse map. In the example of FIG. 16, landmark 1610 comprises a road sign. The example of FIG. 16 further depicts data from a plurality of drives 1601, 1603, 1605, 1607, 1609, 1611, and 1613. In the example of FIG. 16, the data from drive 1613 consists of a "ghost" landmark, and the server 1230 may identify it as such because none of drives 1601, 1603, 1605, 1607, 1609, and 1611 include an identification of a landmark in the vicinity of the identified landmark in drive 1613. Accordingly, server 1230 may accept potential landmarks when a ratio of images in which the landmark does appear to images in which the landmark does not appear exceeds a threshold and/or may reject potential landmarks when a ratio of images in which the landmark does not appear to images in which the landmark does appear exceeds a threshold.

Figure 17:
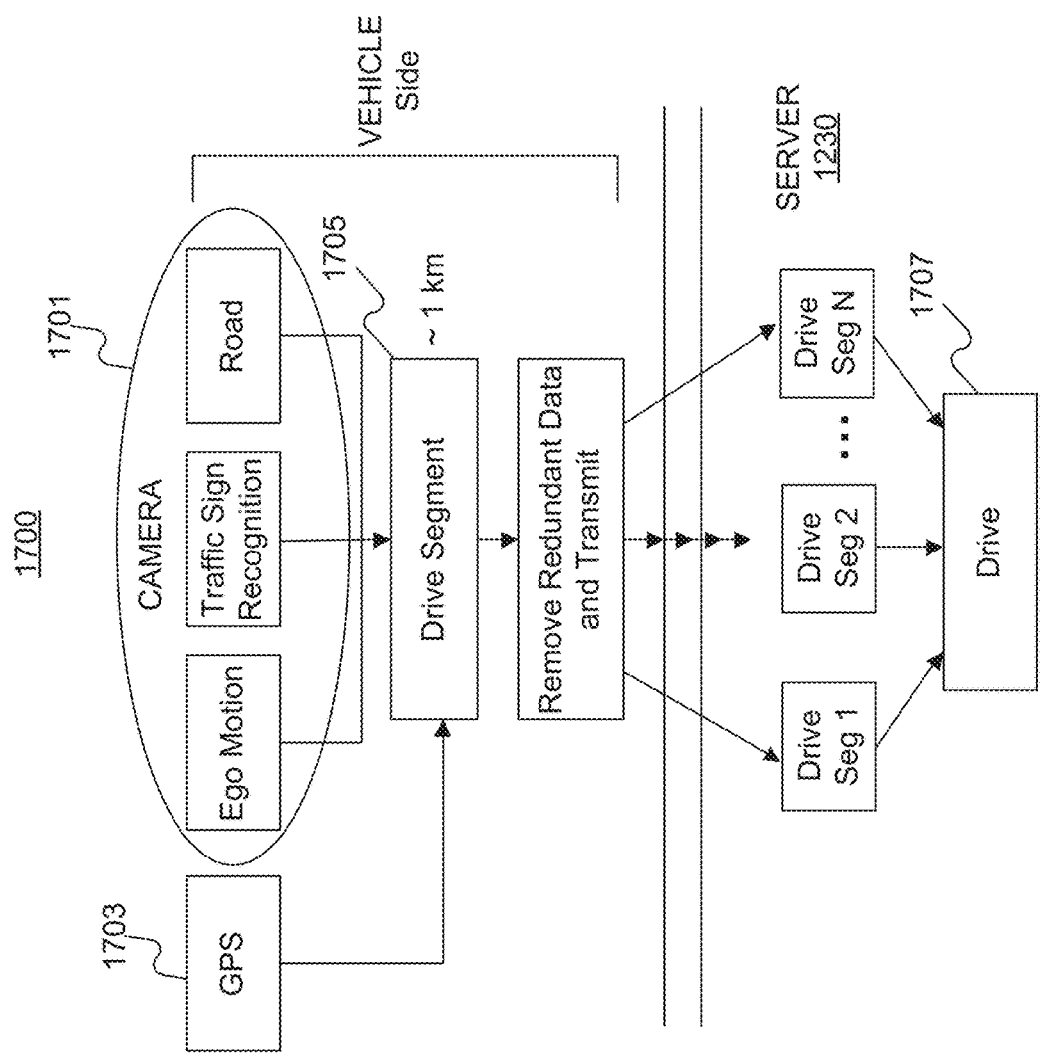
FIG. 17 is a schematic illustration of a system for generating drive data using a camera, a vehicle, and a server, consistent with the disclosed embodiments.

FIG. 17 depicts a system 1700 for generating drive data, which may be used to crowdsource a sparse map. As depicted in FIG. 17, system 1700 may include a camera 1701 and a locating device 1703 (e.g., a GPS locator). Camera 1701 and locating device 1703 may be mounted on a vehicle (e.g., one of vehicles 1205, 1210, 1215, 1220, and 1225). Camera 1701 may produce a plurality of data of multiple types, e.g., ego motion data, traffic sign data, road data, or the like. The camera data and location data may be segmented into drive segments 1705. For example, drive segments 1705 may each have camera data and location data from less than 1 km of driving.

In some embodiments, system 1700 may remove redundancies in drive segments 1705. For example, if a landmark appears in multiple images from camera 1701, system 1700 may strip the redundant data such that the drive segments 1705 only contain one copy of the location of and any metadata relating to the landmark. By way of further example, if a lane marking appears in multiple images from camera 1701, system 1700 may strip the redundant data such that the drive segments 1705 only contain one copy of the location of and any metadata relating to the lane marking.

System 1700 also includes a server (e.g., server, 1230). Server 1230 may receive drive segments 1705 from the vehicle and recombine the drive segments 1705 into a single drive 1707. Such an arrangement may allow for reduce bandwidth requirements when transferring data between the vehicle and the server while also allowing for the server to store data relating to an entire drive.

Figure 18:
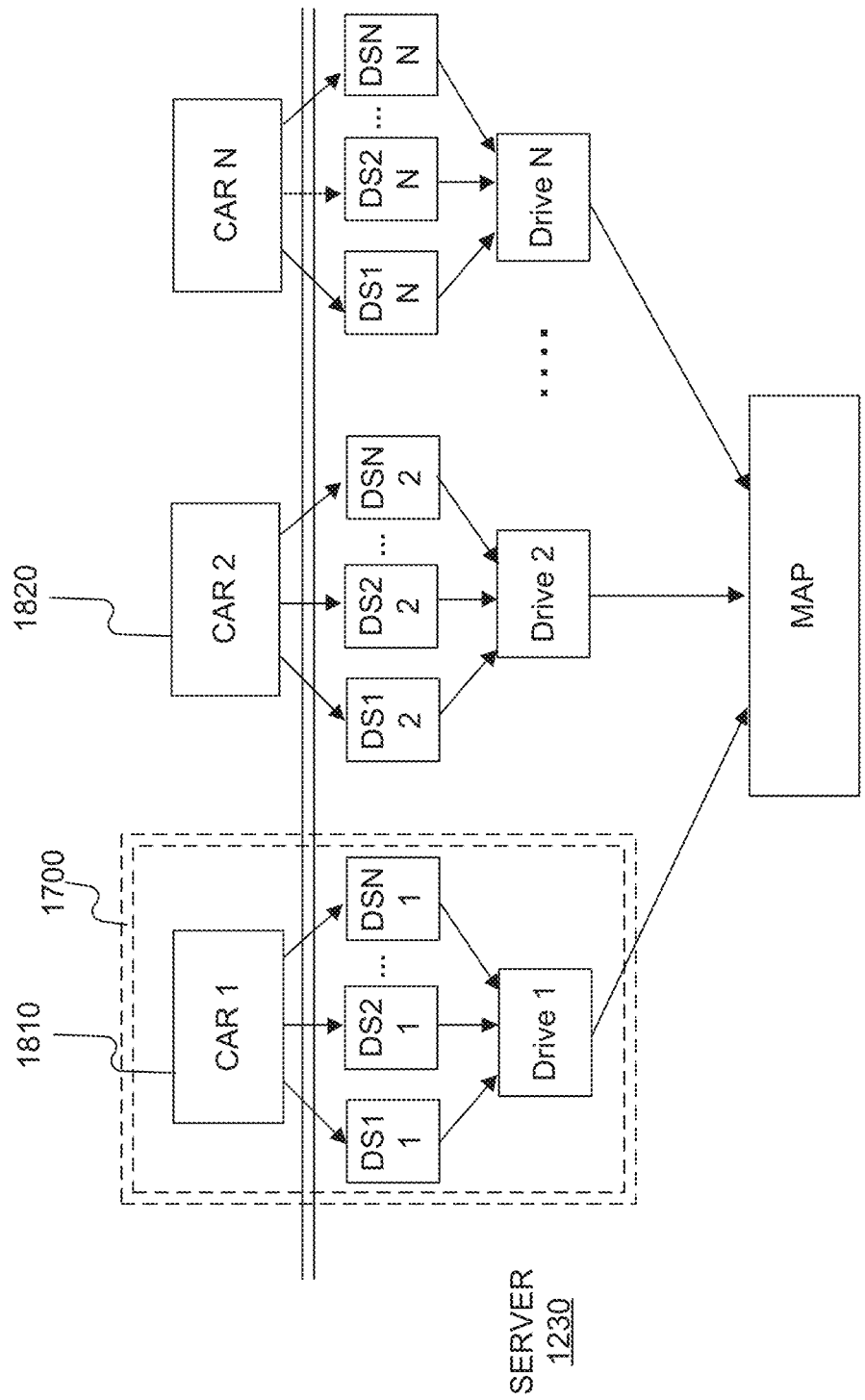
FIG. 18 is a schematic illustration of a system for crowdsourcing a sparse map, consistent with the disclosed embodiments.

FIG. 18 depicts system 1700 of FIG. 17 further configured for crowdsourcing a sparse map. As in FIG. 17, system 1700 includes vehicle 1810, which captures drive data using, for example, a camera (which produces, e.g., ego motion data, traffic sign data, road data, or the like) and a locating device (e.g., a GPS locator). As in FIG. 17, vehicle 1810 segments the collected data into drive segments (depicted as "DS1 1," "DS2 1," "DSN 1" in FIG. 18). Server 1230 then receives the drive segments and reconstructs a drive (depicted as "Drive 1" in FIG. 18) from the received segments.

As further depicted in FIG. 18, system 1700 also receives data from additional vehicles. For example, vehicle 1820 also captures drive data using, for example, a camera (which produces, e.g., ego motion data, traffic sign data, road data, or the like) and a locating device (e.g., a GPS locator). Similar to vehicle 1810, vehicle 1820 segments the collected data into drive segments (depicted as "DS1 2," "DS2 2," "DSN 2" in FIG. 18). Server 1230 then receives the drive segments and reconstructs a drive (depicted as "Drive 2" in FIG. 18) from the received segments. Any number of additional vehicles may be used. For example, FIG. 18 also includes "CAR N" that captures drive data, segments it into drive segments (depicted as "DS1 N," "DS2 N," "DSN N" in FIG. 18), and sends it to server 1230 for reconstruction into a drive (depicted as "Drive N" in FIG. 18).

As depicted in FIG. 18, server 1230 may construct a sparse map (depicted as "MAP") using the reconstructed drives (e.g., "Drive 1," "Drive 2," and "Drive N") collected from a plurality of vehicles (e.g., "CAR 1" (also labeled vehicle 1810), "CAR 2" (also labeled vehicle 1820), and "CAR N").

Figure 19:
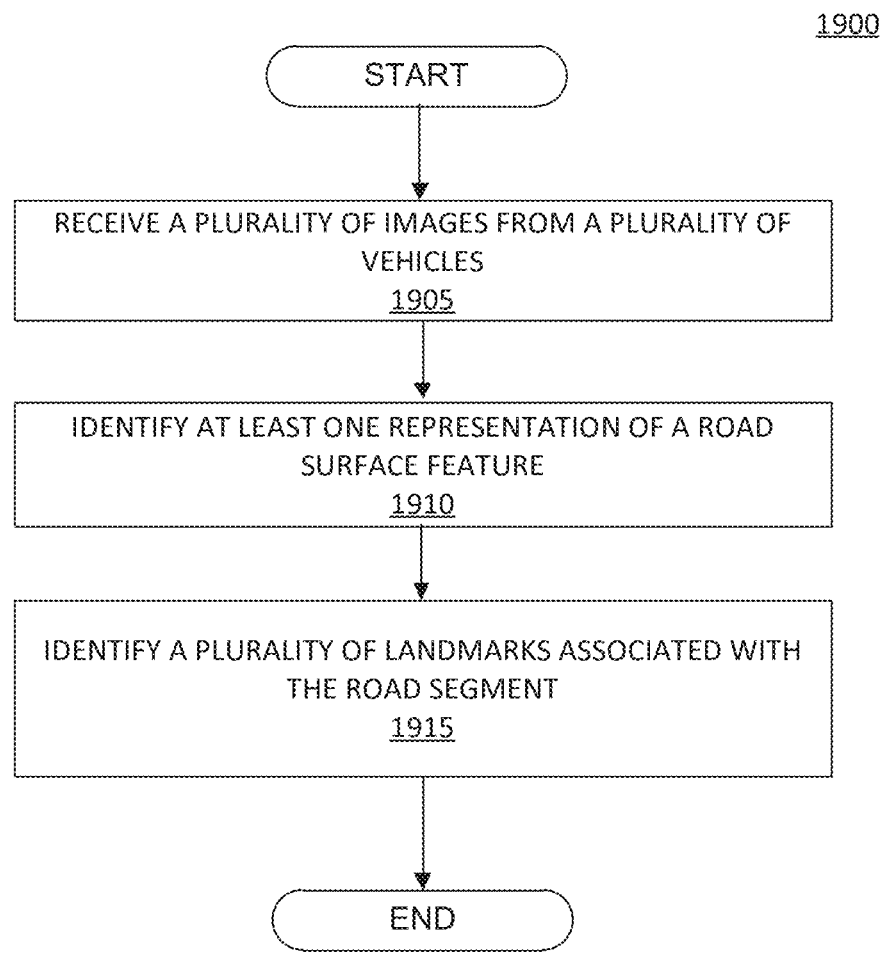
FIG. 19 is a flowchart showing an exemplary process for generating a sparse map for autonomous vehicle navigation along a road segment, consistent with the disclosed embodiments.

FIG. 19 is a flowchart showing an example process 1900 for generating a sparse map for autonomous vehicle navigation along a road segment. Process 1900 may be performed by one or more processing devices included in server 1230.

Process 1900 may include receiving a plurality of images acquired as one or more vehicles traverse the road segment (step 1905). Server 1230 may receive images from cameras included within one or more of vehicles 1205, 1210, 1215, 1220, and 1225. For example, camera 122 may capture one or more images of the environment surrounding vehicle 1205 as vehicle 1205 travels along road segment 1200. In some embodiments, server 1230 may also receive stripped down image data that has had redundancies removed by a processor on vehicle 1205, as discussed above with respect to FIG. 17.

Process 1900 may further include identifying, based on the plurality of images, at least one line representation of a road surface feature extending along the road segment (step 1910). Each line representation may represent a path along the road segment substantially corresponding with the road surface feature. For example, server 1230 may analyze the environmental images received from camera 122 to identify a road edge or a lane marking and determine a trajectory of travel along road segment 1200 associated with the road edge or lane marking. In some embodiments, the trajectory (or line representation) may include a spline, a polynomial representation, or a curve. Server 1230 may determine the trajectory of travel of vehicle 1205 based on camera ego motions (e.g., three dimensional translation and/or three dimensional rotational motions) received at step 1905.

Process 1900 may also include identifying, based on the plurality of images, a plurality of landmarks associated with the road segment (step 1910). For example, server 1230 may analyze the environmental images received from camera 122 to identify one or more landmarks, such as road sign along road segment 1200. Server 1230 may identify the landmarks using analysis of the plurality of images acquired as one or more vehicles traverse the road segment. To enable crowd-sourcing, the analysis may include rules regarding accepting and rejecting possible landmarks associated with the road segment. For example, the analysis may include accepting potential landmarks when a ratio of images in which the landmark does appear to images in which the landmark does not appear exceeds a threshold and/or rejecting potential landmarks when a ratio of images in which the landmark does not appear to images in which the landmark does appear exceeds a threshold.

Process 1900 may include other operations or steps performed by server 1230. For example, the navigation information may include a target trajectory for vehicles to travel along a road segment, and process 1900 may include clustering, by server 1230, vehicle trajectories related to multiple vehicles travelling on the road segment and determining the target trajectory based on the clustered vehicle trajectories, as discussed in further detail below. Clustering vehicle trajectories may include clustering, by server 1230, the multiple trajectories related to the vehicles travelling on the road segment into a plurality of clusters based on at least one of the absolute heading of vehicles or lane assignment of the vehicles. Generating the target trajectory may include averaging, by server 1230, the clustered trajectories. By way of further example, process 1900 may include aligning data received in step 1905. Other processes or steps performed by server 1230, as described above, may also be included in process 1900.

The disclosed systems and methods may include other features. For example, the disclosed systems may use local coordinates, rather than global coordinates. For autonomous driving, some systems may present data in world coordinates. For example, longitude and latitude coordinates on the earth surface may be used. In order to use the map for steering, the host vehicle may determine its position and orientation relative to the map. It seems natural to use a GPS device on board, in order to position the vehicle on the map and in order to find the rotation transformation between the body reference frame and the world reference frame (e.g., North, East and Down). Once the body reference frame is aligned with the map reference frame, then the desired route may be expressed in the body reference frame and the steering commands may be computed or generated.

The disclosed systems and methods may enable autonomous vehicle navigation (e.g., steering control) with low footprint models, which may be collected by the autonomous vehicles themselves without the aid of expensive surveying equipment. To support the autonomous navigation (e.g., steering applications), the road model may include a sparse map having the geometry of the road, its lane structure, and landmarks that may be used to determine the location or position of vehicles along a trajectory included in the model. As discussed above, generation of the sparse map may be performed by a remote server that communicates with vehicles travelling on the road and that receives data from the vehicles. The data may include sensed data, trajectories reconstructed based on the sensed data, and/or recommended trajectories that may represent modified reconstructed trajectories. As discussed below, the server may transmit the model back to the vehicles or other vehicles that later travel on the road to aid in autonomous navigation.

Figure 20:
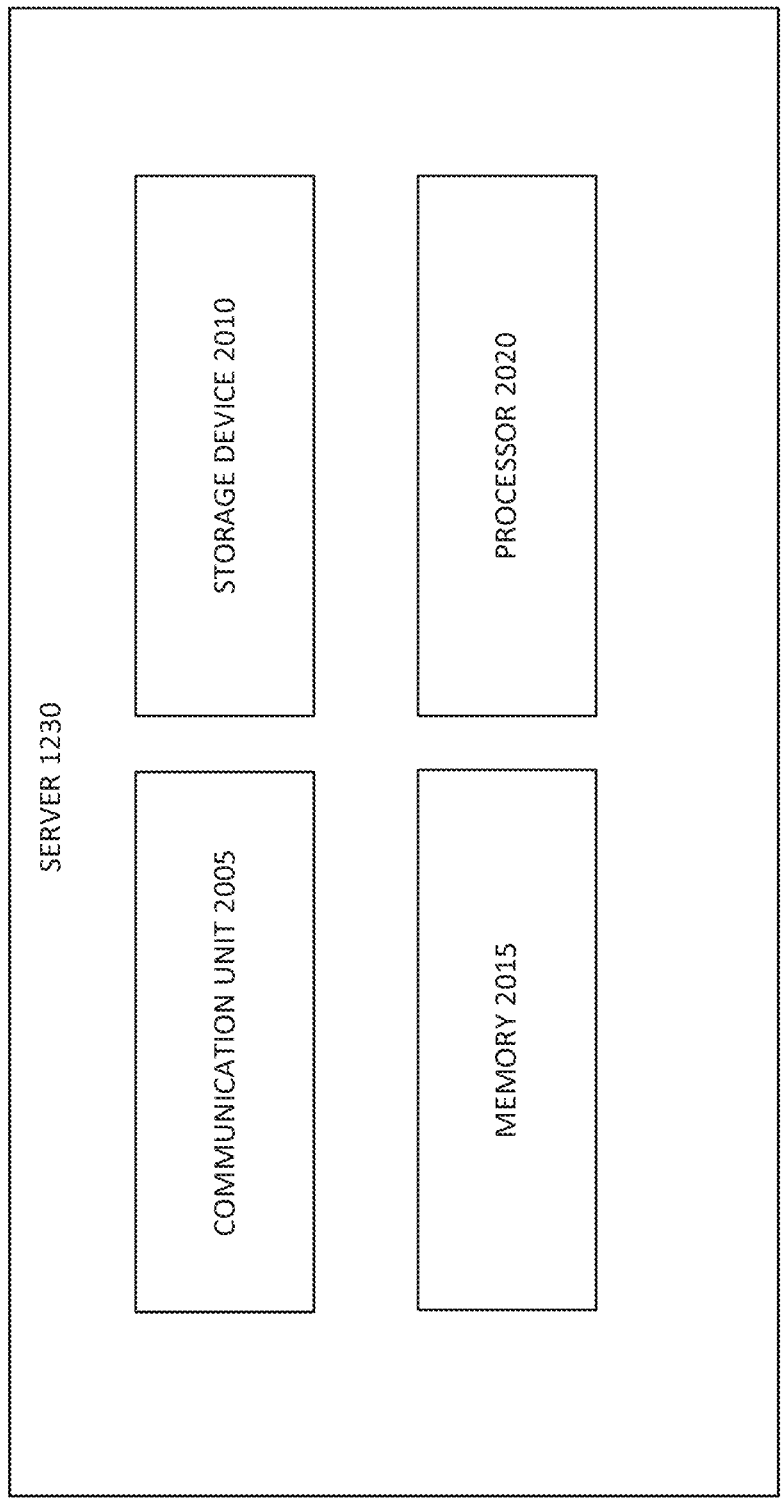
FIG. 20 illustrates a block diagram of a server consistent with the disclosed embodiments.

FIG. 20 illustrates a block diagram of server 1230. Server 1230 may include a communication unit 2005, which may include both hardware components (e.g., communication control circuits, switches, and antenna and software components (e.g., communication protocols, computer codes). For example, communication unit 2005 may include at least one network interface. Server 1230 may communicate with vehicles 1205, 1210, 1215, 1220, and 1225 through communication unit 2005. For example, server 1230 may receive, through communication unit 2005, navigation information transmitted from vehicles 1205, 1210, 1215, 1220, and 1225. Server 1230 may distribute, through communication unit 2005, the autonomous vehicle road navigation model to one or more autonomous vehicles.

Server 1230 may include at least one non-transitory storage medium 2010, such as a hard drive, a compact disc, a tape, etc. Storage device 1410 may be configured to store data, such as navigation information received from vehicles 1205, 1210, 1215, 1220, and 1225 and/or the autonomous vehicle road navigation model that server 1230 generates based on the navigation information. Storage device 2010 may be configured to store any other information, such as a sparse map (e.g., sparse map 800 discussed above with respect to FIG. 8).

In addition to or in place of storage device 2010, server 1230 may include a memory 2015. Memory 2015 may be similar to or different from memory 140 or 150. Memory 2015 may be a non-transitory memory, such as a flash memory, a random access memory, etc. Memory 2015 may be configured to store data, such as computer codes or instructions executable by a processor (e.g., processor 2020), map data (e.g., data of sparse map 800), the autonomous vehicle road navigation model, and/or navigation information received from vehicles 1205, 1210, 1215, 1220, and 1225.

Server 1230 may include at least one processing device 2020 configured to execute computer codes or instructions stored in memory 2015 to perform various functions. For example, processing device 2020 may analyze the navigation information received from vehicles 1205, 1210, 1215, 1220, and 1225, and generate the autonomous vehicle road navigation model based on the analysis. Processing device 2020 may control communication unit 1405 to distribute the autonomous vehicle road navigation model to one or more autonomous vehicles (e.g., one or more of vehicles 1205, 1210, 1215, 1220, and 1225 or any vehicle that travels on road segment 1200 at a later time). Processing device 2020 may be similar to or different from processor 180, 190, or processing unit 110.

Figure 21:
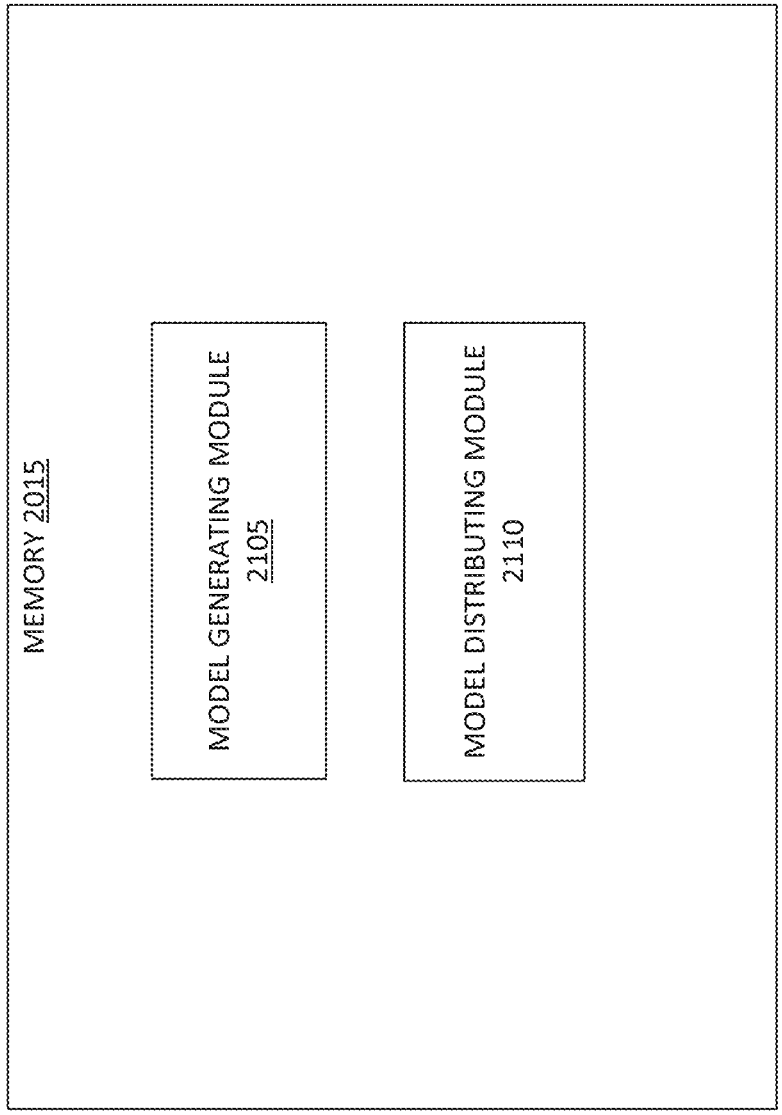
FIG. 21 illustrates a block diagram of a memory consistent with the disclosed embodiments.

FIG. 21 illustrates a block diagram of memory 2015, which may store computer code or instructions for performing one or more operations for generating a road navigation model for use in autonomous vehicle navigation. As shown in FIG. 21, memory 2015 may store one or more modules for performing the operations for processing vehicle navigation information. For example, memory 2015 may include a model generating module 2105 and a model distributing module 2110. Processor 2020 may execute the instructions stored in any of modules 2105 and 2110 included in memory 2015.

Model generating module 2105 may store instructions which, when executed by processor 2020, may generate at least a portion of an autonomous vehicle road navigation model for a common road segment (e.g., road segment 1200) based on navigation information received from vehicles 1205, 1210, 1215, 1220, and 1225. For example, in generating the autonomous vehicle road navigation model, processor 2020 may cluster vehicle trajectories along the common road segment 1200 into different clusters. Processor 2020 may determine a target trajectory along the common road segment 1200 based on the clustered vehicle trajectories for each of the different clusters. Such an operation may include finding a mean or average trajectory of the clustered vehicle trajectories (e.g., by averaging data representing the clustered vehicle trajectories) in each cluster. In some embodiments, the target trajectory may be associated with a single lane of the common road segment 1200.

The road model and/or sparse map may store trajectories associated with a road segment. These trajectories may be referred to as target trajectories, which are provided to autonomous vehicles for autonomous navigation. The target trajectories may be received from multiple vehicles, or may be generated based on actual trajectories or recommended trajectories (actual trajectories with some modifications) received from multiple vehicles. The target trajectories included in the road model or sparse map may be continuously updated (e.g., averaged) with new trajectories received from other vehicles.

Vehicles travelling on a road segment may collect data by various sensors. The data may include landmarks, road signature profile, vehicle motion (e.g., accelerometer data, speed data), vehicle position (e.g., GPS data), and may either reconstruct the actual trajectories themselves, or transmit the data to a server, which will reconstruct the actual trajectories for the vehicles. In some embodiments, the vehicles may transmit data relating to a trajectory (e.g., a curve in an arbitrary reference frame), landmarks data, and lane assignment along traveling path to server 1230. Various vehicles travelling along the same road segment at multiple drives may have different trajectories. Server 1230 may identify routes or trajectories associated with each lane from the trajectories received from vehicles through a clustering process.

FIG. 22 illustrates a process of clustering vehicle trajectories associated with vehicles 1205, 1210, 1215, 1220, and 1225 for determining a target trajectory for the common road segment (e.g., road segment 1200). The target trajectory or a plurality of target trajectories determined from the clustering process may be included in the autonomous vehicle road navigation model or sparse map 800. In some embodiments, vehicles 1205, 1210, 1215, 1220, and 1225 traveling along road segment 1200 may transmit a plurality of trajectories 2200 to server 1230. In some embodiments, server 1230 may generate trajectories based on landmark, road geometry, and vehicle motion information received from vehicles 1205, 1210, 1215, 1220, and 1225. To generate the autonomous vehicle road navigation model, server 1230 may cluster vehicle trajectories 1600 into a plurality of clusters 2205, 2210, 2215, 2220, 2225, and 2230, as shown in FIG. 22.

Clustering may be performed using various criteria. In some embodiments, all drives in a cluster may be similar with respect to the absolute heading along the road segment 1200. The absolute heading may be obtained from GPS signals received by vehicles 1205, 1210, 1215, 1220, and 1225. In some embodiments, the absolute heading may be obtained using dead reckoning. Dead reckoning, as one of skill in the art would understand, may be used to determine the current position and hence heading of vehicles 1205, 1210, 1215, 1220, and 1225 by using previously determined position, estimated speed, etc. Trajectories clustered by absolute heading may be useful for identifying routes along the roadways.

In some embodiments, all the drives in a duster may be similar with respect to the lane assignment (e.g., in the same lane before and after a junction) along the drive on road segment 1200. Trajectories clustered by lane assignment may be useful for identifying lanes along the roadways. In some embodiments, both criteria (e.g., absolute heading and lane assignment) may be used for clustering.

In each cluster 2205, 2210, 2215, 2220, 2225, and 2230, trajectories may be averaged to obtain a target trajectory associated with the specific cluster. For example, the trajectories from multiple drives associated with the same lane cluster may be averaged. The averaged trajectory may be a target trajectory associate with a specific lane. To average a cluster of trajectories, server 1230 may select a reference frame of an arbitrary trajectory C0. For all other trajectories (C1, . . . , Cn), server 1230 may find a rigid transformation that maps Ci to C0, Where i=1, 2, . . . , n, where n is a positive integer number, corresponding to the total number of trajectories included in the cluster. Server 1230 may compute a mean curve or trajectory in the C0 reference frame.

In some embodiments, the landmarks may define an arc length matching between different drives, which may be used for alignment of trajectories with lanes. In some embodiments, lane marks before and after a junction may be used for alignment of trajectories with lanes.

To assemble lanes from the trajectories, server 1230 may select a reference frame of an arbitrary lane. Server 1230 may map partially overlapping lanes to the selected reference frame. Server 1230 may continue mapping until all lanes are in the same reference frame. Lanes that are next to each other may be aligned as if they were the same lane, and later they may be shifted laterally.

Landmarks recognized along the road segment may be mapped to the common reference frame, first at the lane level, then at the junction level. For example, the same landmarks may be recognized multiple times by multiple vehicles in multiple drives. The data regarding the same landmarks received in different drives may be slightly different. Such data may be averaged and mapped to the same reference frame, such as the C0 reference frame. Additionally or alternatively, the variance of the data of the same landmark received in multiple drives may be calculated.

In some embodiments, each lane of road segment 120 may be associated with a target trajectory and certain landmarks. The target trajectory or a plurality of such target trajectories may be included in the autonomous vehicle road navigation model, which may be used later by other autonomous vehicles travelling along the same road segment 1200. Landmarks identified by vehicles 1205, 1210, 1215, 1220, and 1225 while the vehicles travel along road segment 1200 may be recorded in association with the target trajectory. The data of the target trajectories and landmarks may be continuously or periodically updated with new data received from other vehicles in subsequent drives.

For localization of an autonomous vehicle, the disclosed systems and methods may use an Extended Kalman Filter. The location of the vehicle may be determined based on three dimensional position data and/or three dimensional orientation data, prediction of future location ahead of vehicle's current location by integration of ego motion. The localization of vehicle may be corrected or adjusted by image observations of landmarks. For example, when vehicle detects a landmark within an image captured by the camera, the landmark may be compared to a known landmark stored within the road model or sparse map 800. The known landmark may have a known location (e.g., GPS data) along a target trajectory stored in the road model and/or sparse map 800. Based on the current speed and images of the landmark, the distance from the vehicle to the landmark may be estimated. The location of the vehicle along a target trajectory may be adjusted based on the distance to the landmark and the landmark's known location (stored in the road model or sparse map 800). The landmark's position/location data (e.g., mean values from multiple drives) stored in the road model and/or sparse map 800 may be presumed to be accurate.

In some embodiments, the disclosed system may form a closed loop subsystem, in which estimation of the vehicle six degrees of freedom location (e.g., three dimensional position data plus three dimensional orientation data) may be used for navigating (e.g., steering the wheel of) the autonomous vehicle to reach a desired point (e.g., 1.3 second ahead in the stored). In turn, data measured from the steering and actual navigation may be used to estimate the six degrees of freedom location.

In some embodiments, poles along a road, such as lampposts and power or cable line poles may be used as landmarks for localizing the vehicles. Other landmarks such as traffic signs, traffic lights, arrows on the road, stop lines, as well as static features or signatures of an object along the road segment may also be used as landmarks for localizing the vehicle. When poles are used for localization, the x observation of the poles (i.e., the viewing angle from the vehicle) may be used, rather than the y observation (i.e., the distance to the pole) since the bottoms of the poles may be occluded and sometimes they are not on the road plane.

Figure 23:
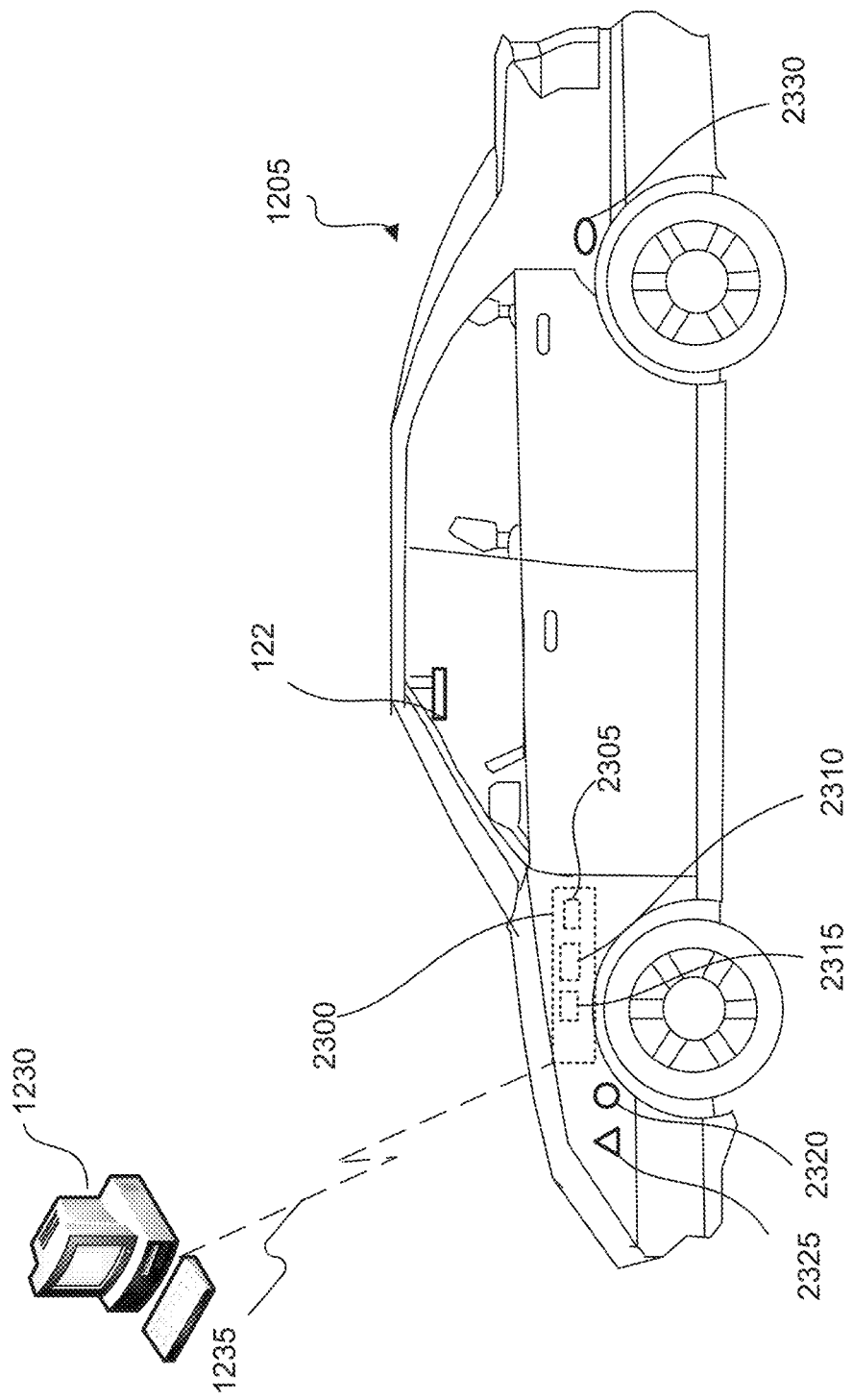
FIG. 23 illustrates a navigation system for a vehicle, which may be used for autonomous navigation, consistent with the disclosed embodiments.

FIG. 23 illustrates a navigation system for a vehicle, which may be used for autonomous navigation using a crowdsourced sparse map. For illustration, the vehicle is referenced as vehicle 1205. The vehicle shown in FIG. 23 may be any other vehicle disclosed herein, including, for example, vehicles 1210, 1215, 1220, and 1225, as well as vehicle 200 shown in other embodiments. As shown in FIG. 12, vehicle 1205 may communicate with server 1230. Vehicle 1205 may include an image capture device 122 (e.g., camera 122). Vehicle 1205 may include a navigation system 2300 configured for providing navigation guidance for vehicle 1205 to travel on a road (e.g., road segment 1200). Vehicle 1205 may also include other sensors, such as a speed sensor 2320 and an accelerometer 2325. Speed sensor 2320 may be configured to detect the speed of vehicle 1205. Accelerometer 2325 may be configured to detect an acceleration or deceleration of vehicle 1205. Vehicle 1205 shown in FIG. 23 may be an autonomous vehicle, and the navigation system 2300 may be used for providing navigation guidance for autonomous driving. Alternatively, vehicle 1205 may also be a non-autonomous, human-controlled vehicle, and navigation system 2300 may still be used for providing navigation guidance.

Navigation system 2300 may include a communication unit 2305 configured to communicate with server 1230 through communication path 1235. Navigation system 2300 may also include a GPS unit 2310 configured to receive and process UPS signals. Navigation system 2300 may further include at least one processor 2315 configured to process data, such as GPS signals, map data from sparse map 800 (which may be stored on a storage device provided onboard vehicle 1205 and/or received from server 1230), road geometry sensed by a road profile sensor 2330, images captured by camera 122, and/or autonomous vehicle road navigation model received from server 1230. The road profile sensor 2330 may include different types of devices for measuring different types of road profile, such as road surface roughness, road width, road elevation, road curvature, etc. For example, the road profile sensor 2330 may include a device that measures the motion of a suspension of vehicle 2305 to derive the road roughness profile. In some embodiments, the road profile sensor 2330 may include radar sensors to measure the distance from vehicle 1205 to road sides (e.g., barrier on the road sides), thereby measuring the width of the road. In some embodiments, the road profile sensor 2330 may include a device configured for measuring the up and down elevation of the road. In some embodiment, the road profile sensor 2330 may include a device configured to measure the road curvature. For example, a camera (e.g., camera 122 or another camera) may be used to capture images of the road showing road curvatures. Vehicle 1205 may use such images to detect road curvatures.

The at least one processor 2315 may be programmed to receive, from camera 122, at least one environmental image associated with vehicle 1205. The at least one processor 2315 may analyze the at least one environmental image to determine navigation information related to the vehicle 1205. The navigation information may include a trajectory related to the travel of vehicle 1205 along road segment 1200. The at least one processor 2315 may determine the trajectory based on motions of camera 122 (and hence the vehicle), such as three dimensional translation and three dimensional rotational motions. In some embodiments, the at least one processor 2315 may determine the translation and rotational motions of camera 122 based on analysis of a plurality of images acquired by camera 122. In some embodiments, the navigation information may include lane assignment information (e.g., in which lane vehicle 1205 is travelling along road segment 1200). The navigation information transmitted from vehicle 1205 to server 1230 may be used by server 1230 to generate and/or update an autonomous vehicle road navigation model, which may be transmitted back from server 1230 to vehicle 1205 for providing autonomous navigation guidance for vehicle 1205.

The at least one processor 2315 may also be programmed to transmit the navigation information from vehicle 1205 to server 1230. In some embodiments, the navigation information may be transmitted to server 1230 along with road information. The road location information may include at least one of the GPS signal received by the GPS unit 2310, landmark information, road geometry, lane information, etc. The at least one processor 2315 may receive, from server 1230, the autonomous vehicle road navigation model or a portion of the model. The autonomous vehicle road navigation model received from server 1230 may include at least one update based on the navigation information transmitted from vehicle 1205 to server 1230. The portion of the model transmitted from server 1230 to vehicle 1205 may include an updated portion of the model. The at least one processor 2315 may cause at least one navigational maneuver (e.g., steering such as making a turn, braking, accelerating, passing another vehicle, etc.) by vehicle 1205 based on the received autonomous vehicle road navigation model or the updated portion of the model.

The at least one processor 2315 may be configured to communicate with various sensors and components included in vehicle 1205, including communication unit 1705, GPS unit 2315, camera 122, speed sensor 2320, accelerometer 2325, and road profile sensor 2330. The at least one processor 2315 may collect information or data from various sensors and components, and transmit the information or data to server 1230 through communication unit 2305. Alternatively or additionally, various sensors or components of vehicle 1205 may also communicate with server 1230 and transmit data or information collected by the sensors or components to server 1230.

In some embodiments, vehicles 1205, 1210, 1215, 1220, and 1225 may communicate with each other, and may share navigation information with each other, such that at least one of the vehicles 1205, 1210, 1215, 1220, and 1225 may generate the autonomous vehicle road navigation model using crowdsourcing, e.g., based on information shared by other vehicles. In some embodiments, vehicles 1205, 1210, 1215, 1220, and 1225 may share navigation information with each other and each vehicle may update its own the autonomous vehicle road navigation model provided in the vehicle. In some embodiments, at least one of the vehicles 1205, 1210, 1215, 1220, and 1225 (e.g., vehicle 1205) may function as a hub vehicle. The at least one processor 2315 of the hub vehicle (e.g., vehicle 1205) may perform some or all of the functions performed by server 1230. For example, the at least one processor 2315 of the hub vehicle may communicate with other vehicles and receive navigation information from other vehicles. The at least one processor 2315 of the hub vehicle may generate the autonomous vehicle road navigation model or an update to the model based on the shared information received from other vehicles. The at least one processor 2315 of the hub vehicle may transmit the autonomous vehicle road navigation model or the update to the model to other vehicles for providing autonomous navigation guidance.

Anonymizing Navigation Information

As disclosed above, data from one or more vehicles may be used to generate a road navigation model for use in autonomous vehicle navigation. The data used to generate the road navigation model may include any data consistent with this disclosure and the data may be generated, captured, or derived as a host vehicle makes a trip from one location to the next. The host vehicle may be an autonomous vehicle, a partial autonomous vehicle, or a vehicle operated by a human driver. For example, one or more images depicting the road or environment of the vehicle may be captured as a vehicle travels from a first location to a second location. As another example, a plurality of GPS positions may be determined as the vehicle travels. The data may even be generated to determine a trajectory traveled by the vehicle, as discussed above.

In some circumstances, the data may include private information. For example, if a vehicle is stored in a garage on private property, the trajectory of the vehicle may include a trajectory from a garage and across the private property as well as the public road onto which the vehicle enters. As another example, the data may include a trajectory from a person's home to a person's workplace, or otherwise contain information that may be traceable to an individual or vehicle. For example, if a person travels from his or her home to an office building every day, there may be a plurality of trajectories generated that depict the path from the person's home to the office park. It may be possible that the data may be used to identify the person. For example, one could easily determine an address associated with the home and determine that the person associated with that home works at the office building. One may also be able to determine patterns associated with the path and correlate those patterns with an individual. For example, one could determine that the person travels from the home to office building on a daily basis. One may also be able to determine driving habits of an individual. As these examples show, there may be a need to anonymize the data such that it cannot be traced back to any individual vehicle or user.

Consistent with this disclosure, data may be anonymized by one or more systems. For example, the data may be anonymized as it is captured, as it is transmitted, as it is processed within a vehicle, as it is processed by a remote server, a combination thereof, or the like. The data may be stripped of identifying information, such as, for example, the VIN number associated with a vehicle, the identify of a user associated with the vehicle, metadata associated with the data, and so forth. Additionally or alternatively, the data may be processed as discussed below to further anonymize the data.

In some embodiments, a navigation system may collect anonymized drive information relative to a road section traversed by a host vehicle. The navigation system may be any navigation system consistent with this disclosure, for example system 100, system 2300, portions or combinations thereof, or a similar system. It is contemplated that the navigation system may be located in a host vehicle or may be in communication with a host vehicle. In some embodiments, the navigation system may be located remotely but in direct communication with one or more sensors of the host vehicle, such as a GPS unit, camera, speed sensor, accelerometer, road profile sensors, or the like. In some embodiments, the navigation system may be navigation system 2300 and the drive information may include data from GPS unit 2315, camera 122, speed sensor 2320, accelerometer 2325, and road profile sensor 2330.

Consistent with this disclosure, the navigation system may include at least one processor. The at least one processor may be configured perform one or more operations, processes, methods, or functions to anonymize data related to navigation of the host vehicle. For example, the processor may be programmed to perform the process discussed in relation to FIG. 25 below. The at least one processor may be any processor disclosed herein, such as processing unit 110, processor 2315, or another processor.

The term "road section" is used to refer to any part of a roadway, highway, or other surface (e.g., in the case of an unpaved surface) that is navigable by a vehicle. In some embodiments, a road section may comprise an intersection, a length of a highway, one or more roads in a neighborhood, a route between two destinations, or the like. Consistent with this disclosure, the term "road segment" is used to refer to any portion of a road section. In some embodiments, a road section may be comprised of one or more road segments. For example, a vehicle may collect navigation information relative to a road section and that information may be analyzed in relation to a plurality of road segments within the road section.

Figure 24:
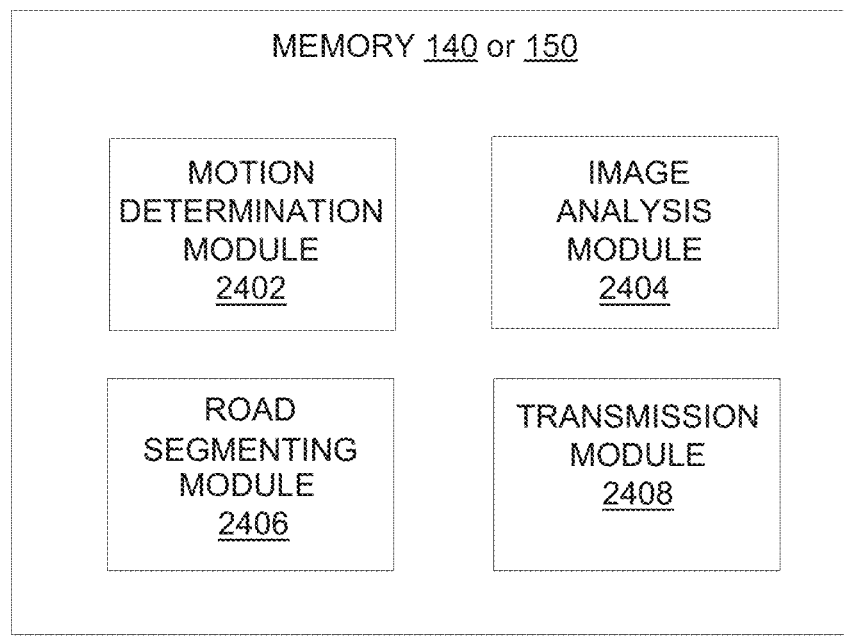
FIG. 24 illustrates a block diagram of a memory consistent with the disclosed embodiments.

FIG. 24 is an exemplary functional block diagram of a memory, which may be stored/programmed with instructions for performing one or more operations consistent with the disclosed embodiments. Although FIG. 24 refers to memory 140 or 150, the memory may be any memory disclosed herein or a previously undisclosed memory in communication with any processor disclosed herein. The following discussion refers to memory 140, but one of skill in the art will recognize that instructions may be stored in any memory consistent with this disclosure.

Memory 140 may store one or more modules which may include instructions for performing one or more operations related to anonymizing navigation information. As shown in FIG. 24, memory 140 includes motion determination module 2402, image analysis module 2404, road segmenting module 2406, and transmission module 2408. The disclosed embodiments are not limited to any particular configuration of memory 140. Further, processing unit, 110, image processor 190, applications processor 180, and/or processor 2315 may execute the instructions stored in any of modules 2402, 2404, 2406, and 2408 included in memory 140. The discussion below refers to a processor, to processing unit 110, and to processor 2315. One of skill in the art would understand that such references may refer to any other processor consistent with this disclosure. Accordingly, steps of any process or execution of any instructions stored on memory 140 may be performed by one or more processors or processing devices.

In some embodiments, motion determination module 2402 may include instructions which, when executed by a processor, determine at least one motion representation for the host vehicle. The motion representation(s) may be determined based on outputs from one or more sensors. The outputs may include an output from any sensor or combination of sensors disclosed herein. For example, the outputs may include data from GPS unit 2310, camera 122, speed sensor 2320, accelerometer 2325, and/or road profile sensor 2330. In another example, the outputs may include an output from any other sensor or combination of sensors, such as one or more lidar systems, radar systems, acoustic sensor systems, camera systems, or the like. In some embodiments, motion determination module 2402 facilitate determination of motion representations for a plurality of vehicles. For example, motion determination module 2402 may facilitate determination of a motion representation related to the navigation of the host vehicle in which navigation system 2300 is located as well as one or more motion representations of another vehicle from which one or more sensor outputs is received. The determination of one or more motion representations is discussed further below.

In some embodiments, image analysis module 2404 may store instructions which, when executed by a processor, performs analysis of one or more images to determine at least one road characteristic associated with a road section. The one or more images may be captured by one or more imaging devices, such as image capture device 122, 124, or 126. The image analysis may be performed in substantially the same manner discussed elsewhere in this disclosure. For example, the image analysis may be performed as discussed with relation to FIGS. 5A-5F, 6, and/or 7, such as monocular image analysis or stereo image analysis. In some embodiments, the processor may combine information from a set of images with additional sensory information (e.g., information from radar, lidar, etc.) to perform the image analysis.

A road characteristic may be any consistent with this disclosure. For example, the road characteristic may include an edge of the road, a center-line associated with the road, a slope of the road, or any other characteristic. In some embodiments, the road characteristic may be any object, group of Objects, or combinations of objects in the environment of a road section. For example, the road characteristic may be one or more landmarks along or on the road section, such as a stop sign, road sign, a traffic signal, a building, a marker, a combination thereof, or any other object. In some embodiments, a road characteristic may be any stationary or dynamic non-transient object. A non-transient object may be a road characteristic if it is capable of detection by a vehicle with a predetermined level of confidence. For example, a temporary construction sign may be a road characteristic if it is likely that a vehicle may detect the sign when navigating on the road section. Other examples of non-transient but temporary objects that may be considered road characteristics may include, dynamic lane shift barriers or signs (e.g., those used to switch the direction of one or more lanes as need, for example, during rush hour traffic, etc.), signs or gates associated with special lanes (e.g., signs indicating whether a high-occupancy lane is open at a particular time, signs associated with toll-roads, etc.), and so forth. Transient temporary objects may be excluded from inclusion as a road characteristic. For example, a pedestrian, vehicle, animal, or other transient object that is likely to not be in the same or similar position on a subsequent navigation of the road section may be excluded as a road characteristic. In some embodiments, the road characteristic may include a temporary characteristic, such as a weather condition, an indication of a road hazard (e.g., a car crash, an oil spill, a vehicle stopped in a travel lane, etc.), or the like. Image analysis module 2404 may be configured to facilitate the determination of a position, shape, size, or other information associated with the road characteristic. For example, if the road characteristic is a stop sign detected on the side of the road, processor 2315 may determine a position of the stop sign by executing instructions stored on image analysis module 2404.

In some embodiments, road segmenting module 2406 may store instructions which, when executed by a processor, perform one or more operations for assembling and anonymizing road segment information. The road segment information may include, for example, a motion representation determined by motion determination module 2402 and/or a road characteristic determined by image analysis module 2404. For example, the road segment information may include a trajectory traveled by a host vehicle and a position of a road edge in relation to the vehicle. In some embodiments, road segmenting module 2406 may store instructions for determining a plurality of road segment information associated with different segments of the road. The plurality of segments may include one or more segments determined from the information received from a single vehicle. For example, a trajectory associated with a first vehicle may be segmented into one or more segments and information relating to each segment may be determined. The plurality of segments may additionally or alternatively include one or more segments determined from the information received from a plurality of vehicles. For example, a first trajectory associated with a first vehicle may be segmented into one or more segments and a second trajectory associated with a second vehicle may be segmented into one or more segments.

A road segment may be of any length and the length may be determined by any means. For example, the length of a road segment may be randomly selected within a determined or predetermined interval. In some embodiments, the length of a road segment may be a function of the type or location of the road section to which it is related. For example, a road segment of a road section comprised of a stretch of highway may be significantly longer than a road segment of a road section comprised of a plurality of city blocks. In this example, the road segment relating to the stretch of highway may be, for example, several kilometers in length, while the road segment relating to the city blocks may be one kilometer or less. In some embodiments, the length of a road segment may be a function of the speed of navigation on a road section. For example, a road segment on a stretch of interstate, where the speed limit may exceed 65 miles per hour, may be significantly longer than a road segment on a rural road, on which the speed limit may be 35 miles per hour. In some embodiments, the length of a road segment may be a function of the complexity of the navigation on the road section. For example, a road segment on a straight road section may be significantly longer than that on a curvy road section. Similarly, a road segment associated with a route that includes few turns may be significantly longer than one that requires multiple or frequent turns. In some embodiments, the length of a road section may be determined by a user. For example, a contractor using a system consistent with this disclosure, may dictate that each road segment be within a range of certain lengths. In some embodiments, the length of the road section may be determined by the characteristics or qualities of the road section. For example, each road segment may be of a length at which one or more landmarks may be associated with the segment. In another example, if a road segment contains a tunnel, roundabout, bridge or other unique feature, at least one road segment may be at least the same length as the unique feature. In some embodiments, the length of a road segment may be determined based on the density of landmarks or other detectable road characteristics. The density of road characteristics may be predetermined and may be expressed as a range, threshold, or other quantity. For example, each road segment may be of a length in which, for example, there are 5 to 7 landmarks, objects, or non-semantic features detected by the vehicle. The examples above are exemplary only and it is understood that a road segment may have any length and may be determined by any means consistent with this disclosure.

Road segmenting module 2406 may include instructions that, when executed by a processor, optimize the anonymization of the data relating to navigational information of a vehicle. The instructions may optimize anonymization by instructing processor 2315 when and where to segment the information. For example, a first instruction may dictate that a trajectory should be segmented such that the beginning, end, or both are not included in any segment. In this example, dictating that the beginning of a trajectory not be included in a segment may ensure that a driveway, garage, or other private portion of the trajectory (e.g., a portion associated with or at a home or workplace) is not included. It is contemplated that the private information, which is not included in any segment, may be deleted or stored in a secure location. In some embodiments, the private information may be temporarily stored in a buffer while processor 2315 determines whether the private information is needed or useful for generating an autonomous vehicle road navigation model. For example, a road segment including a trajectory into or out of an office building parking lot may be stored in the buffer and transmitted for inclusion in a navigation model if, for example, it is determined appropriate or preferable to map a turn into or out of the parking lot is by use of the road segment. In a similar example, the same road segment may be stored in the buffer and transmitted for inclusion in the navigation model if, for example, there is an intersection, unique road feature, other road characteristic included in the road segment that is appropriate to include in the model. It is contemplated that road segment information stored in the buffer may be further severed into a plurality of sub-segments, which may allow for preserved anonymity if one or more portions of the road segment are later used in a navigation model.

Road segmenting module 2406 may include instructions that, when executed by a processor, ensure that sufficient information is included to generate a navigational model for an autonomous vehicle. The instructions may ensure that sufficient information is included in the segmented road information by instructing processor 2315 to preserve portions of the data. For example, the instructions may dictate that information relating to a unique road structure are included in a segment, that a minimum percentage of the data is preserved, that date relating to areas that are not commonly traveled is preserved or the like. For example, an instruction may dictate that if a tunnel, a bridge, a roundabout, a merge-lane, a highway exit ramp, or other unique road characteristic is detected, the information should be preserved such that information related to the unique characteristic is not lost by segmentation. It is contemplated that if the instructions for preserving unique data is inconsistent with the instructions for removing data relating to private areas, road segmenting module 2406 may give preference to ensuring anonymity and the private information may be deleted. Additional examples of the type of segmenting performed by processor 2315 upon execution of the instructions in road segmenting module 2406 are discussed below.

Memory 140 may include transmission module 2408, which may store instructions that, when executed by a processor, cause transmission of the road segment information. The road segment information may be transmitted to an external server, such as server 1230, for further processing consistent with this disclosure. By segmenting the information before transmitting it to server 1230, anonymity may be preserved. The road segment information may also be transmitted to another vehicle or another system for additional processing. In some embodiments, the information may be transmitted to server 1230 for further processing consistent with process 3100, discussed below.

Any of modules 2402, 2404, 2406, and 2408 may be implemented with a trained system (e.g., a neural network or a deep neural network) or an untrained system.

Figure 25:
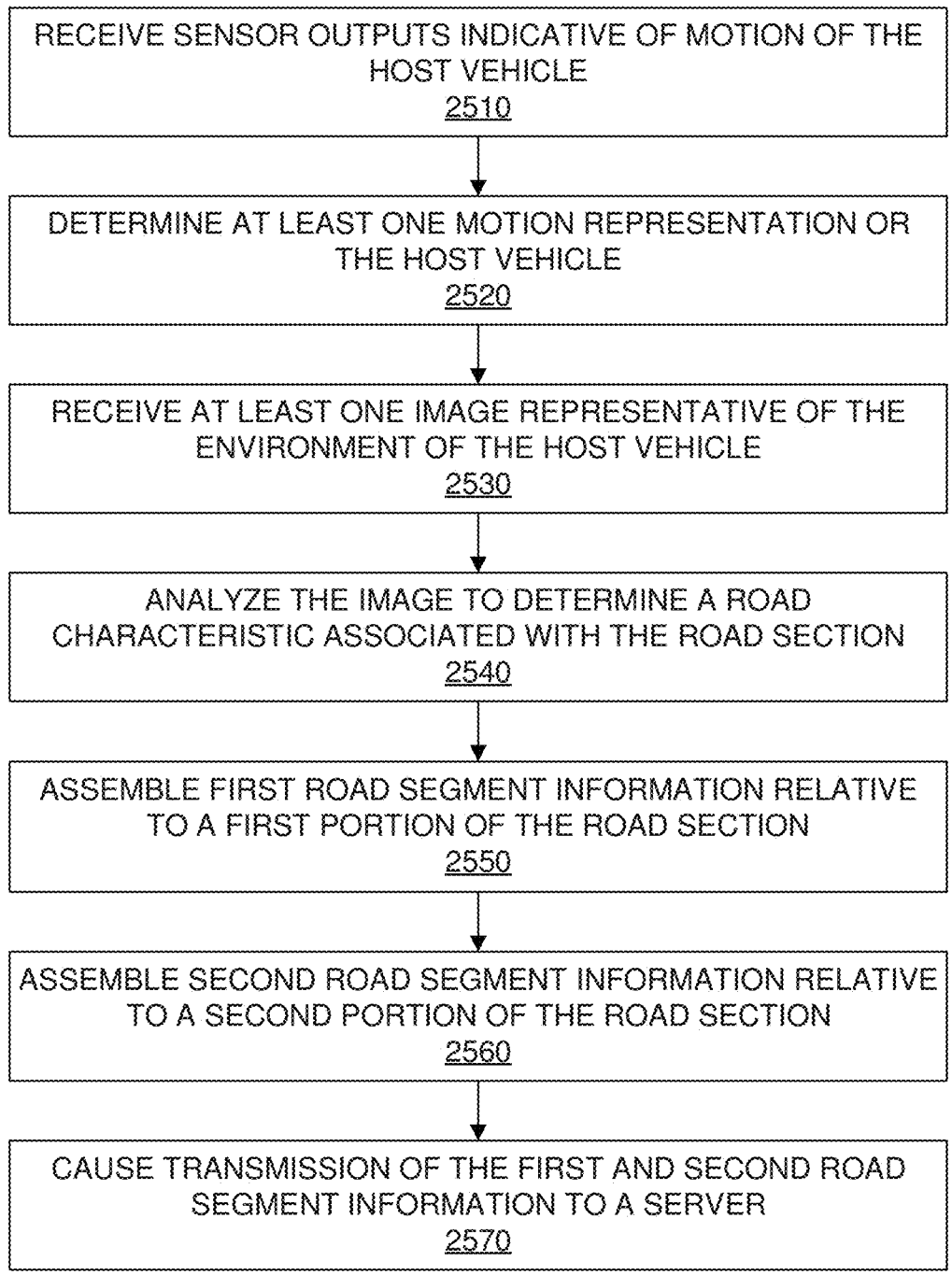
FIG. 25 is a flowchart showing an exemplary process for anonymizing navigation information consistent with the disclosed embodiments.

FIG. 25 is a flowchart showing an exemplary process 2500 for collecting anonymized drive information relative to a road section traversed by a host vehicle. Process 2500 may be performed by processor 2315 included in a navigation system 2300, by processing unit 110 included in system 100, or by another processor. In some embodiments, process 2500 may be executed by processor 2315 according to the instructions stored in motion determination module 2402, image analysis module 2404, road segmenting module 2406, and/or transmission module 2408.

Consistent with this disclosure, process 2500 may include a step 2510 for receiving outputs indicative of motion of the host vehicle. The outputs may include information output from one or more sensors. The one or more sensors may be configured to collect data relating to the motion, position, or other quality associated with the host vehicle. The output information may be received by a processor or a system in communication with a processor. In some embodiments, the one or more sensors may include a GPS sensor, one or more of a speed sensor or an accelerometer. For example, processor 2315 may be configured to receive output information from one or more of GPS unit 2310, camera 122, speed sensor 2320, accelerometer 2325, and/or road profile sensor 2330. The outputs may be received from any of the sensors directly or indirectly, by wired transmission, by wireless transmission, or by any means disclosed herein.

In some embodiments, the information may have been previously processed to determine one or more outputs consistent with this disclosure. For example, the information may have been processed to determine a trajectory of the host vehicle and the determined trajectory may be received by processor 2315 at step 2510. In some embodiments, processor 2315 may receive raw data directly from the one or more sensors.

Consistent with this disclosure, process 2500 may include a step 2520 for determining at least one motion representation for the host vehicle. The at least one motion representation may be determined based, at least in part, on outputs from one or more sensors. For example, the motion representations may be determined from the outputs received at step 2510 of process 2500. The at least one motion representation may include any indicator of movement of the host vehicle. For example, a motion representation may include an acceleration associated with the host vehicle, a velocity associated with the vehicle, a longitudinal and latitudinal location of the vehicle at a given time, a three-dimensional position in space associated with the vehicle, or the like. In some embodiments, the at least one motion representation may include a determined trajectory of the host vehicle. The trajectory may be determined by any means disclosed herein, such as that described in relation to FIG. 12, FIG. 20, and elsewhere. FIG. 26 describes the trajectory for a plurality of vehicles, any of which may be the trajectory determined at step 2520.

In some embodiments, the motion representation may include an ego-motion representation for the host vehicle relative to a predetermined coordinate system. For example, the ego-motion may include the rotational, translational, lateral, or other movement of the vehicle. The ego-motion of the host vehicle may be determined form, for example, one or more of a velocity associated with the vehicle, a yaw rate associated with the vehicle, a tilt or roll associated with the vehicle, and so forth. In some embodiments, the ego-motion representation for the host vehicle may be determined for six degrees of freedom. In other embodiments, the ego-motion representation for the host vehicle may be determined for any other degree of freedom, for example, for three degrees of freedom.

Process 2500 may include a step 2530 for receiving at least one image representative of an environment of the host vehicle along the road segment. The at least one image may be received from one or more cameras associated with the host vehicle. For example, processor 2315 may receive one or more images from image capture device 122. The one or more images may be received by any means disclosed herein, including wireless transmission, wired transmission, or any other method. The one or more images may include a representation of the environment of the host vehicle. For example, the one or more images may include an image similar to that of FIG. 29A or FIG. 299, described in more detail below.

Process 2500 may include a step 2540 for analyzing the at least one image to determine at least one road characteristic associated with the road section. For example, processor 2315 may analyze the one or more images according to the instructions stored in image analysis module 2404, described above. As another example, a trained system, such as a neural network, may be used to determine the at least one road characteristic. The one or more characteristics may include any characteristic of the road, such as a centerline of the road, an edge of the road, a landmark along the road, a pot hole in the road, a turn in the road, and so forth. In some embodiments, the determined at least one road characteristic may include a lane characteristic including an indicator of one or more of a detected lane split, lane merge, dashed lane marking line, solid lane marking line, road surface color within a lane, lane line color, lane direction, or lane type. For example, the lane characteristic may include a determination that a lane is an HOV lane and is separated from other lanes by a solid line. In some embodiments, the determined at least one road characteristic may include an indicator of the road edge. As discussed elsewhere in this disclosure, the road edge may be determined based on a detected barrier along the edge, a detected sidewalk, a line indicative of an edge, a curb along the edge, or by detection of other objects along the road.

In some embodiments, the one or more characteristics may include one or more predefined characteristics. For example, processor 2315 may be specifically configured to identify any one or more characteristics consistent with this disclosure. Some road characteristics may be of a type that is commonly or frequently associated with a road, such as stop signs, speed limit signs, traffic signals, other semantic objects, and the like. Processor 2315 may detect these semantic road characteristics using image analysis as described above and learned or predefined associations. For example, processor 2315 may detect a red octagonal object and determine that the object is a stop sign. As another example, processor 2315 may detect text commonly associated with a road sign, such as "speed limit," "yield," "school zone" or the like, and determine that an object is a road sign. Other road characteristics that are not as frequently occurring or other non-semantic objects or features may likewise be determined. For example, a pot hole or patch of discolored concrete may serve as a road characteristic. In this example, processor 2315 may analyze an image to detect the pothole or discolored concrete by, for example, detecting a shadow associated with the pot hole, a dark spot associated with the discoloration, or any other element that distinguishes the non-semantic object from a surrounding environment. The non-semantic feature may then be used as a road characteristic for subsequent vehicles navigating along the road section.

In some embodiments, the determined at least one road characteristic may include a landmark identifier. The landmark identifier may include any landmark, for example, those discussed in relation to FIG. 10. The landmark identifier may include information relating to the landmark type, a landmark location, or a combination thereof. The landmark type may include at least one of a traffic signal, a pole, a road marking, a stop line, or a sign. The landmark location may include a GPS coordinate associated with the landmark, a position of the landmark relative to the road or to another landmark, or any other means for identifying the location of the landmark consistent with this disclosure. For example, the landmark identifier may include an indicator that the landmark is a street sign and a position of the street sign relative to the road.

In some embodiments, the determined road condition may include a temporary condition associated with the road. The temporary condition may be one that is not always present on the road, but is detected in the image received by processor 2315. The temporary condition may include, for example, the presence of a car crash, a stopped vehicle, a pedestrian or group of pedestrians, an animal on the road, a weather condition, or other condition. For example, the determined at least one road characteristic may include a temporary road characteristic comprising an indicator of a weather condition along the road section. The weather condition may be associated with at least one of snow, rain, fog, or sun glare.

Process 2500 may include a step 2550 for assembling first road segment information relative to a first portion of the road section. The first road segment information may include at least one motion representation for the host vehicle and/or at least one road characteristic relative to the first portion of the road. For example, processor 2315 may assemble first road segment information comprising a motion representation determined at step 2520 and a road characteristic determined at step 2540. As an example, the motion representation may include a trajectory traveled by a host vehicle and the assembled road segment may include the trajectory and a road characteristic associated with the portion of the road corresponding with the trajectory.

Processor 2315 may assemble the first road segment according to the instructions stored in road segmenting module 2406, described above. For example, processor 2315 may divide a trajectory into a plurality of segments according to the instructions. Processor 2315 may then select a first road segment from the plurality of segments and pair the first segment with a road characteristic to assemble a first road segment information.

Assembly of first road segment information may be performed as information is received from a host vehicle. For example, during a trip, information from one or more sensors and one or more cameras may be received by processor 2315 and processor 2315 may begin determining the motion representation and road characteristics from the received information and assembling the information into a first road segment information. In this example, a plurality of road segment information may be determined sequentially, which may aid in using the segmented information in generating a navigational model.

In some embodiments, the processor may be programmed to begin assembly of the first road segment information after a predetermined delay. As discussed with relation to road segmenting module 2406, the delayed assembly may help anonymize the road segment information. For example, if the road segment information is assembled without a delay, the first assembled road segment information may include information relating to the starting point of the path traveled by the vehicle. The starting point may include private information, such as the location of a garage, the path of a driveway, or other information. The starting point may also be used to determine an individual associated with the vehicle or the driven route if, for example, the starting point is at an individual's home or business. The delay functions may ensure that the initial portion of a trip is not used in assembling the first road segment information. The delay may include a temporal delay. For example, information relating the first ten seconds, twenty seconds, thirty seconds, minute, two minutes, five minutes, or other interval may be excluded from the first road segment information. The delay may also be distance based. For example, information relating to the first hundred feet, five-hundred feet, half mile, mile, or other distance may be excluded from the first road segment information. The delay may be accomplished by any means consistent with this disclosure. For example, the one or more sensors may not begin capturing information related to motion of the host vehicle or the road associated therewith until the delay has passed. In another example, the one or more sensors may capture information for the duration of a trip and processor 2315 may be instructed to delete or exclude the information captured during the delay. In some embodiments, the length of the delay, whether temporal or distance based, may be randomly determined or may be randomly determined within a predefined threshold. For example, the delay may be randomly selected to be between a predetermined time range from 5 to 45 seconds, a predetermined distance of 0.5 km to 2 km, or the like.

It is contemplated that other means may be used to preserve the anonymity of the information assembled in the first road segment information. For example, if an image received by processor 2315 contains a home, driveway, or other indicator of private data, processor 2315 may be programmed to exclude any information retrieved in relation with the private data from inclusion in the first road segment information. Examples of means for preserving the anonymity of the information is discussed throughout this disclosure, including the discussion relating to road segmenting module 2406.

Process 2500 may include a step 2560 for assembling second road segment information relative to a second portion of the road section. Similar to the first road segment information assembled at step 2540, the second road segment information may include at least one motion representation of the host vehicle and/or at least one road characteristic relative to the road section. For example, processor 2315 may assemble second road segment information comprising a motion representation determined at step 2520 and a road characteristic determined at step 2540. As an example, the motion representation may include a trajectory traveled by a host vehicle and the assembled road segment may include the trajectory and a road characteristic associated with the portion of the road corresponding with the trajectory. The second road segment information may be assembled in substantially the same manner as discussed in relation to the first road segment information.

Assembly of the second road segment information may include means for ensuring the anonymity of the information similar to that of the first segment information. For example, the second road segment information may be assembled after a delay, and portions of the road section associated with private information (e.g., proximity to a home or workplace) may be excluded from the second road segment information, and so forth.

Consistent with this disclosure, the second portion of the road section may be different from the first portion of the road section. For example, the road section associated with the first road segment information assembled at step 2550 may be a different road section than that for which road segment information is assembled as the second road segment information assembled at step 2560. Accordingly, the second road segment information may include a different road characteristic and/or motion representation that that of the first segment information.

In some embodiments, the second portion of the road section may be spatially separated from the first portion of the road section. The first and second road section may be spatially separated by a third portion of the road section. The third portion may be of any distance. Separating the first and second portion by a third portion may further anonymize the information. For example, the third portion may not be included in a map generated using the segmented road information. In some embodiments, information relating to the first and second portion may be transmitted for further processing, whereas the information relating to the third portion may be deleted, stored without processing, or otherwise excluded from further processing consistent with this disclosure.

The third portion may be of any length. As the distance between a first road section and a second road section increases, the possibility that a vehicle turned, exited, or otherwise did not travel between the first section and the second section becomes more likely. As such, in some embodiments, a relatively large spatial separation represented by the third portion may be preferred. For example, the first portion of the road section may be spatially separated from the second portion of the road section by a distance of at least 1 km. In other embodiments, the first portion of the road section may be spatially separated from the second portion of the road section by any other distance (e.g., 0.5 km, 1.5 km, 2 km, 2.5 km, 3 k, 2.5 km, 5 km, etc.). The length of the third portion may be determined by any means consistent with this disclosure, including, for example, the means for determining the length of the first and second road segments discussed in relation to road segmenting module 2406.

Figure 26A:
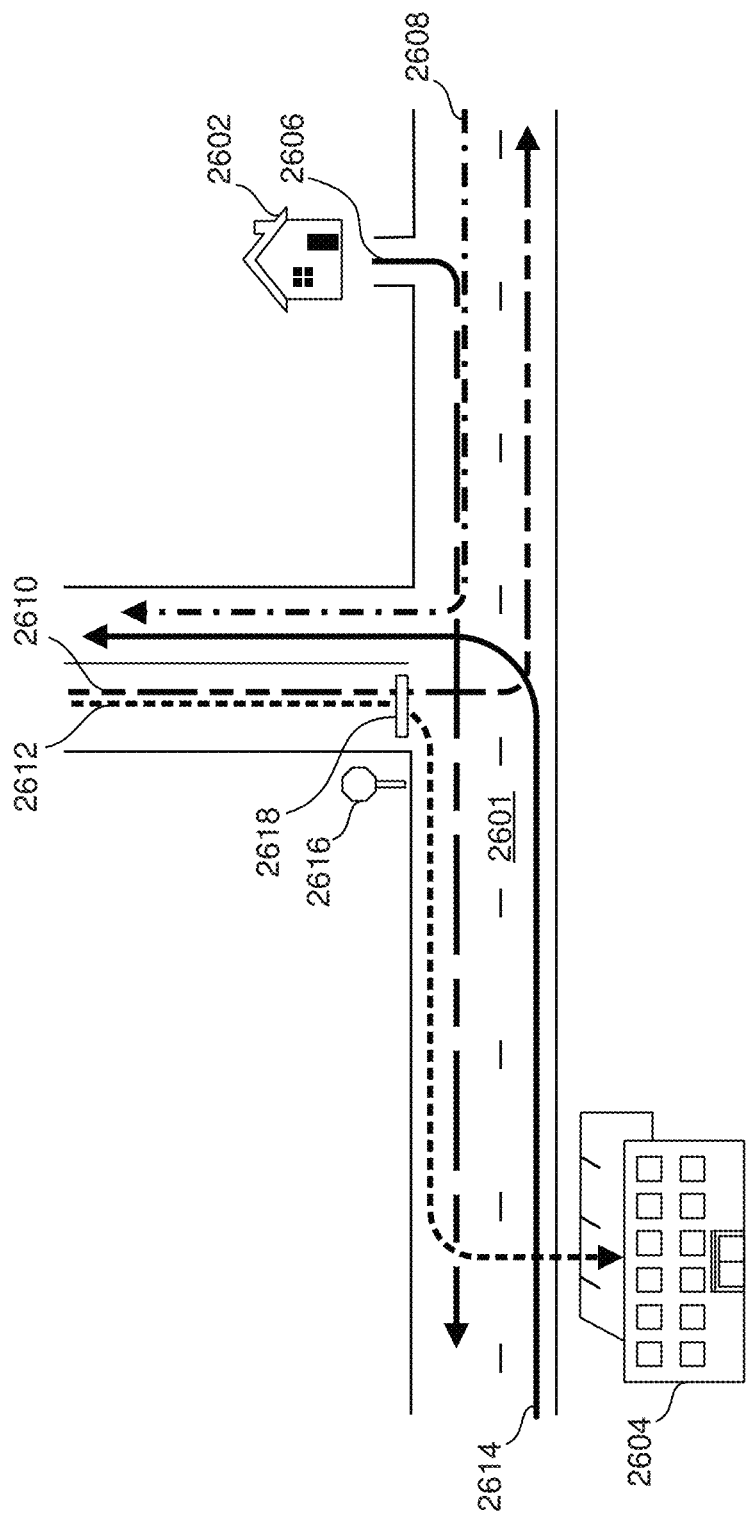
FIG. 26A illustrates an example road section with landmarks and motion representations consistent with the disclosed embodiments.
Figure 26B:
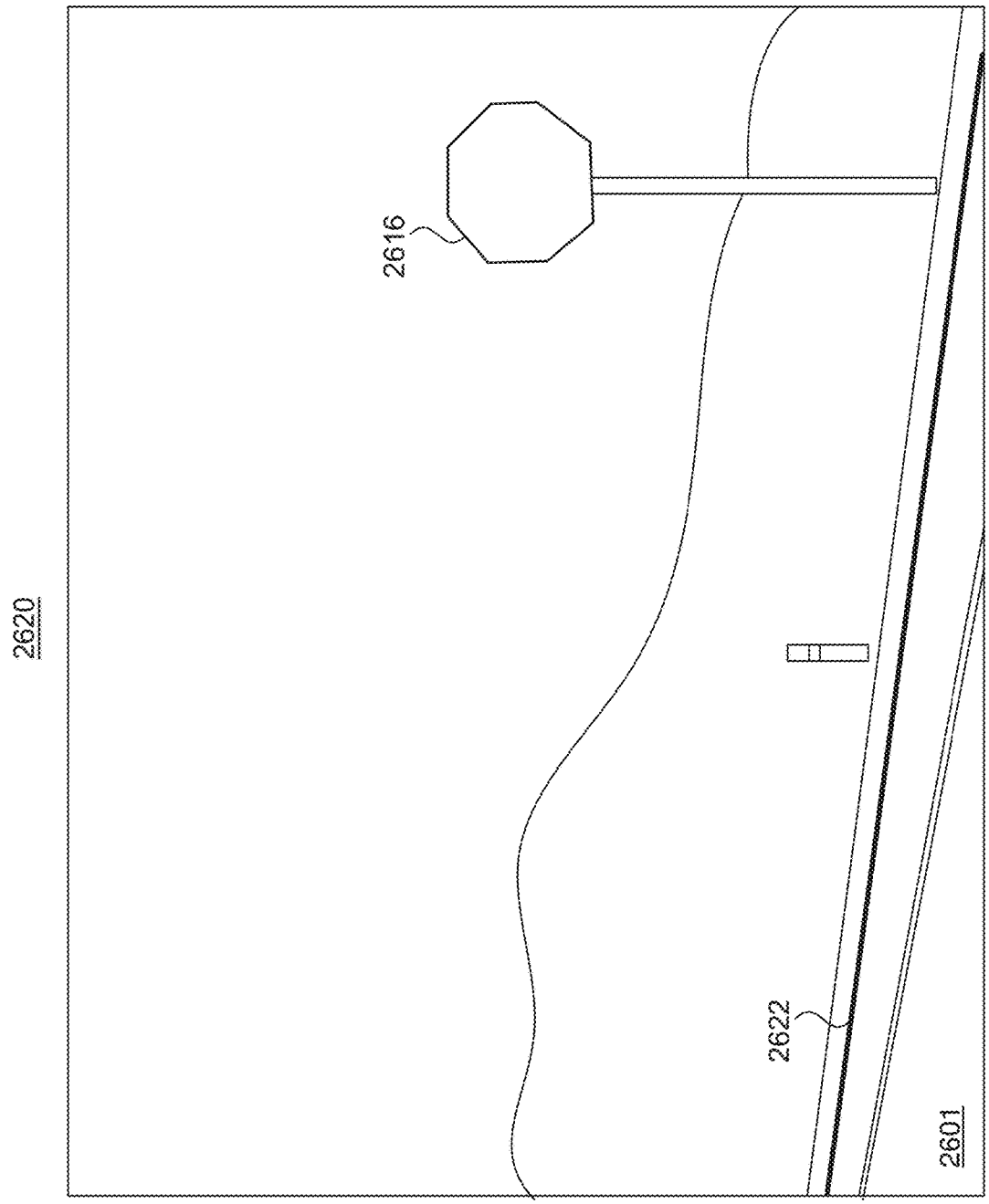
FIG. 26B illustrates an example image that may be captured by a navigation system consistent with the disclosed embodiments.
Figure 26C:
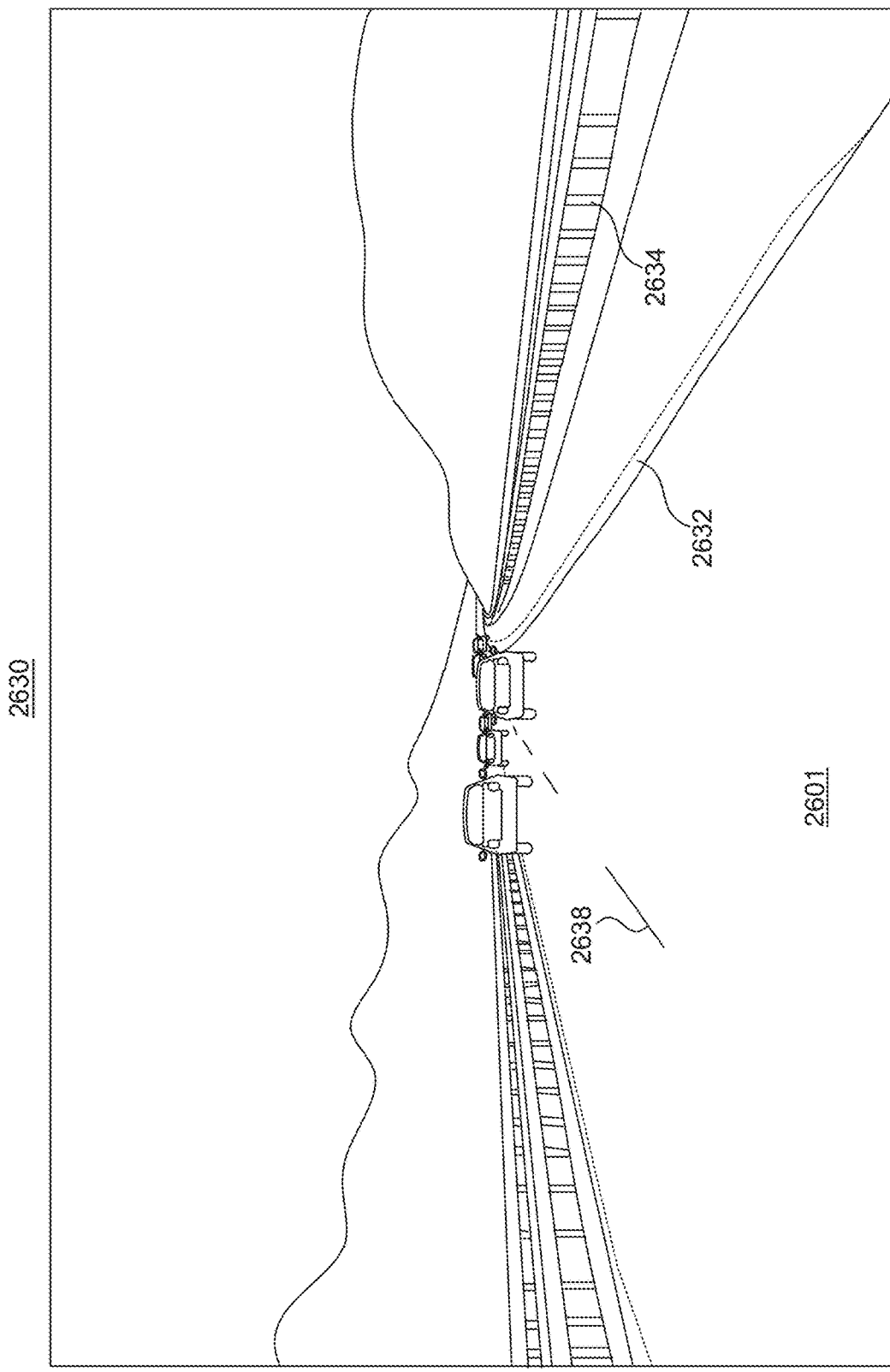
FIG. 26C illustrates an example image a may be captured by a navigation system consistent with the disclosed embodiments.
Figure 27:
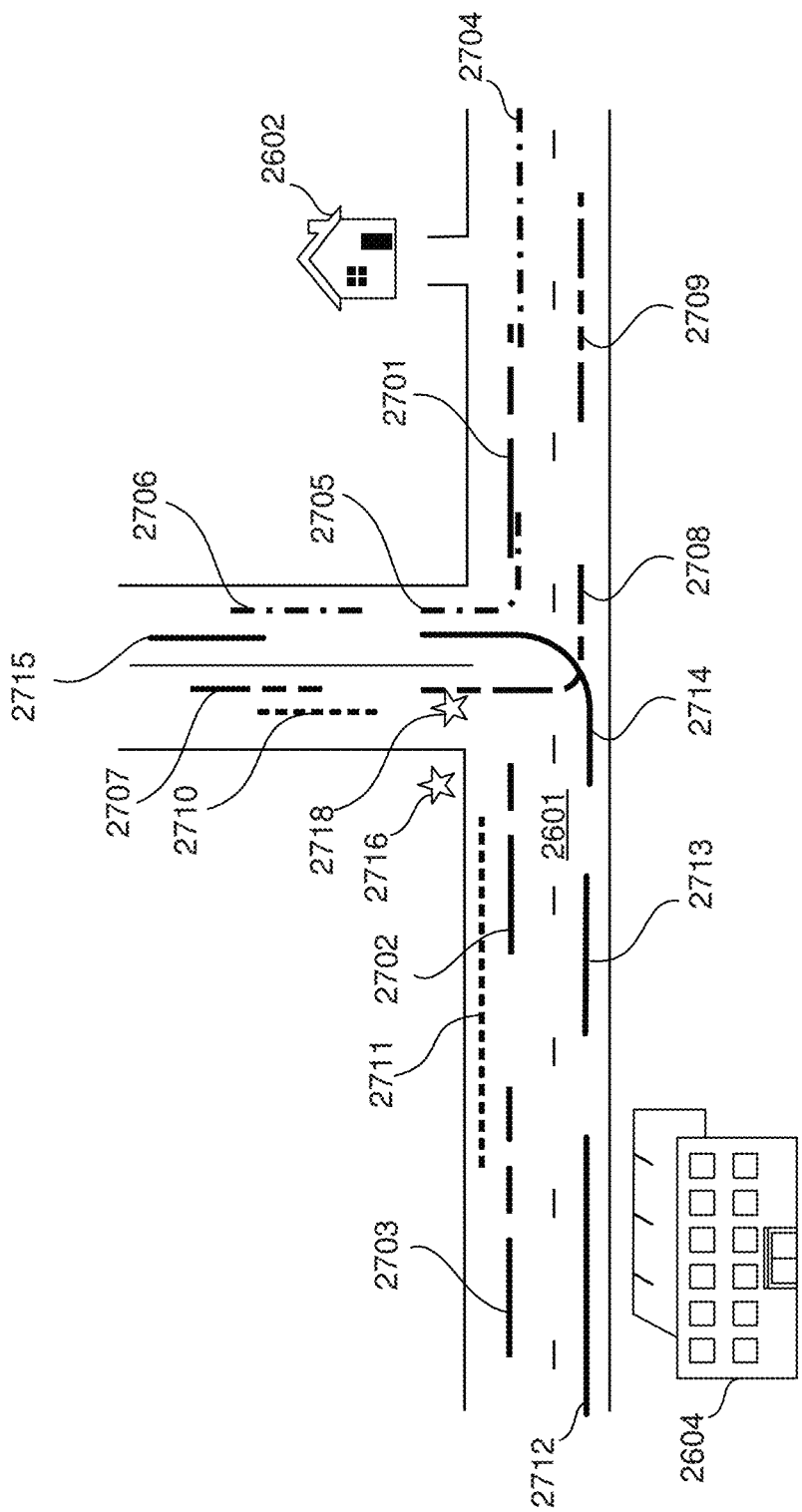
FIG. 27 illustrates an example road section with determined road segments consistent with the disclosed embodiments.
Figure 28:
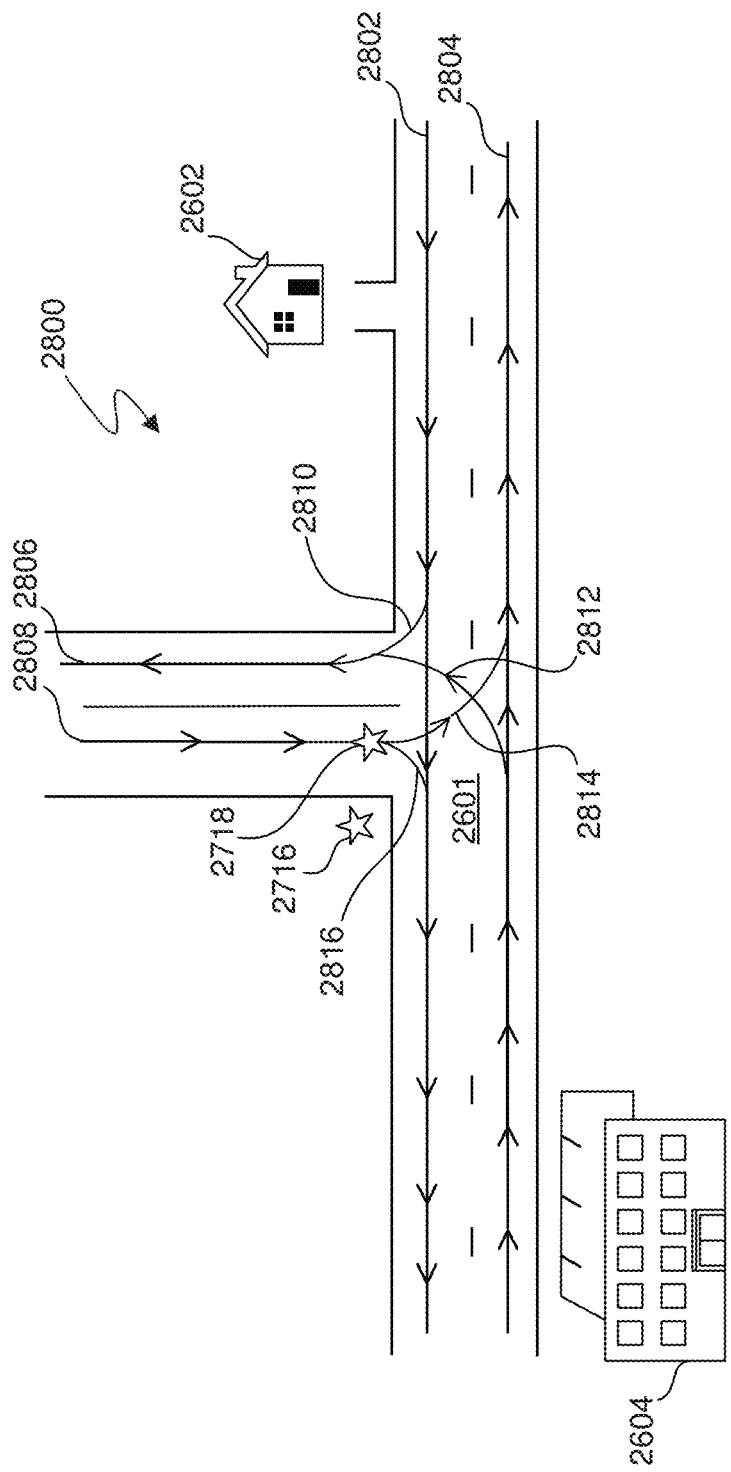
FIG. 28 illustrates an example road section depicting aspects of an autonomous vehicle navigation model consistent with the disclosed embodiments.

Assembly of first road segment information and second road segment information is discussed further with relation to FIGS. 26-28. Each of the first road segment information and the second road segment information may be assembled based on one or more factors. The anonymity features described above are examples of such factors. In some embodiments, the first portion of the road associated with the first road segment information and the second portion of the road associated with the second road segment information may be a predetermined or randomized length. For example, the first portion of the road section and the second portion of the road section may each have a length of at least 2 km, 2 km to 9 km, at least 4 km, less than 10 km, or the like. The length of each portion (e.g., 1 km, 1.5 km, 2 km, 2.5 km, 3 km, 4 km, 5 km, etc.) may be an arbitrary length, a predetermined length, or a determined optimized length. For example, processor 2315 may receive information relating to 20 km of a road section and may determine that the 20 km should be segmented into 3 portions of 4 km each and the remaining length of the road section should be deleted to provide the anonymity factors discussed above. In another example, processor 2315 may determine that a first segment should include a portion of 5 km in length and a second segment should include a road portion of 4 km in length. The examples are for explanatory purposed only and are not limiting. As discussed, each road segment may be of any length. Examples of the means for determining the length of each portion are discussed above in relation to road segmenting module 2406.

In some embodiments, the road section may be randomly segmented. For example, the first portion of the road section and the second portions of the road section may each have a length that is randomly or arbitrarily determined by the processor. For example, processor 2315 may determine one or more random lengths and assign the random lengths to each of the road segments for which road segment information is to be assembled. In some embodiments, the randomly determined length may fall within a threshold of a predetermined length. For example, the randomly determined length may fall with in +--0.5 km of a predetermined length.

Consistent with this disclosure, the first and second road sections may be determined based on data relating to the road section, to previously determined road sections, or other data. In some embodiments, a first road section, a second road section, or both may be determined based on a characteristic of the road. For example, if the road section includes a turn, processor 2315 may be programmed to ensure that either the first section or the second section includes the segment corresponding with the turn. The road segment information corresponding with the turn may be beneficial in generating a navigation model for an autonomous vehicle because a turn may be a more difficult for an autonomous vehicle to navigate than a straight segment. Similarly, if the road includes a unique road characteristic, processor 2315 may be programmed such that at least one segment includes the unique characteristic. For example, in cases where the road section includes a tunnel, at least one of the first portion of the road or the second portion of the road section will be designated by the at least one processor such that a length of the tunnel is fully included within either the first portion of the road section or the second portion of the road section. In some embodiments, processor 2315 may determine the first and second road portions based on data received from, for example, server 1230. For example, if server 1230 receives the first road segment information and the second road segment information from a plurality of vehicles, as discussed with relation to FIG. 12 and FIG. 23, server 1230 may be configured to determine portions of a road section for which no information has been obtained. In this instance, server 1230 may transmit to processor 2315 instructions for including the missing portion as part of either the first or second segment of the road section.

While the discussion of process 2500 refers to a first and second road segment, it is understood that any number of road segments may be generated. For example, a plurality of road segments may be generated for any one road section.

Process 2500 may include a step 2570 for causing transmission of the first road segment information and the second road segment information to a server remotely located relative to the host vehicle for assembly of an autonomous vehicle road navigation model. For example, processor 2315 may transmit the first road segment information assembled at step 2550 and/or the second road segment information assembled at step 2560 to server 1230. Server 1230 may generate an autonomous vehicle road navigation map using road segment information from a plurality of host vehicles, as discussed in relation to FIG. 12, FIG. 14, and/or FIG. 21, and elsewhere herein. Because the data transmitted to server 1230 comprises one or more segments rather than an unprocessed route traveled by a host vehicle, the data may not be traceable to a route traveled by the vehicle, thereby assuring anonymity of the data. In examples where processor 2315 assembles information relating to a third portion of the road, the third portion separating the first portion and the second portion, the processor may forego transmission to the server of assembled road segment information relating to the third portion of the road section. By foregoing transmission of information related to the third portion, processor 2315 may ensure that the data is anonymized, as discussed above.

In some embodiments, after assembly of the first and second road segment information, processor 2315 may temporarily store the information and only transmit the information upon a determination that the information does not contain any information that may be traceable to a user or a vehicle. For example, the processor may be programmed to forego transmission to the server of a final assembly of road segment information where the final assembly of road segment information is representative of an end of a drive by a host vehicle. Ensuring that the road segment information excludes the end point of a drive may help ensure that the information may not be used to identify a user or vehicle used to generate the road segment information. In another example, the processor may be programmed to forego transmission to the server of an initial assembly of road segment information where the initial assembly of road segment information includes a representation of a beginning of a drive by the host vehicle. As another example, processor 2315 may perform additional processing to determine whether identifying information is included in either the motion representation, the road characteristic, or other data such as the road segment information. For example, processor 2315 may perform secondary image analysis to ensure that no images included in the road segment information include, for example, a reflection of the vehicle used to collect the information, an image of a user's home or address, or other data that may be associated with an individual or vehicle.

In some embodiments, a first set of road segment information may be transmitted at a first time and a second set of road segment information may be transmitted at a second time. As discussed above, a single road section may be segmented into a plurality of road segments and, to preserve anonymity, less than all road segments may be transmitted at a first time. It is contemplated that, at a second time, additional road segment information may be transmitted. In these embodiments, substantially all of the road segment information generated by a single vehicle for a road section may be used in generating an autonomous vehicle road navigation model, while anonymity is preserved. This may be beneficial when, for example, relatively few vehicles travel the road section and, therefore, the road segment information cannot be effectively or efficiently transmitted from a plurality of vehicles.

Process 2500 may include a step (not pictured) for receiving a navigation model and causing a navigational response in the host vehicle. For example, the processor may by programmed to receive, from a remote server, an autonomous vehicle navigation model and cause at least one navigational maneuver by the host vehicle based on the autonomous vehicle road navigation model. The autonomous vehicle road navigation model may be the navigational model generated by server 1230, for example, at step 2570. As discussed elsewhere in this disclosure, the navigational maneuver may be any response by the host vehicle, for example, acceleration, braking, turning, changing lanes, stopping, or the like.

One or ordinary skill in the art, with the benefit of this disclosure, would understand that the steps of process 2500 may be performed in any order and that some steps may be excluded. For example, there is no reason why steps 2530 and 2540, which relate to determining a road characteristic associated with a road section, cannot be performed before or at substantially the same time as steps 2510 and 2520, which relate to determining one or more motion representations of the host vehicle. Similarly, any other steps of process 2500 may be rearranged or omitted. Process 2500 may be adjusted, for example, to meet or exceed regulatory standards related to autonomous vehicle navigation and/or anonymizing navigation data. For example, regulatory standards may dictate the level of detail that an autonomous vehicle road navigation model must contain. One of ordinary skill in the art would understand how to adjust process 2500 to collect information needed to meet the regulatory standards while maintaining the anonymity of the data.

FIG. 26A is an exemplary diagram of a plurality of motion representations and road characteristics of the type that may be received or determined by process 2500. FIGS. 26B and 26C are examples of images of the type that may be received during process 2500 and used to determine one or more road characteristics. The figures are exemplary only and used to further the understanding of process 2500 or a similar means for anonymizing drive information relative to a road section traversed by a host vehicle.

FIG. 26A depicts road section 2601 and a plurality of trajectories 2606, 2608, 2610, 2612, and 2614, each trajectory representing a path traveled by a host vehicle. As discussed above, a trajectory may be received from one or more sensors as part of step 2510 of process 2500. Additionally or alternatively, a trajectory may be determined from raw data as part of step 2520, the trajectory being determined as described with respect to FIG. 11A, FIG. 22, and elsewhere in this disclosure.

In some embodiments, each of trajectories 2606, 2608, 2610, 2612, and 2614 may represent the path traveled by a single host vehicle, each path being traveled at a different time. For example, vehicle 1205 may travel trajectory 2606 at a first time, trajectory 2608 at a second time, trajectory 2610 at a third time, trajectory 2612 at a fourth time, and trajectory 2614 at a fifth time. In some embodiments, each of trajectories 2606, 2608, 2610, 2612, and 2614 may represent the path traveled by different host vehicles. For example, vehicle 1205 may travel trajectory 2606, vehicle 1210 may travel trajectory 2608, vehicle 1215 may travel trajectory 2610, vehicle 1220 may travel trajectory 2612, and vehicle 1225 may travel trajectory 2614. In other examples, vehicle 1205 may travel trajectory 2606 at a first time and trajectory 2608 at a second time, vehicle 1210 may travel trajectory 2610 at a third time, and vehicle 1215 may travel trajectory 2612 at a fourth time and trajectory 2614 at a fifth time. Any other combination of vehicles 1205, 1210, 1215, 1220, and 1225 and trajectories 2606, 2608, 2610, 2612, and 2614 may be possible. In the following discussion, trajectory is matched with one vehicle, for the sake of clarity.

Trajectory 2606 may include a motion representation of a host vehicle. Vehicle 1205 may have travelled the path represented by trajectory 2606 and one or more sensors in vehicle 1205 may collect data related to trajectory 2606. For example, vehicle 1205 may include navigation system 2300, discussed in FIG. 23, which may collect data from one or more sensors, such as GPS unit 2310, camera 122, speed sensor 2320, accelerometer 2325, and road profile sensor 2330. Trajectory 2606 may be determined by a processor according to the methods, processes, and operations disclosed herein. For example, processor 2315 may receive data from the one or more sensors and process the data according to instructions stored on motion representation module 2402 to determine trajectory 2606. For example, trajectory 2606 may be determined as part of step 2520 of process 2500. The path represented by trajectory 2606 begins at home 2602 and proceeds along road section 2601, going past stop sign 2616, stop line 2618, and office building 2604. If trajectory 2606 were used to determine an autonomous vehicle navigation model without being anonymised, the navigation model may include direction for navigating an autonomous vehicle to home 2602, which may be undesirable to the occupant of the home. There is also a possibility that if trajectory 2606 is transmitted without being anonymised, the transmission may be intercepted and used to associate trajectory 2606 with an individual who resides in home 2606. There may be other reasons why anonymization of trajectory 2606 is required or desired. The discussion of FIG. 27 discusses the anonymization achieved during process 2500 with respect to trajectory 2606.

Each of trajectories 2608, 2610, 2612, and 2614 may be determined in substantially the same manner as trajectory 2606. For example, the host vehicles corresponding with the trajectories include navigation system 2300, which may collect data from one or more sensors, such as GPS unit 2310, camera 122, speed sensor 2320, accelerometer 2325, and road profile sensor 2330. Trajectories 2608, 2610, 2612, and 2614 may be determined by a processor according to the methods, processes, and operations disclosed herein. For example, processor 2315, located in each host vehicle, may receive data from the one or more sensors and process the data according to instructions stored on motion representation module 2402 to determine the corresponding trajectory. For example, vehicle 1210 may include navigation system 2300 and processor 2315 therein may determine trajectory 2608 from data collected by the one or more sensors. Similarly, vehicle 1215 may include navigation system 2300 and processor 2315 may determine trajectory 2610 from data collected by the one or more sensors. Similarly, vehicle 1220 may include navigation system 2300 and processor 2315 therein may determine trajectory 2612. Similarly, vehicle 1225 may include navigation system 2300 and processor 2315 may determine trajectory 2614.

Each of trajectories 2608, 2610, 2612, and 2614 may include private information that may require or benefit from anonymization. For example, trajectory 2612 includes an end destination at office building 2604, without anonymization, the data relating to trajectory 2612 may be traced to vehicle 1220 or an individual associated therewith. Even the trajectories that do not have a staring or end point along road section 2601 may contain data that could be traced to the vehicle associated with the trajectory or an individual associated with the vehicle. As such, the motion representations depicted by trajectories 2608, 2610, 2612, and 2614 shall be anonymized. The anonymization may occur as discussed in process 2500. FIG. 27 also discusses anonymization of the trajectories.

FIG. 26B is an exemplary image 2620 of the type that may be captured by an imaging device and used to determine a road characteristic consistent with this disclosure. Image 2620 represents an image captured as a vehicle travels along road section 2601. For example, image 2620 may be captured by camera 122 included in vehicle 1205 as vehicle 1205 travels along trajectory 2606. Image 2620 may be captured by any means disclosed herein, including as discusses with relation to FIGS. 15-16. Image 2620 may be received and analyzed as part of process 2500. For example, image 2620 may be one of the one or more images received at step 2530 of process 2500. Image 2620 includes a representation of stop sign 2616 and road edge 2622. Stop sign 2616 may correspond with stop sign 2616 of FIG. 26A.

Image 2620 may be analyzed to determine one or more road characteristics. For example, image 2620 may be analyzed as part of step 2540 of process 2500. Image 2620 may be analyzed according to the instructions stored in image analysis module 2404. As discussed, elsewhere, the one or more road characteristics may include a position of a landmark, a road edge, a center line, or other feature of the road. Images may be analyzed by any means consistent with this disclosure. For example, an image may be compared to other images known to contain one or more road characteristics. In another example, a landmark or other road characteristic may be determined by detection of an edge of the landmark. In some embodiments, one or more trained or untrained systems may be configured to perform the image analysis. For example, image analysis module 2404 may include a neural network or deep neural network trained to detect road characteristics.

In the example of image 2620, processor 2315 may detect stop sign 2616 and/or road edge 2622. Processor 2315 may perform additional functions consistent with this disclosure, such as those consistent with image analysis module 2404. For example, processor 2315 may determine a position associated with stop sign 2616. The position may be determined in relation to road section 2601, to another landmark, to the host vehicle, or any other stationary or mobile object. The position may additionally or alternatively be determined in relation to a coordinate system, such as a predetermined coordinate system, a coordinate system used by a GPS sensor, a latitude and/or longitude or the like. Accordingly, the road characteristic associated with stop sign 2616 may include a visual representation of stop sign 2616, a position of stop sign 2616, a modified image of stop sign 2616, a combination thereof, or other data related to stop sign 2616. As an example, after processing image 2616, processor 2315 may determine a position of stop sign 2616 relative to road section 2601. The position may be represented on a visual representation of road section 2601 by any means disclosed herein. For example, FIGS. 27 and 28, discussed further below, include a stop sign marker 2716 in the position determined to be associated with stop sign 2616.

As discussed above, representing the position of stop sign 2616 by using stop sign marker 2716 rather than, for example, an image of stop sign 2616, may significantly reduce the data footprint of the road characteristic. Representing the position of stop sign 2616 by using stop sign marker 2716 may also improve the anonymity of the data. For example, an image of stop sign 2616 could include private information such as another vehicle stopped at stop sign 2616, a reflection of the vehicle from which image 2620 was captured, a pedestrian near stop sign 2616, or other information in the environment of stop sign 2616. By processing image 2620 to determine a position of stop sign 2616 and using a representation of the position rather than raw data relating to the stop sign, the information relating to stop sign 2616 is anonymized.

In the example of image 2620, processor 2315 may detect road edge 2622. Road edge 2622 may be detected by any means disclosed herein, such as, for example, detection of a curb, line, sidewalk, vegetation, or other object that may signify a change from a road to another surface. Processor 2315 may determine a position of road edge 2622. As discussed above, the position may be determined in relation to another road characteristic, to a position of a vehicle, to a standard or predetermined coordinate system, or the like. For example, road edge 2622 may be determined to be positioned between the host vehicle, from which image 2620 was captured, and stop sign 2616.

FIG. 26C is an exemplary image 2630 of the type that may be captured by an imaging device and used to determine a road characteristic consistent with this disclosure. Image 2360 represents an image captured as a vehicle travels along road section 2601. For example, image 2630 may be captured by camera 122 included in vehicle 1205 as vehicle 1205 travels along trajectory 2606. Image 2630 may be captured by any means disclosed herein, including as discussed with relation to FIGS. 15 and 16. Image 2630 may be received and analyzed as part of process 2500, or any other operation, process, or method disclosed herein. For example, image 2630 may be one of the one or more images received at step 2530 of process 2500 and may be processed by processor 2315 according to the instructions stored in image analysis module 2404. Image 2630 may be processed in substantially the same manner as discussed with relation to image 2620.

Image 2630 includes additional exemplary road characteristics that may be determined for road section 2601 consistent with this disclosure. Each of the road characteristics may be determined by any means disclosed herein. For example, the road characteristics may be determined by processor 2315 executing instructions stored in image analysis module 2404. In another example, the road characteristics may be determined as part of process 2500, for example, as part of step 2540.

The road characteristics determined with respect to image 2630 include road edge 2632, railing 2634, and center line 2638. As discussed elsewhere in this disclosure, each characteristic may include information relation to the position of the characteristic or other qualities of the characteristic. For example, processor 2315 may determine that road edge 2362 is positioned between vehicle 1205, from which image 2630 was captured, and railing 2634. In another example, processor 2315 may determine that center line 2638 is a dashed line separating two lanes of traffic that head in opposite directions. In another example, processor 2315 may determine that railing 2634 is located on the right-hand side of the road with respect to vehicle 1205. The examples are not limiting and it is understood that the road characteristics may include any other information consistent with this disclosure.

As described in this disclosure, one or more segments may be assembled from a single trajectory or other motion representation associated with a host vehicle. For example, as described above, a navigational system, such as navigational system 2300, within vehicle 1205 may capture data from one or more sensors and determine trajectory 2606, representing a path followed by vehicle 1205. Similarly, navigation system 2300 may capture one or more images (e.g., from camera 122) and one or more road characteristics may be determined from the one or more images. Processor 2315, which is part of navigational system 2300, may then assemble one or more road segments from the motion representation and/or road characteristics. Processor 2315 may assemble the road segment information according to the instructions stored in road segmenting module 2406. Assembling the navigation information into one or more segments rather than transmitting the raw data helps anonymize the information such that it may not be linked to any one individual or vehicle.

FIG. 27 is an exemplary diagram of road section 2601 including a plurality of road segments 2701-2715 assembled consistent with this disclosure. The road segments may be assembled by any means disclosed herein. For example, each segment may be assembled according to process 2500. Each segment may be assembled from one or more motion representations associated with a host vehicle and/or one or more road characteristics associated with the road. For example, the segments may each comprise a portion of the trajectories depicted in FIG. 26A (i.e., trajectories 2206, 2608, 2610, 2612, and 2614) and a portion of the road characteristics depicted in FIGS. 26B-26C. For the sake of clarity, each segment shown in FIG. 27 is represented as a line of a type (e.g., a solid or dashed line) corresponding with the lines used to represent the trajectories in FIG. 26A, however, it is understood that the segments may be depicted in any manner. In some embodiments, the segments may not be depicted in association with road section 2601. For example, each segment may be depicted in relation to other segments as described in relation to FIG. 1.1A, as a spline in three-dimensional space as described in relation to FIG. 13, as a cluster as described in relation to FIG. 22, or in any other manner consistent with this disclosure.

FIG. 27 depicts the road segments assembled from the information associated with a plurality of vehicles or trips. It is understood that FIG. 27 is being used to depict the various types of segments that may be assembled and is not limiting. For example, the segments associated with each vehicle may be determined by a system within each vehicle. In that circumstance, there may never be a plurality of segments from different vehicles, as depicted in FIG. 27, displayed on the same diagram. In other embodiments, the data from a plurality of vehicles may be transmitted to a remote (in relation to any one vehicle) processor or server before being assembled into the plurality of segments. For the sake of clarity, each of the segments is described in relation to the trajectory, from FIG. 26A with which it corresponds and with one host vehicle.

Trajectory 2606, which is associated with vehicle 1205, may be assembled into one or more segments as described above. In FIG. 27, trajectory 2606 is segmented into first segment 2701, second segment 2702, and third segment 2703. Each segment 2701, 2702, 2703 follows a portion of the path represented by trajectory 2606. It is contemplated that each segment 2701, 2702, 2703 may be of substantially the same size or of different sizes. In some embodiments, each segment 2701, 2702, 2703 may be of a random size, a predetermined size, a determined size, or a within a threshold thereof. The distance between each segment 2701, 2702, 2703 may likewise be of a random size, a predetermined size, a determined size, or a within a threshold thereof. It is clear form this disclosure that segments 2701, 2702, and 2703 contain less private information than trajectory 2606 and therefore anonymize the data related to the motion representation of vehicle 1205. For example, trajectory 2606 shows a beginning point at home 2602 whereas segment 2701, the segment closest to home 2602 merely depicts a straight path on road section 2601, providing no indication that segment 2701 is associated with home 2602. As such, one could not conclude from segment 2701 that vehicle 1205 is associated with home 2602. The same is true for each of segments 2702 and 2703.

As discussed above, each segment may include road characteristic information and/or motion representation information. For example, segment 2702 may include both the trajectory shown in FIG. 27 as well as information regarding stop sign marker 2716, which is in close proximity to segment 2702.

As discussed above, while assembling the data for segments 2701, 2702, and 2703 from trajectory 2606, processor 2315 may assemble data relating to segments positioned between segments 2701, 2702, and 2703. For example, a first segment may be positioned between segment 2701 and segment 2702, and a second segment may be positioned between segment 2702 and segment 2703. To ensure anonymization, only segments 2701, 2702, and 2703 may be transmitted for further processing while other segments or portions of trajectory 2606 may not be transmitted. For example, processor 2315 may transmit each of segments 2701, 2702, and 2703 to server 1230 while foregoing transmission of the remainder of trajectory 2606. The non-transmitted portions of trajectory 2606 may be deleted, stored, or otherwise excluded from processing by server 1230.

The other trajectories depicted in FIG. 26A may similarly be assembled into segments as shown in FIG. 27. The discussion of each trajectory and the corresponding segments and vehicles each disclose one or more exemplary processes for assembling the one or more road segments and provide examples of the types of information that may be included in the road segment information. Trajectory 2608 may be assembled into segments 2704, 2705, and 2706. For example, processor 2315 located in or in communication with vehicle 1210 may determine trajectory 2608 as part of step 2530 of process 2500 and assemble segments 2704, 2705, and 2706 as part of steps 2250 and/or 2560 of process

2500. Each segment 2704, 2705, and 2706 may be processed to include or exclude certain data consistent with this disclosure. For example, segment 2704 may be processed to ensure that it does not contain private information relating to home 2602. In another example, segment 2705 may be processed to ensure that it contains sufficient information for navigating the turn depicted by the path followed by segment 2705. After processing processor 2315 may transmit segments 2704, 2705, and 2706 to server 1230 for use in generating an autonomous vehicle road navigation model. As discussed above, the portions of trajectory 2608 that are not included in segments 2704, 2705, and 2706 may be deleted, stored, or otherwise excluded from processing by server 1230.

Trajectory 2610 may be assembled into segments 2707, 2708, and 2709. For example, processor 2315 located in or in communication with vehicle 1215 may determine trajectory 2610 as discussed above and may assemble segments 2707, 2708, and 2709 using the motion representation and or road characteristics determined during process 2500. As discussed above, trajectory 2610 may be processed in a way that ensures that any unique aspects of trajectory 2610 are included in at least one segment assembled from trajectory 2606. For example, the left turn made by vehicle 1215 while traveling the path depicted by trajectory 2610 may be marked as a portion that should be included in at least one segment. Segment 2708 may be assembled as a result of the marking of the turn as a portion of interests. As discussed, each of segments 2707, 2708, and 2709 may include information relating to one or more road characteristics. For example, segment 2708 may include information relating to its position in relation to stop line marker 2718 (which corresponds with stop line 2616) and or stop sign marker 2716, segment 2707 may include information relating to its position in relation to a road edge or centerline (e.g., center line 2638, road edge 2632, etc.), and so forth.

Trajectory 2612 may be assembled into segments 2710 and 2711. For example, processor 2315 located in or in communication with vehicle 1220 may receive or determine trajectory 2612 (for example, as part of step 2510 or step 2520) and may assemble segments 2710 and 2711 using various portions of trajectory 2612 and one or more road characteristics. The one or more road characteristics used to assemble segments 2710 and 2711 may include, for example, a road edge, a landmark, or any other road characteristic disclosed herein. For example, segment 2710 may be assembled using a portion of trajectory 2612 corresponding with segment 2710 and an indication of the position of segment 2710 in relation to stop line marker 2718 and/or stop sign marker 2716. In another example, vehicle 1220 may capture image 2630 and segment 2711 may include the portion of trajectory 2612 corresponding with segment 2711 and a position of segment 2711 in relation to center line 2638, road edge 2632, and/or railing 2634. As discussed above, segments 2710 and 2711 may be transmitted to server 1230 for assembly into an autonomous vehicle navigation model consistent with this disclosure. For example, processor 2315 may transmit segments 2710 and 2711 to server 1230 as part of step 2570 of process 2500. The portions of trajectory 2612 that are not included in segments 2710 and 2711 may be excluded from the autonomous vehicle navigation model. For example, processor 2315 may forego transmission of or delete or otherwise exclude the portions of trajectory 2612 that are not included in either segment 2710 or segment 2711. Notice that the end point of trajectory 2612, which leads to office building 2604, is not included in either segment 2710 or segment 2711. This may be a result of the anonymization process. For example, the endpoint of trajectory 2612 may have been deleted upon a determination that it corresponds with office building 2604. In another example, data related to the endpoint may not have been collected by the one or more sensor due to a delay or other function. In another example, processor 2315 max determine a segment corresponding with the endpoint but forego transmission of that segment in order to avoid transmitting information that may be linked to a vehicle, individual, or business.

Trajectory 2614 may be assembled into segments 2712, 2713, 2714, and 2715. For example, processor 2315 located in or in communication with vehicle 1225 may determine trajectory 2614 from the outputs of one or more sensors, such as GPS unit 2310, camera 122, speed sensor 2320, accelerometer 2325, and road profile sensor 2330 and may determine one or more road characteristics associated with road section 2601. Processor 2315 may then assemble a plurality of segments along trajectory 2614, including segments 2712, 2713, 2714, and 2715 and segments positioned between segments 2712, 2713, 2714, and 2715. For example, processor 2315 may determine segment 2712, segment 2713, and a segment between segment 2712 and 2713 (not shown). The same may be done for the length of trajectory 2614. As part of the anonymization process, processor 2315 may delete or otherwise exclude a first set of the plurality of segments. For example, processor 2315 may delete every segment along trajectory 2614 except segments 2712, 2713, 2714, and 2715. In another example, processor 2315 may transmit segments 2712, 2713, 2714, and 2715 and forego transmitting the remaining segments along trajectory 2614.

The examples discussed in relation to FIG. 27 are intended to provide examples of various aspects of the disclosed embodiments. They are not limiting on the scope of claims. The examples may be combined with other examples, modified in ways consistent with this disclosure, or otherwise altered.

As discussed in this disclosure, a plurality of segmented road information may be transmitted to a server or processor. For example, vehicle 1205 may transmit information relation to segments 2701-2703, vehicle 1210 may transmit information relating to segments 2704-2706, vehicle 1215 may transmit information relating to segments 2707-2709, vehicle 1220 may transmit information relating to segments 2710-2711, and vehicle 1225 may transmit information relating to segments 2712-2715. The data may be transmitted, for example, to a server-based system for processing vehicle navigation information for use in autonomous vehicle navigation. For example, server 1230 may receive the transmitted information an perform one or more operations, functions, processes, or methods for assembling a navigational model. The server includes at least one processor programmed to assemble the navigational model. The at least one processor may be programmed to receive navigation information from a plurality of vehicles. For example, the at least one processor may receive the road segment information transmitted from vehicles 1205, 1210, 1215, 1220, and 1225. In some embodiments, navigation information from the plurality of vehicles may be associated with a common road section. For example, server 1230 may receive the plurality of road segments associated with road section 2601, as shown in FIG. 27. In other embodiments, navigation information from the plurality of vehicles may be associated with different road sections. In this instance, the at least one processor may be programmed to determine a first group of navigational information relating to a first road section, a second group of navigation information relating to a second road section, and so forth.

The navigation information associated with a common road section may then be used to generate an autonomous road navigation model for the common road section. The road navigation model may be generated according to any means consistent with this disclosure, such as discussed in relation to FIGS. 9A-9B, FIGS. 11A-11D, FIGS. 30-31, and elsewhere herein.

FIG. 28 is an exemplary road section (e.g., road section 2601) depicting aspects of an autonomous road navigation model 2800 determined from the navigational information depicted in FIG. 27. Autonomous road navigation model 2800 (referred to herein as navigation model 2800) may be substantially similar to a local map (such as local map 1140) and may include one or more target trajectories for an autonomous vehicle. For example, navigation model 2800 may include target trajectories 2802, 2804, 2806, 2808, 2810, 2812, 2814, and 2816, which correspond with various paths through road section 2601. An autonomous vehicle may access or rely upon one or more of target trajectories 2802, 2804, 2806, 2808, 2810, 2812, 2814, and 2816 when navigating road section 2601. Target trajectories 2802, 2804, 2806, 2808, 2810, 2812, 2814, and 2816 may function as discussed with relation to target trajectories 1141-1148, as discussed in relation with FIG. 11C.

Each of the target trajectories included in navigation map 2800 may have been determined from the navigation information captured or determined by one or more host vehicles. For example, the road segments determined for road section 2601, as discussed with relation to FIG. 27, may be used to generate at least a portion of the trajectories shown in navigation map 2800. For example, target trajectory 2802 may include segments 2704, 2701, 2702, 2711, and 2703. Further, target trajectory 2802 may be derived from a combination of trajectory 2606, trajectory 2608, and trajectory 2612. The benefit of using segments 2704, 2701, 2702, 2711, and 2703 rather than trajectories 2606, 2608, and 2612 to assemble target trajectory 2802 is that the information associated with segments 2704, 2701, 2702, 2711, and 2703 lacks the potentially personal or identifying information included in trajectories 2606, 2608, and 2612, such as the beginning of trajectory 2606 being at home 2606 and the endpoint of trajectory 2612 being at office building 2604. By performing the steps, functions, and operations associated with assembling segments 2704, 2701, 2702, 2711, and 2703, the information is stripped of the identifying information and server 1230 need not perform additional anonymizing functions. In some embodiments, however, server 1230 may perform additional anonymizing functions when assembling a navigational model, such as navigation model 2800.

Figure 29:
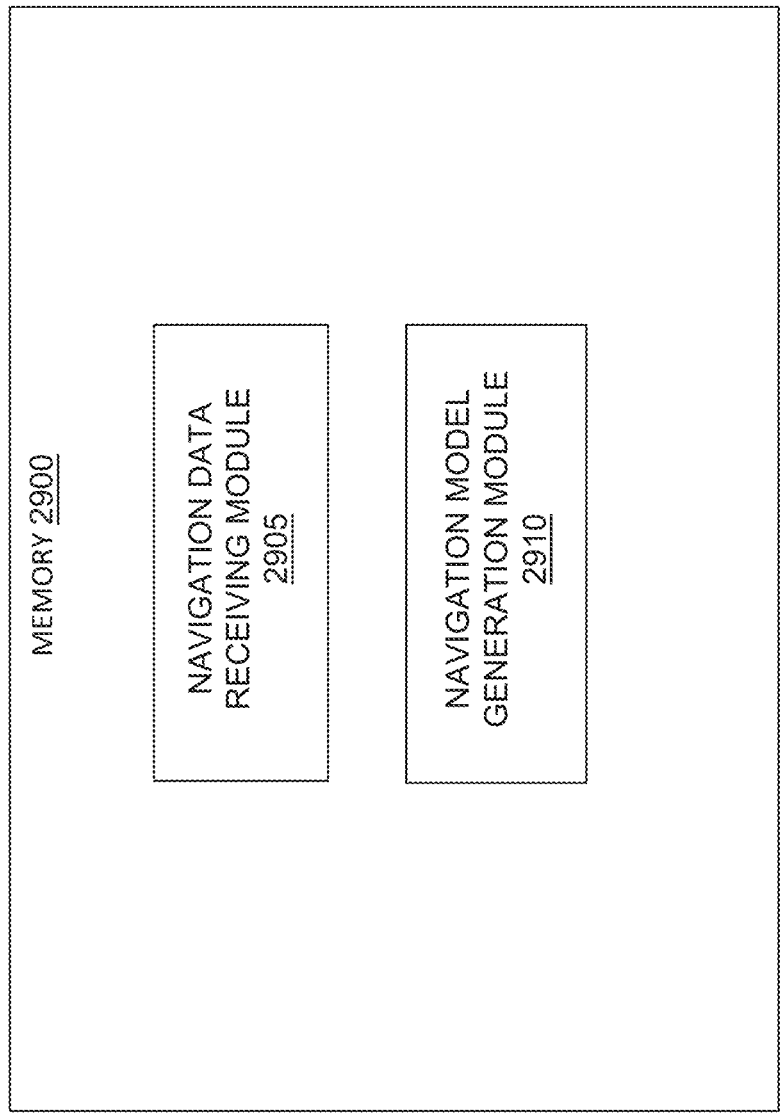
FIG. 29 illustrates a block diagram of a memory consistent with the disclosed embodiments.

FIG. 28 and navigation model 2800 are discussed further below in reference to server 1230 and the operations it may be programmed to perform. FIG. 29 is an exemplary block diagram of a memory device, memory 2900, that may contain one or more modules consistent with this disclosure. Memory 2900 may be within or in communication with server 1230. The at least one processor included in server 1230 may be programmed to execute instructions stored on memory 2900.

Memory 2900 may include navigation data receiving module 2905 and navigation model generation module 2910. Navigation data receiving module 2905 may include instructions that, when executed by at least one processor, receive navigation data from one or more vehicles. For example, navigation data receiving module 2905 may include instructions for receiving road segment data, such as that discussed in relation with FIG. 27.

In some embodiments, navigation data receiving module 2905 may include instructions that, when executed by at least one processor, organize navigation data received from one or more vehicles. For example, server 1230 may receive data from a plurality of vehicles and the data may be associated with a plurality of road sections. The instructions included on navigation data receiving module 2905 may allow processor 2020 to identify, for example, a road section corresponding with the received navigation information and to organize it into groups corresponding with the road section. For example, if server 1230 receives the road segments depicted in FIG. 27 and a plurality of other road segments, processor 202 may determine that road segments 2701-2715 are associated with road section 2601. As another example, server 1230 may receive navigation information related to a common road section and organize the navigation information according to other factors. For example, server 1230 may receive segments 2701-2715 and processor 2020, executing instructions on navigation data receiving module 2905, may determine for example, that segments 2712, 2713, and 2709 are associated with a first side of the street; that segments 2704, 2701, 2702, 2711, and 2703 are associated with a second side of the street, and so forth. In another example, the navigation information may be organized based on a proximity (e.g., being within a predetermined distance) to a landmark, road edge, or other road characteristic. For example, road segments 2701-2715 may be organized based on proximity to stop sign marker 2716, stop line marker 2718, home 2602, office building 2604, or any other road characteristic. In some embodiments, a first set of road segment information may be organized at a first time for inclusion in first autonomous vehicle road navigation model and a second set of road segment information may be organized at a second time for inclusion in a second navigation model or to update the first navigation model. For example, road segments 2704, 2701, and 2711 may be organized at a first time as relating to a first side of the road and road segments 2705, 2702, and 2703 may be organized at a second time as relating to the same side of the road. The examples are not limiting and it is understood that navigation data may be organized in any manner consistent with this disclosure.

In some embodiments, navigation data receiving module 2905 may include instructions that, when executed by at least one processor, store received navigation data. For example, processor 2020 may store the navigation data in a memory device, database, or other memory, such as memory 2015 or storage device 2010. In embodiments where the navigation data is organized, as discussed above, the data may be stored before being organized, after being organized, or a combination thereof.

Navigation model generation module 2910 may store instructions that, when executed by one or more processor, generate a navigation model based on the navigation data. The instructions may cause at least one processor to perform one or more functions consistent with creating a sparse map or an autonomous vehicle road navigation model consistent with this disclosure. For example, navigation model generation module 2910 may include instructions for performing all or part of process 1900, process 3000, or any other process for generating a navigation map. Navigation model generation module 2910 may store instructions that, when executed by at least one processor, cause the generated navigation model to be transmitted to one or more vehicles.

For example, the instructions may cause processor 2020 to distribute the generated navigation model to one or more autonomous vehicles.

Any of the modules (e.g., navigation data receiving module 2905 or navigation model generation module 2910) included in memory 2900 may implement techniques associated with a trained system or an untrained system. For example, the modules may implement a neural network or a deep neural network.

Figure 30:
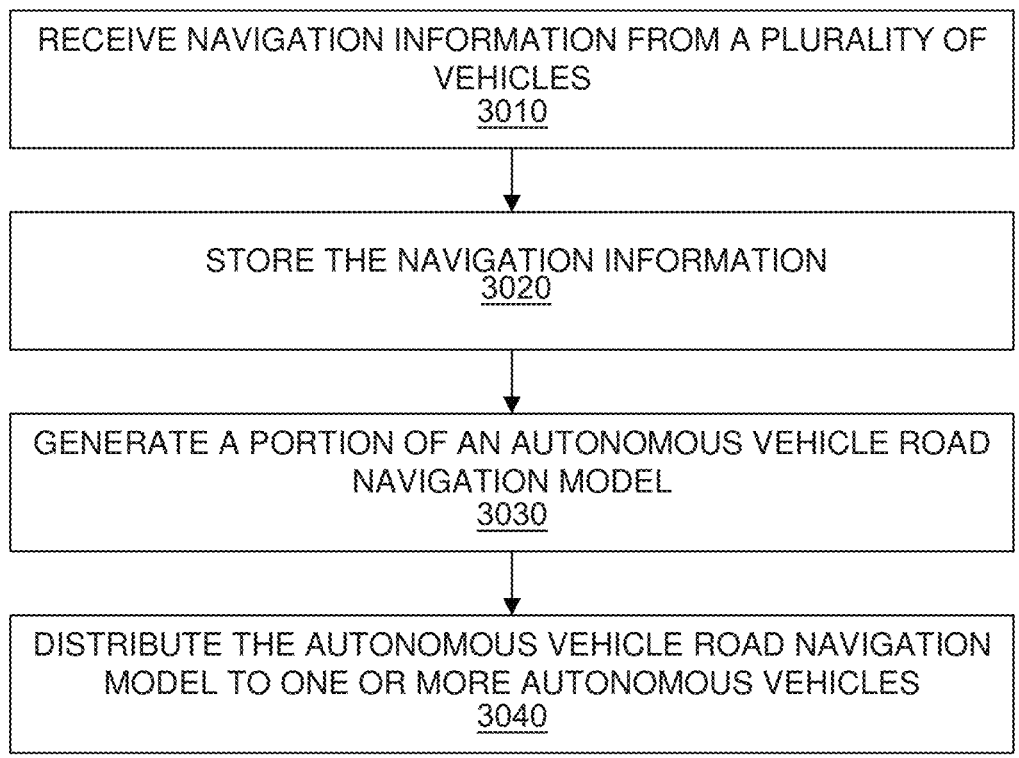
FIG. 30 is a flowchart showing an example process for generating and distributing an autonomous vehicle navigation model using anonymized navigation information consistent with the disclosed embodiments.

FIG. 30 is a flowchart showing an example process 3000 for processing vehicle navigation information for use in autonomous vehicle navigation. Process 3000 may be performed by at least one processor included in server 1230. Furthermore, process 300 may be performed by at least one processor by executing the instruction stored in memory 2900.

Process 3000 may include a step 3010 for receiving navigation information from a plurality of vehicles. Server 1230 may receive navigation information transmitted from one or more vehicles consistent with this disclosure. For example, vehicles 1205, 1210, 1215, 1220, and 1225 may each include navigation system 2300, which may collect, process, and transmit navigation information (e.g., by implementing process 2500) and server 1230 may receive the navigation information. Server 1230 may include one or more devices configured to receive the navigation information, such as a receiver specially configured to receive the information or a processor configured to receive the information. For example, processor 2020 may execute the instructions on navigation data receiving module 2905 to receive the navigation information. In some embodiments, server 1230 may receive the navigation information in response to a request transmitted from server 1230 to one or more vehicles in communication with server 1230. For example, processor 2020 may request information from vehicles 1205 and 1210 by transmitting a request through communication unit 2005 and vehicles 1205 and 1210 and may transmit the data in response to the request.

In some embodiments, the navigation information from the plurality of vehicles may be associated with a common road section. For example, the navigation information received from vehicles 1205, 1210, 1215, 1220, and 1225 is associated with road section 2601. In some embodiments, the navigation information from the plurality of vehicles may be associated with different road sections. In these embodiments, processor 2020 in server 1230 may organize or sort the data according to the road section with which each piece of information is associated. The organization or sorting may be performed according to the instructions stored on navigation data receiving module 2905, discussed above. In some embodiments, server 1230 may request, from one or more vehicles, navigation data associated with a particular road section. For example, processor 2020 may determine that a navigation model for a particular road section has incomplete, erroneous, or outdated data and may request information relating to the road section from one or more vehicles. It is contemplated that server 1230 may request the common road section data from specific vehicles (e.g., by identifying one or more vehicles that have recently traveled the road section or are likely to have traveled the road section) or may request the common road section data from any subset of vehicles (e.g., by requesting data from every vehicle in communication with server 1230 and isolating the data associated with the common road section).

The navigation information received by server 1230 may include one or more motion representations associated with one or more host vehicles. In some embodiments, the navigation information may include a plurality of motion representations associated with the one or more vehicles. The motion representation may further be associated with one or more portions of a common road section. The motion representations may include any motion representations disclosed herein. For example, the at least one motion representation for the host vehicle, relative to the first and second portions of the common road section, may include a determined trajectory for the host vehicle. In this example, the determined trajectory for the host vehicle may be substantially the same as any of the trajectories associated with the road segment information depicted in FIG. 27, for example road segment 2701-2715. The at least one motion representation may be determined by any means disclosed herein. For example, the at least one motion representation for the host vehicle, relative to the first and second portions of the common road section, may be determined based on outputs from at least one of a GPS sensor, a speed sensor, or an accelerometer. For example, the navigation information received from, for example, vehicle 1205 may include a motion representation determined as part of process 2500 using date from GPS unit 2310, speed sensor 2320, and/or accelerometer 2325.

The navigation information received by server 1230 may include one or more road characteristics associated with one or more road sections. In some embodiments, the navigation information from a single vehicle may contain a plurality of road characteristics associated with one or more road sections. In some embodiments, the navigation information may include a single road characteristic associated with one or more road sections. The road characteristic may include any road characteristic disclosed herein and may be associated with one or more portions of a road section. For example, the at least one road characteristic may be relative to first and second portions of a common road section and may include an indicator of one or more of a detected lane split, lane merge, dashed lane marking line, solid lane marking line, road surface color within a lane, lane line color, lane direction, lane type, road edge location, landmark identifier, or indicator of a weather condition along the common road section. As an example, the navigation information received from, for example, vehicle 1205 may include an indicator of road edge 2632, railing 2634, and/or center line 2638 of road section 2601. In another example, a road characteristic may include a landmark identifier that may include at least one of a landmark type or a landmark location. The landmark type may include at least one of a traffic signal, pole, road marking, stop sign, or sign. For example, the road characteristics associated with road segment 2711 may include an identifier of stop sign 2616, office building 2604, or any other landmark.

The navigation information received by server 1230 as part of step 3010 may include navigation data determined according to process 2500. The navigation information from each of the plurality of vehicles may include road segment information relative to a first portion of a common road section. Each portion of the navigation information may include one or more motion representations (e.g., a trajectory, acceleration, etc.) associated with a host vehicle and/or one or more road characteristic (e.g., a landmark, road edge, etc.) associated with the road section. For example, a first road segment information may include a determined at least one motion representation for the host vehicle and a determined at least one road characteristic relative to the first portion of the common road section. For example, server 1230 may receive road segment information from vehicle 1205 which, as discussed above, may include the trajectory associated with road segment 2701 and an indication that road segment 2701 is near home 2602 road edge 2632 of road section 2601. Similarly, server 1230 may receive first road segment information from vehicle 1220 which, as discussed above, may include the trajectory associated with road segment 2711 and an indication of the position of road segment 2711 in relation to stop sign marker 2716.

The navigation information received from each of the plurality of vehicles may include information relating to a plurality of segments of a road section. For example, the navigation information from each of the plurality of vehicles may include a second road segment information relative to a second portion of the common road section. Like the first road segment information, each of the plurality of segment information may include one or more motion representations associated with the host vehicle and/or one or more road characteristics associated with the road section. In some embodiments, the second road segment information may include a determined at least one motion representation for the host vehicle and a determined at least one road characteristic relative to the second portion of the common road section. For example, server 1230 may receive second road segment information from vehicle 1205 which may include the trajectory associated with road segment 2702 and an indication of the position of road segment 2701 in relation to, for example, stop sign 2616, stop sign marker 2716, and/or road edge 2622 of road section 2601.

While the example above discusses navigation information comprising a first road segment information and a second road segment information, it is understood that any number of road segment information may be received by server 1230. For example, vehicle 2614 may transmit, and server 1230 may receive, navigation information comprising the road segment information for each of road segment 2712, 2713, 2714, and 2715. In another example, each of vehicles 1205, 1210, 1215, 1220, and 1225 may transmit, and server 1230 may receive, navigation information relating to one or more associated road segments. For example, server 1230 may receive the navigation information for every road segment (e.g. road segments 2701-2715) determined for road section 2601.

In some embodiments where server 1230 receives navigation information comprising a plurality of road segment information, the road segments represented in the navigation information may relate to different portions of a common road section. For example, the first road segment information (e.g., road segment 2701) received from vehicle 1205 and the second road segment information (e.g., road segment 2702) received from vehicle 1205 may be associated with different portions of road section 2601. The road portions related to the road segment information may be of any length, may be of the same length, or may be of varying lengths. For example, the first portion of the common road section and the second portion of the common road section may each have a length of at least 4 km. In another example, the first portion of the common road section may have a length of less than 4 km and the second portion of the road section may have a length of at least 4 km.

In some embodiments, the road segments represented in the navigation information may relate be spatially separated portions of the road section. For example, the second portion of the road section may be different from the first portion of the road section and may be spatially separated from the first portion of the road section. As discussed above, the first and second road portions may be separated by any distance. For example, the first portion of the common road section may be spatially separated from the second portion of the common road section by a distance of at least 1 km.

Process 3000 may include a step 3020 for storing the navigation information associated with a common road section. As discussed above, the navigation information received at step 3010 may be associated with a common road section. Additionally or alternatively, server 1230 may be configured to organize or sort the navigation information into groups corresponding with a common road section. For example, processor 2020 may execute the instruction stored on navigation data receiving module 2905 to identify a common road section with which the received navigation information corresponds and to store the navigation data in association with the corresponding common road section.

The navigation information may be stored in any memory device in communication with server 1230. For example, the navigation information may be stored in a memory within server 1230, such as memory 2900, memory 2015, storage device 2010, or another memory device. In another example, server 1230 may transmit the navigation information to an external memory, database, or other storage device.

Process 3000 may include a step 3030 for generating at least a portion of an autonomous vehicle road navigation model for the common road section based on the navigation information from the plurality of vehicles. For example, processor 2020 may execute instructions stores on navigation model generation module 2910 to generate a navigation model for use in autonomous vehicles. As discussed above, the autonomous vehicle navigation model generated at step 3030 may be substantially similar to navigation model 2800, map skeleton 1420, local map 1140, or sparse map 800.

The autonomous vehicle road navigation model for the common road segment may include at least one line representation of a road surface feature extending along the common road segment, and each line representation may represent a path along the common road segment substantially corresponding with the road surface feature. For example, the road surface feature may include a road edge or a lane marking. Moreover, the road surface feature may be identified through image analysis of a plurality of images acquired as the plurality of vehicles traverse the common road segment. For example, server 1230 may generate at least a portion of the autonomous vehicle road navigation model for common road segment 2601 based on the navigation information received from vehicles 1205, 1210, 1215, 1220, and 1225 that travel on the common road segment 2601.

In some embodiments, the autonomous vehicle road navigation model may be configured to be superimposed over a map, an image, or a satellite image. For example, the model may be superimposed over a map or image provided by a conventional navigation service such as Google® Maps, Wane, or the like. As an example, an autonomous vehicle road navigation model superimposed on a map may appear substantially similar to navigation model 2800.

The autonomous vehicle road navigation model may be generated by any means consistent with this disclosure. For example, the at least on processor within server 1230 may assemble one or more target trajectories from the navigation information and further assemble one or more local maps from the target trajectories, as described with relation to FIG. 11C and local map 1140. In another example, the at least one processor within server 1230 may execute instruction stored in navigation model generating module 2910 to perform at least a portion of process 1900. In some embodiments, the autonomous vehicle navigation model may be generated by modifying or combining one or more processes disclosed herein.

Process 3000 may include a step 3040 for distributing the autonomous vehicle road navigation model to one or more vehicles. The vehicles may be autonomous vehicles and may use the autonomous vehicle navigation model to navigate along a road section included in the autonomous vehicle navigation model. For example, server 1230 may distribute the autonomous vehicle navigation model to one or more autonomous vehicles for use in autonomously navigating the one or more autonomous vehicles along the common road section. For example, server 1230 may distribute navigation model 2800 to vehicles 1205, 1210, 1215, 1220, and/or 1225, or any other vehicle, for later use in autonomously navigating along road section 2601. The autonomous vehicle navigation model may be distributed by any means consistent with this disclosure. For example, processor 2020 may cause transmission of navigation model 2800 through communication unit 1405 or another communication or transmission device in communication with server 1230.

Consistent with this disclosure, the one or more autonomous vehicles to which the autonomous vehicle navigation model is distributed may experience one or more navigational responses in response to receiving the autonomous vehicle navigation model. For example, vehicle 1205 may receive navigation model 2800 and may travel along target trajectory 2802 by performing a series of navigational responses based on, for example, the motion representations and/or road characteristics of road section 2601. As discussed above, the navigational response may be any action consistent with operating a vehicle, such as acceleration, braking, turning, merging, stopping, switching lanes, and the like. For example, each autonomous vehicle may have one or more systems configured to interpret navigation model 2800 and may perform a series of navigational responses in order to navigate a path depicted in navigation model 2800.

In some embodiments, the one or more autonomous vehicles may use the autonomous vehicle navigation map, one or more images, and/or one or more outputs from a sensor to determine a navigational response. For example, the one or more autonomous vehicles may execute one or more instructions of navigational response module 408, discussed above, to determine a desired navigational response based on sensory input (e.g., information from radar) and inputs from other systems of a vehicle (e.g., vehicle 200), such as throttling system 220, braking system 230, and steering system 240 of vehicle 200. Based on the desired navigational response, the processor (e.g., processing unit 110) may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

For example, vehicle 1205 may receive navigation map 2800 and may capture one or more images using camera 122. Processor 2315, located in vehicle 1205, may then compare the captured image with one or more road characteristics associated with navigation model 2800 and determine a navigational response based on the comparison. For example, if vehicle 1205 is traveling on target trajectory 2808 and the captured image depicts stop sign 2616, processor 2315 may determine that vehicle 1205 needs to stop and may need to turn using either target trajectory 2820 or target trajectory 2814. Accordingly, processor 2315 may cause vehicle 1205 to stop at stop line marker 2718 and to turn using target trajectory 2820.

In some embodiments, an autonomous vehicle may navigate a road section by aligning a received autonomous vehicle navigation model with the road section and following target trajectories on the navigation model. As an example, if an autonomous vehicle needs to navigate road section 2601 in a path similar to trajectory 2610 of FIG. 26, the autonomous vehicle may use navigation model 2800 to navigate along target trajectory 2808 until reaching stop line marker 2718, then perform a left turn by following target trajectory 2814, and resuming on target trajectory 2804. The autonomous vehicle may align an autonomous vehicle navigation model with a map, diagram, or coordinate system related with a road section using, for example, one or more landmarks, lane markings, or other road characteristics. For example, vehicle 1205 may capture one or more images (e.g., images similar to image 2620 or 2630) which may contain one or more landmarks associated with the road section, and processor 2315 may compare the imaged landmark with one or more landmarks on navigation model 2800 to align target trajectories 2802-2820 with road section 2601.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A navigation system for collecting anonymized drive information relative to a road section traversed by a host vehicle, the navigation system comprising:
at least one processor comprising circuitry and a memory, wherein the memory includes instructions that when executed by the circuitry cause the at least one processor to:
receive outputs provided by one or more sensors, the outputs being indicative of motion of the host vehicle;
determine at least one motion representation for the host vehicle based, at least in part, on the outputs from the one or more sensors;
receive at least one image acquired by a camera, the at least one image being representative of an environment of the host vehicle along the road section;
analyze the at least one image to determine at least one road characteristic associated with the road section;
assemble first road segment information relative to a first portion of the road section, wherein the first road segment information includes the determined at least one motion representation for the host vehicle and the determined at least one road characteristic relative to the first portion of the road section;
assemble second road segment information relative to a second portion of the road section, wherein the second road segment information includes the determined at least one motion representation for the host vehicle and the determined at least one road characteristic relative to the second portion of the road section, wherein the second portion of the road section is different from the first portion of the road section and is spatially separated from the first portion of the road section by a third portion of the road section, and wherein the road section includes a tunnel and at least one of the first portion of the road section or the second portion of the road section is designated such that a length of the tunnel is fully included within either the first portion of the road section or the second portion of the road section;
cause transmission of the first road segment information and the second road segment information to a server remotely located relative to the host vehicle for assembly of an autonomous vehicle road navigation model; and
forgo transmission to the server of assembled road segment information relating to the third portion of the road section.

2. The navigation system of claim 1, wherein the at least one motion representation for the host vehicle includes a determined trajectory for the host vehicle.

3. The navigation system of claim 1, wherein the at least one motion representation for the host vehicle includes an ego-motion representation for the host vehicle relative to a predetermined coordinate system.

4. The navigation system of claim 3, wherein the ego-motion representation for the host vehicle is determined for six degrees of freedom.

5. The navigation system of claim 1, wherein the one or more sensors include a GPS sensor.

6. The navigation system of claim 1, wherein the one or more sensors include at least one of a speed sensor or an accelerometer.

7. The navigation system of claim 1, wherein the determined at least one road characteristic includes a lane characteristic including an indicator of one or more of a detected lane split, lane merge, dashed lane marking line, solid lane marking line, road surface color within a lane, lane line color, lane direction, or lane type.

8. The navigation system of claim 1, wherein the determined at least one road characteristic includes an indicator of a road edge location.

9. The navigation system of claim 1, wherein the determined at least one road characteristic includes a landmark identifier.

10. The navigation system of claim 9, wherein the landmark identifier includes at least one of a landmark type or a landmark location.

11. The navigation system of claim 10, wherein the landmark type includes at least one of a traffic signal, pole, road marking, stop line, or sign.

12. The navigation system of claim 1, wherein the determined at least one road characteristic includes a temporary road characteristic comprising an indicator of a weather condition along the road section.

13. The navigation system of claim 12, wherein the indicator of weather condition is associated with at least one of snow, rain, fog, or sun glare.

14. The navigation system of claim 1, wherein the first portion of the road section is spatially separated from the second portion of the road section by a distance of at least 1 km.

15. The navigation system of claim 1, wherein the first portion of the road section and the second portion of the road section each have a length of at least 2 km.

16. The navigation system of claim 1, wherein the first portion of the road section and the second portion of the road section each have a length randomly determined by the at least one processor.

17. The navigation system of claim 16, wherein the randomly determined length falls within +/−0.5 km of a predetermined length.

18. The navigation system of claim 1, wherein the memory includes instructions that when executed by the circuitry cause the at least one processor to receive, from the remotely located server, the autonomous vehicle road navigation model and cause at least one navigational maneuver by the host vehicle based on the autonomous vehicle road navigation model.

19. The navigation system of claim 1, wherein the memory includes instructions that when executed by the circuitry cause the at least one processor to begin assembly of the first road segment information after a predetermined delay.

20. The navigation system of claim 1, wherein the memory includes instructions that when executed by the circuitry cause the at least one processor to forego transmission to the server of a final assembly of road segment information where the final assembly of road segment information is representative of an end of a drive by the host vehicle.

21. The navigation system of claim 1, wherein the memory includes instructions that when executed by the circuitry cause the at least one processor to forego transmission to the server of an initial assembly of road segment information where the initial assembly of road segment information includes a representation of a beginning of a drive by the host vehicle.

22. A computer-implemented method for collecting anonymized drive information relative to a road section traversed by a host vehicle, the method comprising:
receiving outputs provided by one or more sensors, the outputs being indicative of motion of the host vehicle;

determining at least one motion representation for the host vehicle based, at least in part, on the outputs from the one or more sensors;

receiving at least one image acquired by a camera, the at least one image being representative of an environment of the host vehicle along the road section;

analyzing the at least one image to determine at least one road characteristic associated with the road section;

assembling first road segment information relative to a first portion of the road section, wherein the first road segment information includes the determined at least one motion representation for the host vehicle and the determined at least one road characteristic relative to the first portion of the road section;

assembling second road segment information relative to a second portion of the road section, wherein the second road segment information includes the determined at least one motion representation for the host vehicle and the determined at least one road characteristic relative to the second portion of the road section, wherein the second portion of the road section is different from the first portion of the road section and is spatially separated from the first portion of the road section by a third portion of the road section, and wherein the road section includes a tunnel and at least one of the first portion of the road section or the second portion of the road section is designated such that a length of the tunnel is fully included within either the first portion of the road section or the second portion of the road section;

causing transmission of the first road segment information and the second road segment information to a server remotely located relative to the host vehicle for assembly of an autonomous vehicle road navigation model; and forgoing transmission to the server of assembled road segment information relating to the third portion of the road section.

23. A non-transitory computer readable medium containing instructions that when executed by at least one processor, cause the at least one processor to:

receive outputs provided by one or more sensors, the outputs being indicative of motion of the host vehicle;

determine at least one motion representation for the host vehicle based, at least in part, on the outputs from the one or more sensors;

receive at least one image acquired by a camera, the at least one image being representative of an environment of the host vehicle along the road section;

analyze the at least one image to determine at least one road characteristic associated with the road section;

assemble first road segment information relative to a first portion of the road section, wherein the first road segment information includes the determined at least one motion representation for the host vehicle and the determined at least one road characteristic relative to the first portion of the road section;

assemble second road segment information relative to a second portion of the road section, wherein the second road segment information includes the determined at least one motion representation for the host vehicle and the determined at least one road characteristic relative to the second portion of the road section, wherein the second portion of the road section is different from the first portion of the road section and is spatially separated from the first portion of the road section by a third portion of the road section, and wherein the road section includes a tunnel and at least one of the first portion of the road section or the second portion of the road section is designated such that a length of the tunnel is fully included within either the first portion of the road section or the second portion of the road section;

cause transmission of the first road segment information and the second road segment information to a server remotely located relative to the host vehicle for assembly of an autonomous vehicle road navigation model; and forgo transmission to the server of assembled road segment information relating to the third portion of the road section.

* * * * *